United States Patent [19]
Wakou et al.

[11] Patent Number: 5,767,453
[45] Date of Patent: Jun. 16, 1998

[54] COMBINED METERING APPARATUS

[75] Inventors: Kazuyoshi Wakou, Atsugi; Fumihiro Tsukasa, ooi-machi; Sadao Kobayashi, Atsugi, all of Japan

[73] Assignee: Anritsu Corporation, Tokyo, Japan

[21] Appl. No.: 633,813

[22] PCT Filed: Aug. 23, 1995

[86] PCT No.: PCT/JP95/01663

§ 371 Date: Apr. 16, 1996

§ 102(e) Date: Apr. 16, 1996

[87] PCT Pub. No.: WO96/07083

PCT Pub. Date: Mar. 7, 1996

[30] Foreign Application Priority Data

Aug. 26, 1994 [JP] Japan .................. 6-226010
Oct. 21, 1994 [JP] Japan .................. 6-282931

[51] Int. Cl.⁶ .................. G01G 13/00; B67D 5/08
[52] U.S. Cl. .................. 177/25.18; 177/103; 177/108; 177/114; 222/56; 222/58
[58] Field of Search .................. 177/25.18, 103, 177/104, 105, 106, 107, 108, 114; 222/55, 56, 58

[56] References Cited

U.S. PATENT DOCUMENTS

| 4,393,950 | 7/1983 | Klopfenstein et al. | 177/108 |
| 4,614,243 | 9/1986 | Ikeda | 177/25.18 |
| 5,340,949 | 8/1994 | Fujimura et al. | 177/25.18 |

Primary Examiner—Michael L. Gellner
Assistant Examiner—Randy W. Gibson
Attorney, Agent, or Firm—Frishauf, Holtz, Goodman, Langer & Chick

[57] ABSTRACT

This invention provides a combined metering apparatus in which the convey efficiency of a target metering object from an upper-stage hopper to a lower-stage hopper is improved. For this purpose, the direction in which a bottom plate 33 of a pool hopper 25 is moved to open the lower open surface of a cylindrical body 26 and the direction in which a bottom plate 43 of a lower-stage metering hopper 35 is moved to close the lower open surface of a cylindrical body 36 are set the same. Also, the direction in which the bottom plate 43 of the metering hopper 35 is moved to open the lower open surface of the cylindrical body 36 and the direction in which a bottom plate 59 of a lower-stage timing hopper 50 is moved to open the lower open surface of a cylindrical body 51 are set the same. Hence, when the bottom plate of the lower-stage hopper is moved in the closing direction, the bottom plate of the upper-stage hopper is moved in the opening direction almost simultaneously, so that the target metering object in the upper-stage hopper can be transferred to the lower-stage hopper efficiently.

43 Claims, 28 Drawing Sheets

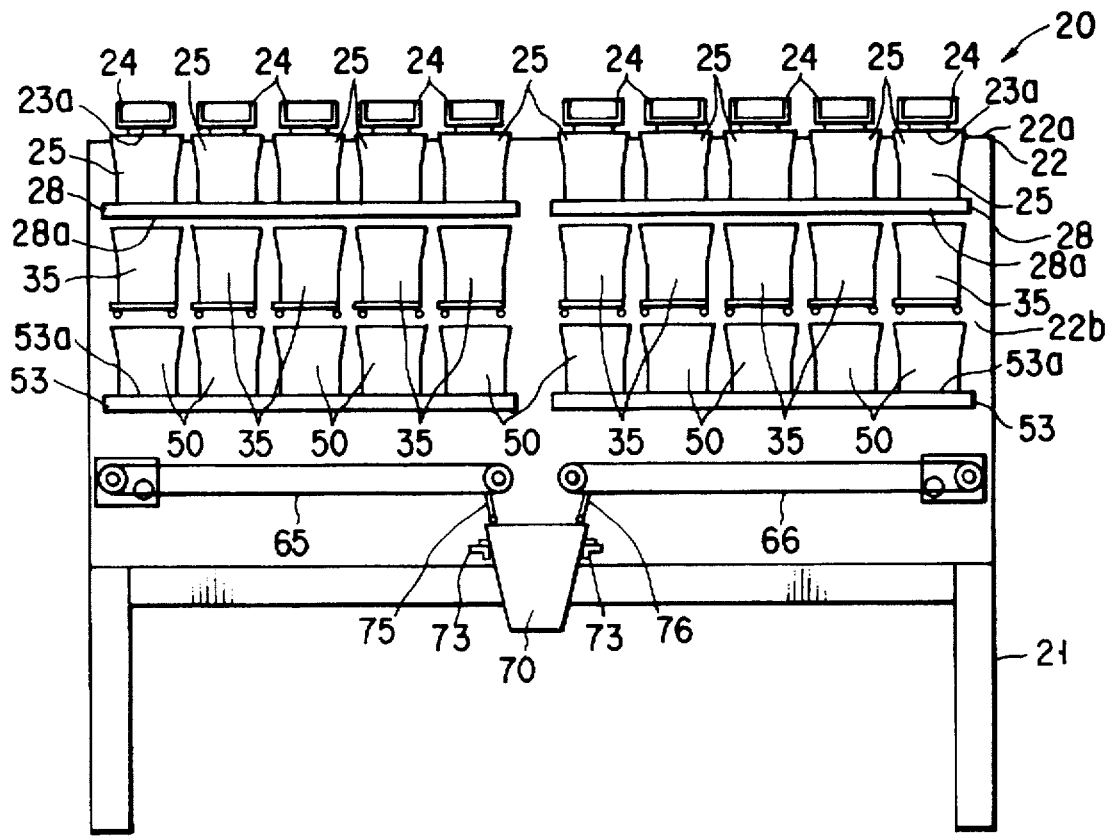
F I G. 2
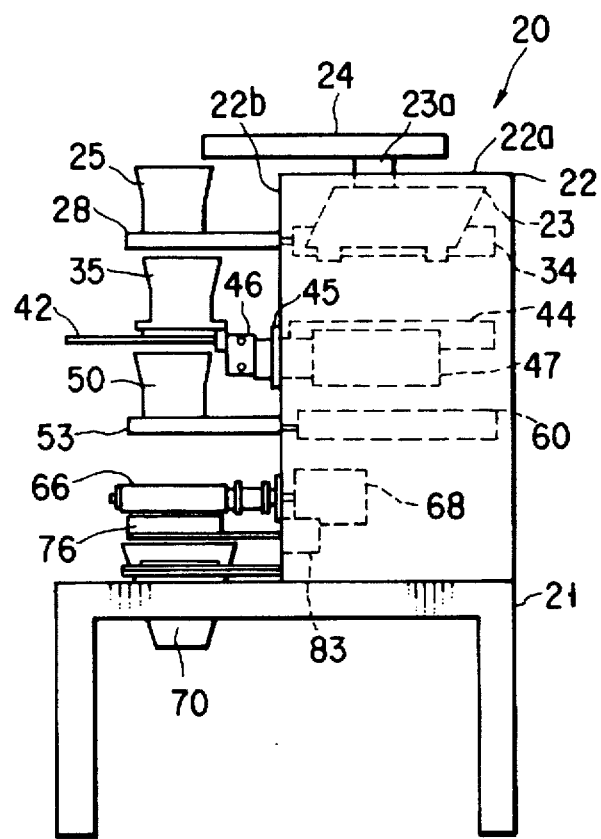
F I G. 3

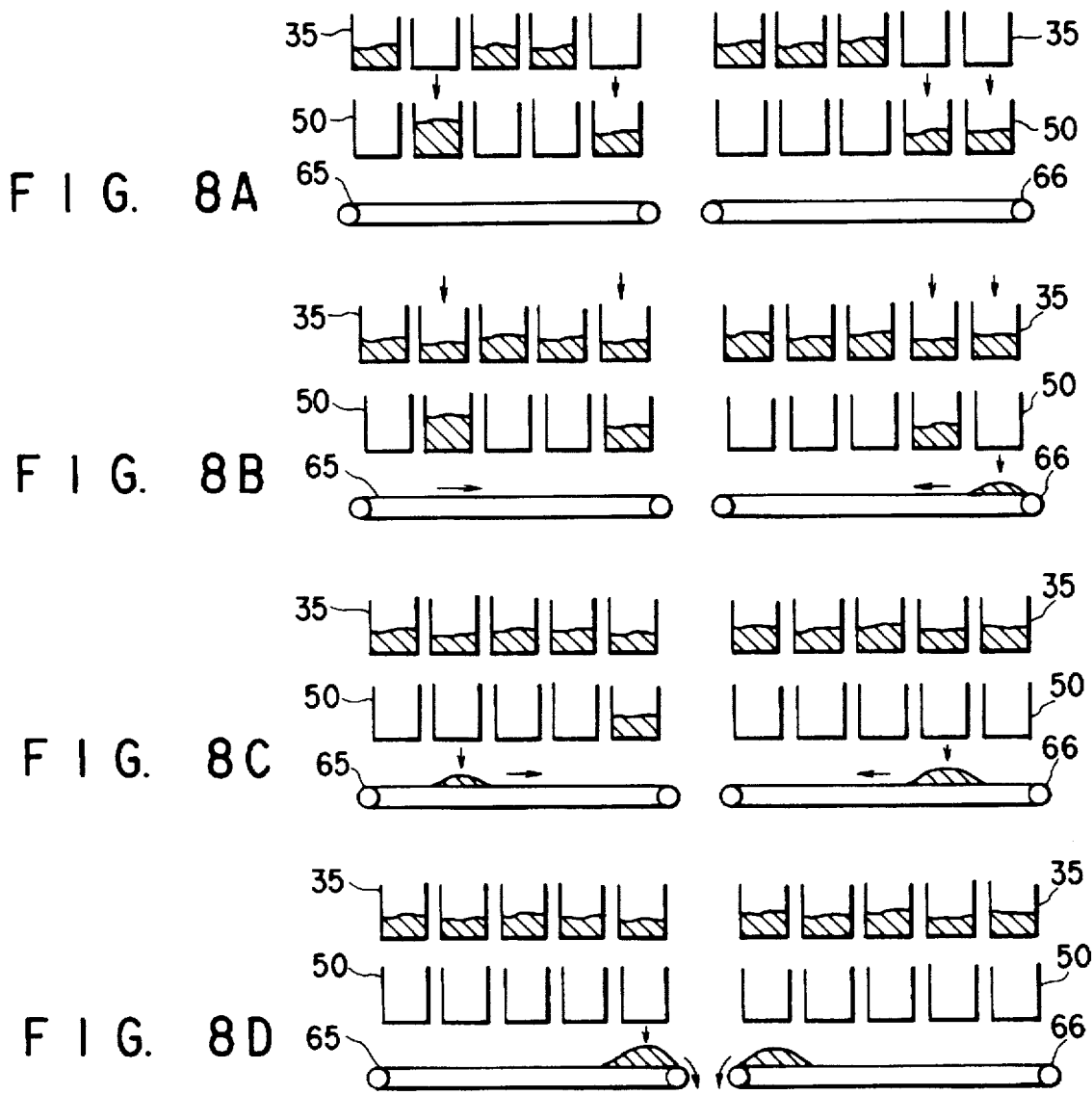

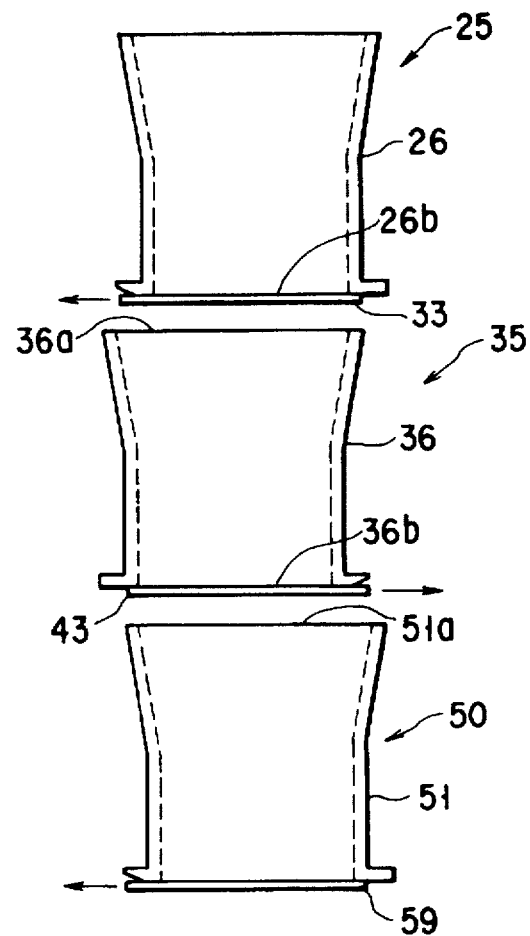
F I G. 20
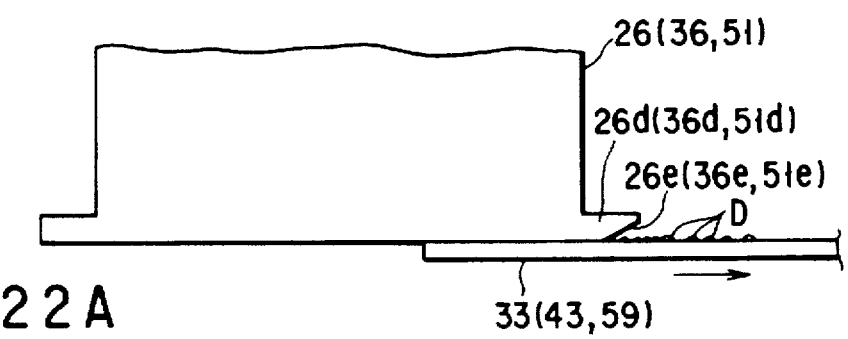
F I G. 22A
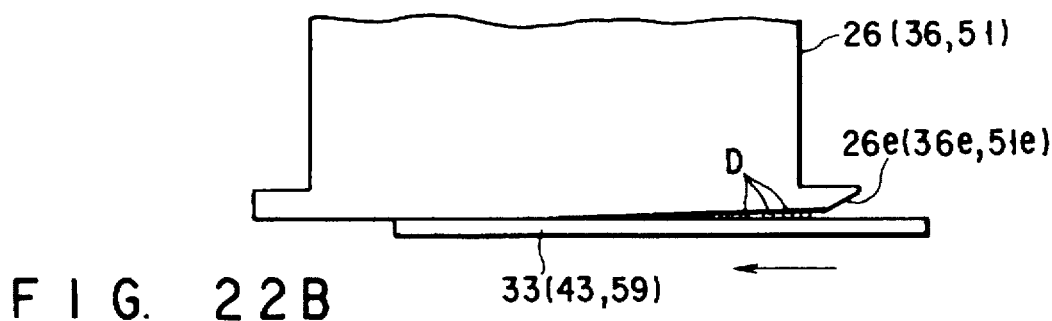
F I G. 22B

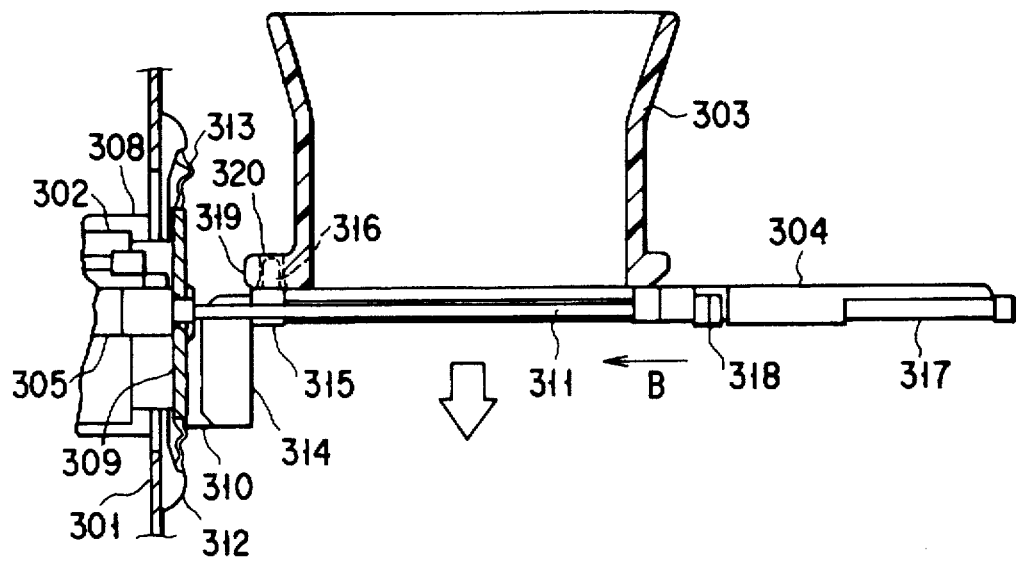
F I G. 25
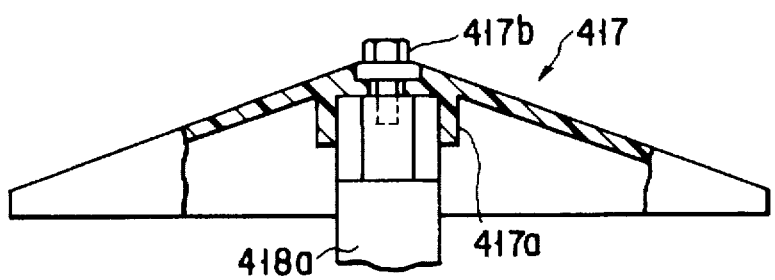
F I G. 27
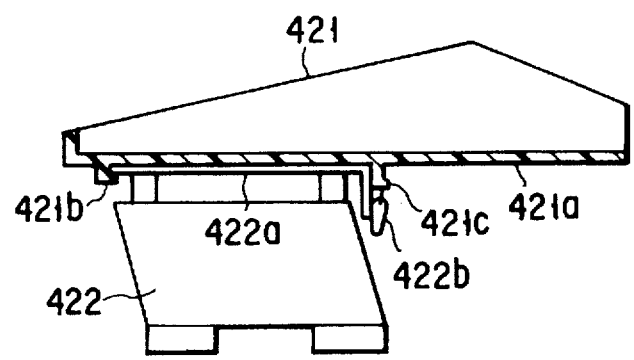
F I G. 28

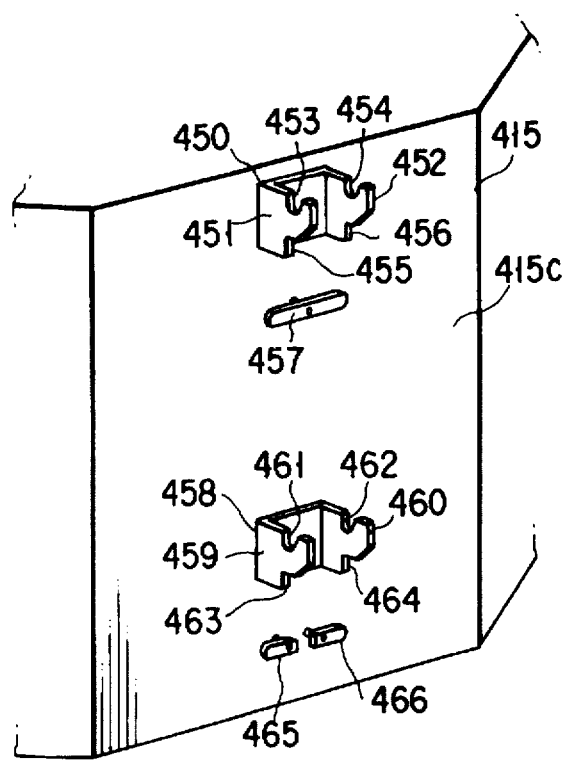
F I G. 31
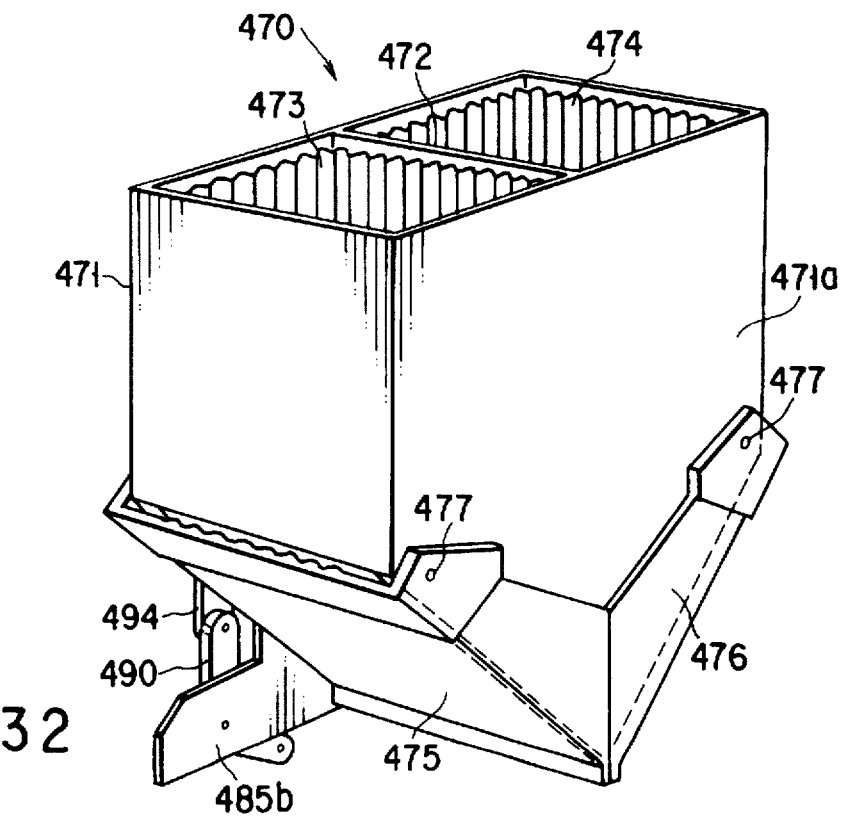
F I G. 32

COMBINED METERING APPARATUS

TECHNICAL FIELD

The present invention relates to a combined metering apparatus for metering a plurality of target metering objects supplied from a work table or the like and having varied weights, combining the target metering objects in unit target weights, and discharging the combined target metering objects and, more particularly, to a combined metering apparatus for separately measuring the weights of a plurality of target metering objects separately introduced into a plurality of metering containers by using a plurality of metering means, in particular load cells, combining the plurality of target metering objects supplied from the plurality of metering containers to have a predetermined weight after the measurement, and discharging the combined target metering objects.

BACKGROUND ART

A combined metering apparatus is conventionally used to efficiently discharge food and the like having varied weights in the form of a batch having a target weight.

Generally, in the combined metering apparatus of this type, target metering objects, e.g., food, are supplied from a plurality of pool hoppers to a plurality of metering hoppers arranged below the pool hoppers, and are metered. The combination of the target metering objects having a weight close or equal to the target weight is selected based on the metering results of the respective metering hoppers. The target metering objects selected to constitute this combination are discharged from the respective metering hoppers and are collected together.

As a method of measuring the weight of a target metering object, one is available which converts the deformation of an elastic body into a change in electric resistance. A load detector based on this principle is generally called a load cell, and is sometimes called a strain gauge type load cell.

Particularly, a load cell 200 shown in FIG. 36 is called a load beam or dual beam type load cell. This load cell 200 is suitable for measuring a small weight and has good dynamic characteristics with a simple, compact structure.

In this load cell 200, four strain gauges 202c are mounted to an elastic body (magnetostrictive body) 202d to which a load is applied. The strain gauges 202c constitute a Wheatstone bridge circuit. A mount side 202a of the elastic body 202d is fixed to the base body and a load is applied to a load side 202b. An output resulted from a change in resistance proportional to the load is detected.

As a metering apparatus utilizing a load cell, one as shown in FIG. 37 is available which is disclosed in Jpn. Pat. Appln. KOKAI Publication No. 3-123233 to the same applicant as that of this application. In this metering apparatus, the mount side of a load cell 231 is fixed to a base body 232, and one base plate 233 is mounted on the load side of the load cell 231.

A metering hopper 234 for storing and metering a target metering object, and a drive portion 236 for opening/closing a discharge door 235, through which the target metering object is stored in and discharged from the metering hopper 234, are attached to the base plate 233.

When metering a target metering object, the discharge door 235 of the metering hopper 234 is closed, and the target metering object is introduced into the metering hopper 234. When metering is ended, the discharge door 235 is opened, and the target metering object is discharged from the metering hopper 234.

Similarly, as a metering apparatus utilizing a load cell, one shown in FIG. 38 is available which is disclosed in Jpn. Pat. Appln. KOKAI Publication No. 4-363630 to the same applicant as that of this application.

In this metering apparatus, the mount side of a load cell 237 is fixed to a base body 238, and a cylindrical member 239 is mounted on the load side of the load cell 237 in place of a metering hopper having a discharge door as described above.

An opening/closing member 240 for storing and discharging the target metering object is provided under the cylindrical member 239. The opening/closing member 240 is moved in the horizontal direction by a moving mechanism 243 connected to a piston 242 of an air cylinder 241.

When metering the target metering object, the opening/closing member 240 on the lower side of the cylindrical member 239 is closed, and the target metering object is introduced into the cylindrical member 239. When metering is ended, the opening/closing member 240 is moved to open the lower side of the cylindrical member 239, so that the target metering object is discharged.

In the metering apparatus disclosed in Jpn. Pat. Appln. KOKAI No. 3-123233, as the moving direction of the drive portion 236 is the same as the load direction of the load cell 231, the opening/closing operation of the discharge door 235 of the metering hopper 234 causes the load of the load cell 231 to fluctuate.

The drive portion 236 is mounted on the load side of the load cell 231. As a tube and the like for supplying air serving as the drive source to the drive portion 236 is connected between the load side of the load cell 231 and the base body 232, when an air pressure is applied, the load of the load cell 231 is adversely affected.

In the metering apparatus disclosed in Jpn. Pat. Appln. KOKAI No. 4-36360, as the moving direction of the air cylinder 241 is perpendicular to the load direction of the load cell 237, the movement of the air cylinder 241 will not cause the load of the load cell 237 to fluctuate. When the target metering object is to be metered, however, the cylindrical member 239 and the moving mechanism 243 must be kept disconnected from each other.

More specifically, in the metering state, if the cylindrical member 239 mounted on the load side of the load cell 237 and the moving mechanism 243 mounted on the base body 238 are in contact with each other, an accurate load does not act on the load cell 237, and erroneous metering may be performed.

For this reason, the moving mechanism 243 must be able to be disconnected from the cylindrical member 239 when performing metering, leading to a complicated structure.

Regarding a hopper used in the combined metering apparatus described above, the open surface at its bottom portion is opened/closed with a pivot gate. When a target metering object containing water or oil and thus having tackiness is supplied to this hopper, even if the hopper is opened by pivoting the gate, the target metering object sometimes attaches to the gate and is not discharged, or is caught in the gate when the gate is closed.

In order to solve these problems, a combined metering apparatus is conventionally available in which each of the pool hopper and the metering hopper is constituted by a cylindrical body having upper and lower open ends and a bottom plate which is formed to be larger than the lower open surface of the cylindrical body and is slidably moved relative to the cylindrical body, thereby opening/closing the lower open surface of the cylindrical body.

FIGS. 39A, 39B, and 39C show a combined metering apparatus from a side surface. This combined metering apparatus has a hopper, the cylindrical body of which is slid with respect to the bottom plate. A cylindrical body 3 having upper and lower open ends is placed on a horizontal bottom plate 2 mounted on a front surface 1a of a housing 1 to constitute a pool hopper 4. This cylindrical body 3 is moved back and forth (in the right-to-left direction in FIGS. 39A, 39B, and 39C) by a cylinder 5 in the housing 1, thereby opening/closing the lower open surface of the cylindrical body.

A metering hopper 9 constituted by a bottom plate 7 and a cylindrical body 8 is arranged below the pool hopper 4. The bottom plate 7 is supported by a metering unit 6 (load cell) fixed to the housing 1 to extend forward from the housing 1. The cylindrical body 8 has upper and lower open ends and is placed on the bottom plate 7.

While the lower open surface of the pool hopper 4 is completely closed with the cylindrical body 8 of the metering hopper 9 and the bottom plate 7, the metering hopper 9 is located immediately under the cylindrical body 3 of the pool hopper 4 which has moved forward to a position to completely open the lower open surface. From this position, the metering hopper 9 is moved forward by a cylinder 10 in the housing 1 to open the lower open surface of the pool hopper 4.

In the combined metering apparatus having this arrangement, as shown in FIG. 39A, while target metering objects are stored in the pool hopper 4 and the metering hopper 9, assume that the target metering object in the metering hopper 9 is selected to constitute the combination. Then, as shown in FIG. 39B, the cylindrical body 8 is moved forward (to the right in FIG. 39B) by the cylinder 10 to open its lower open surface from the right to the left in FIG. 39B, and the target metering object on the bottom plate 7 is discharged downward as it is scraped by the inner left edge of the lower open surface of the cylindrical body 8. Thereafter, the cylindrical body 8 is returned to the left by the cylinder 10.

In order to supply a next target metering object to the metering hopper 9 which is emptied, the cylinder 5 is driven to move the cylindrical body 3 of the pool hopper 4 to the right, as shown in FIG. 39C, and the target metering object on the bottom plate 2 is stored in the metering hopper 9 as it is scraped with the inner left edge of the lower open surface of the cylindrical body 3.

FIGS. 40A, 40B, and 40C show an example of a combined metering apparatus in which cylindrical bodies 3 and 8 of a pool hopper 4' and a metering hopper 9' are fixed, and bottom plates 2' and 7' are moved by cylinders 5 and 10.

In this case, the cylindrical bodies 3 and 8 of the pool hopper 4' and metering hopper 9' are fixed at such positions where the lower open surface of the cylindrical body 3 coincides with the upper open surface of the cylindrical body 8.

As shown in FIG. 40A, while target metering objects are stored in the pool hopper 4' and metering hopper 9', when the target metering object in the metering hopper 9' is selected to constitute the combination, as shown in FIG. 40B, the bottom plate 7' of the metering hopper 9' is moved to the left, and the target metering object on the bottom plate 7' is discharged downward as it is scraped by the inner left edge of the cylindrical body 8. Thereafter, the bottom plate 7' is returned to the right.

In order to newly supply a target metering object in the metering hopper 9' which is emptied by this discharge, as shown in FIG. 40C, the bottom plate 2' of the pool hopper 4' is moved to the left, so that the target metering object on the bottom plate 2' is discharged into the metering hopper 9' as it is scraped by the inner left edge of the cylindrical body 3. In the metering apparatus as shown in FIGS. 40A, 40B, and 40C, the weights of the bottom plate 7' of the metering hopper 9' and the cylinder 10 and the load of the target metering object act on the metering unit 6.

In this manner, in the combined metering apparatus whose hopper is constituted by the cylindrical body having upper and lower open ends and the bottom plate which is slidably moved relative to the cylindrical body to open/close the lower open surface of the cylindrical body, since the inner wall surface of the hopper is substantially upright, the target metering object will not easily attach to it. Also, since the lower open surface of the hopper is opened/closed by the horizontal movement of the bottom plate, the target metering object on the bottom plate can be discharged as it is scraped by the lower edge of the cylindrical body, so that the target metering object having tackiness can be discharged reliably.

In recent years, in the combined metering apparatus having the above arrangement, a strong demand has arisen for more efficient discharge of the target metering object.

In order to meet this demand, the target metering object must be supplied from the pool hopper to the metering hopper at a higher speed.

Even if the moving speed of the cylindrical body or its bottom plate is simply increased, however, the lower open surface may be closed before the target metering object is completely discharged from the hopper.

Therefore, it is considered that the supply speed of the target metering object into the metering hopper be increased by overlapping the period required for closing the lower open surface of the metering hopper and the period required for opening the lower open surface of the pool hopper to supply the target metering object to the metering hopper.

In the combined metering apparatus shown in FIGS. 39A, 39B, and 39C described above, however, if the cylindrical body 3 of the pool hopper 4 is moved to the right (in the opening direction) before the cylindrical body 8 of the metering hopper 9 that has discharged the target metering object is not completely returned to the predetermined position on the bottom plate 7, the first target metering object discharged from the pool hopper 4 will undesirably fall outside the metering hopper 9.

Also, in the combined metering apparatus shown in FIGS. 40A, 40B, and 40C described above, if the bottom plate 2' of the pool hopper 4' is moved to the left (in the opening direction) before the bottom plate 7' of the metering hopper that has discharged the target metering object is not returned to the position to completely close the lower open surface of the cylindrical body 8, the first target metering object discharged from the pool hopper 4' will be undesirably discharged below the metering hopper through the interior of the metering hopper 9'.

In this manner, in the conventional combined metering apparatuses described above, the convey efficiency of the target metering object between the upper and lower hoppers cannot be further increased, and the operational efficiency of the apparatus as a whole cannot thus be increased.

A combined metering apparatus is conventionally available in which each of the pool hopper and the metering hopper is constituted by a cylindrical body having upper and lower open ends so that the target metering object received from above will not easily attach to the inner wall surface, and a bottom plate which is slidably moved while its upper surface is in contact with the lower end of this cylindrical body, thereby opening/closing the lower open surface of the cylindrical body.

FIGS. 41A, 41B, and 41C are side views schematically showing a combined metering apparatus which is constituted by such slidable hoppers.

In FIGS. 41A, 41B, and 41C, pool hoppers 2 are arranged in a horizontal array (in a direction perpendicular to the surface of the drawing) on the upper stage of the front surface of a housing 1 of the combined metering apparatus, and metering hoppers 7 are arranged below the respective pool hoppers 2.

Each pool hopper 2 is constituted by a cylindrical body 3 having an upper open surface slightly larger than its lower open surface, and a bottom plate 4 which is larger than the lower open surface and is slid back and forth with its upper surface being in contact with the lower end of the cylindrical body 3, thereby opening/closing the lower open surface of the cylindrical body 3. The cylindrical body 3 is fixed with a support member 5 at a position remote from the front surface of the housing 1 by a predetermined distance, and the bottom plate 4 is supported by a drive shaft 6a projecting from a drive unit 6 (e.g., a cylinder unit) in the housing 1.

Similarly as the pool hopper 2, each metering hopper 7 is constituted by a cylindrical body 8 having an upper open surface larger than its lower open surface, and a bottom plate 9 which is larger than the lower open surface and is slid back and forth with its upper surface being in contact with the lower end of the cylindrical body 8, thereby opening/closing the lower open surface of the cylindrical body 8.

The cylindrical body 8 is fixed by a support member 10 at a position where the center of its upper open surface coincides with the center of the lower open surface of the cylindrical body 3 of the pool hopper 2.

The bottom plate 9 is supported by a drive shaft 11a projecting from a drive unit 11 (e.g., a cylinder unit) in the housing 1.

At least the bottom plate 9 and the drive unit 11 are supported by a metering unit (not shown) provided in the housing 1, and a target metering object placed on the bottom plate 9 is detected by this metering unit.

In the combined metering apparatus having this arrangement, while target metering objects are stored in the pool hopper 2 and the metering hopper 7, as shown in FIG. 41A, when the target metering object in the metering hopper 7 is selected to constitute the combination, the bottom plate 9 of the metering hopper 7 is driven by the drive unit 11 to move backward (toward the housing 1), as shown in FIG. 41B.

Hence, the target metering object on the bottom plate 9 is discharged downward as it is scraped by the lower end portion of the inner wall of the cylindrical body 8 on the housing 1 side, and is collected by a collecting means (not shown).

When the bottom plate 9 is moved to a position to completely open the lower open surface of the cylindrical body 8 and the target metering object in the metering hopper 7 is completely discharged, the bottom plate 9 is moved forward, i.e., in a direction to separate from the front surface of the housing, thereby closing the lower open surface of the cylindrical body 8.

In order to newly supply the target metering object to the metering hopper 7 which is emptied by this discharge, the bottom plate 4 of the pool hopper 2 is moved backward, as shown in FIG. 41C.

Hence, the target metering object on the bottom plate 4 falls into the cylindrical body 8 of the metering hopper 7 below the bottom plate 4 as it is scraped by the lower end portion of the inner wall of the cylindrical body 3 on the housing 1 side, is loaded on the bottom plate 9 that closes the lower open surface of the cylindrical body 8, and is metered.

However, the combined metering apparatus constituted by the conventional slidable bottom plate type hoppers has problems as follows.

(1) When the bottom plate 4 of the upper-stage pool hopper 2 is moved in the opening direction (toward the housing 1), the target metering object on the bottom plate 4 is dragged by the bottom plate 4 to be discharged in the moving direction of the bottom plate 4 slightly obliquely. Thus, part of the target metering object on the bottom plate 4 is sometimes undesirably discharged outside the upper open surface of the cylindrical body 8 of the lower-stage metering hopper 7.

In order to solve this, the vertical gap between the lower open surface of the cylindrical body 3 of the upper-stage pool hopper 2 and the upper open surface of the cylindrical body 8 of the lower-stage metering hopper 7 may be decreased, or the ratio in size of the lower open surface of the cylindrical body 3 of the upper-stage pool hopper 2 to the upper open surface of the cylindrical body 8 of the lower-stage metering hopper 7 may be further increased.

However, the gap between the lower open surface of the upper-stage cylindrical body 3 and the upper open surface of the lower-stage cylindrical body 8 must be sufficiently large so as not to interfere with the movement of the bottom plate 4. There is a limitation to decrease this gap.

When cylindrical bodies having the same shape are employed as the pool hopper and the metering hopper, in order to further increase the ratio in size of the lower open surface of the upper-stage cylindrical body 3 to the upper open surface of the lower-stage cylindrical body 8, as described above, the ratio in size of the upper open surface to the lower open surface of the cylindrical body must be increased.

If, however, the ratio in size of the upper open surface to the lower open surface of the cylindrical body is increased, the inclination of the inner wall portion of the cylindrical body is decreased at least partially. Then, a target metering object having tackiness cannot be discharged smoothly.

When the cylindrical body 8 of the lower-stage hopper is made entirely larger than the cylindrical body 3 of the upper-stage hopper, cylindrical bodies having different shapes must be prepared for the pool hopper and the metering hopper. This leads to a considerable inconvenience in terms of component management and maintenance.

(2) In the method of slidably moving the bottom plate of each hopper by directly supporting it with the drive shaft of the drive unit, when the target metering object is stored, its load directly acts on the drive shaft. As the bottom plate vibrates vertically, the drive shaft is also vibrated. Since the movement of the drive shaft is adversely affected by the drive unit, the bottom plate cannot be moved smoothly, and the target metering object cannot be conveyed smoothly.

For this reason, if the rigidity of the bottom plate and the drive shaft is increased and the bottom plate and the drive shaft are fixed firmly, the bottom plate cannot be removed easily. Then, the bottom plate which can be soiled easily must be cleaned at the site where the metering apparatus is installed, and the type of the target metering object cannot be changed readily, leading to an inconvenience.

(3) As described above, in the combined metering apparatus having cylindrical bodies, the outer walls of which are upright down to their lower ends, as the bottom plate is moved in the opening direction, if small tailings of the target metering object attaching on the bottom plate are moved outside the cylindrical body, they are scraped by the lower end of the upright outer wall of the cylindrical body when the bottom plate closes in the closing direction. The tailings are easily deposited on the lower portion of the outer wall surface of the cylindrical body. The deposited target metering object may be dried and denatured and undesirably discharged to the lower hopper, or may fall into a hopper undergoing metering, thus causing a metering error.

In addition, in the combined metering apparatus described above, portions, e.g., the convey table of the supply unit, the hoppers, the collecting chute, and the like, which are brought into contact with the target metering object, are formed by working a stainless steel plate, and these components can be removed from the apparatus body to facilitate cleaning.

When changing the type of the target metering object, after the convey table, the hoppers, the collecting chute, and the like are removed from the entire apparatus and cleaned, they are sterilized by boiling, and are mounted into the apparatus.

However, this conventional combined metering apparatus has problems as follows.

(1) Most of the components, e.g., the supply unit, the hoppers, the collecting chute, and the like, which are brought into contact with the target metering object, are made of stainless steel which is heavy. In a combined metering apparatus that uses many hoppers in order to increase the combination precision, the weight of the entire apparatus is increased considerably.

(2) As the convey table and the gates of the hoppers are heavy, mechanisms for vibrating or opening/closing them are increased in size. This leads to a large drive energy and large noise during driving.

(3) Since the stainless steel plate is expensive itself and the convey table, the hoppers, and the collecting chute are formed by bending and welding it, the cost of the entire apparatus cannot be decreased. In particular, when the surfaces of these components that are brought into contact with the target metering object are formed with recesses and projections so that the target metering object having tackiness will not attach to them, the working cost is remarkably increased.

(4) If only cleaning at room temperature is performed, various bacteria will proliferate. Thus, sterilization by boiling is required, leading to a high cleaning cost.

For these reasons, these constituent components may be made of a synthetic resin. With the synthetic resin, however, scratches can be easily formed on the surfaces of the components. It is difficult to completely sterilize the bacteria proliferated in the scratches by cleaning at room temperature. Sterilization by boiling cannot be performed since the synthetic resin can be easily deformed at high temperatures. Thus, a serious sanitary problem arises.

DISCLOSURE OF INVENTION

The present invention has been made in order to solve the above problems, and has as its first object to provide a combined metering apparatus having high measuring precision with a simple structure.

In addition to the first object, it is the second object of the present invention to provide a combined metering apparatus in which the convey efficiency of the target metering object from the upper-stage hopper to the lower-stage hopper is increased, thereby increasing the operational efficiency.

In addition to the first object, it is the third object of the present invention to provide a combined metering apparatus capable of conveying the target metering object from the upper-stage hopper to the lower-stage hopper smoothly and reliably.

In addition to the first object, it is the fourth object of the present invention to provide a combined metering apparatus whose base body does not require interior cleaning.

According to the present invention, there is provided a combined metering apparatus comprising:

supply means for supplying target metering objects;

a plurality of pool hoppers for separately receiving the target metering objects supplied by the supply means, the plurality of pool hoppers being arranged in a horizontal direction in sets each consisting of a first cylindrical body having upper and lower open end portions, and a first bottom plate slidable to selectively open/close the lower open end portion of the first cylindrical body;

a plurality of metering hoppers for receiving the target metering objects separately falling from the plurality of pool hoppers, the plurality of metering hoppers being arranged in sets on a lower stage side of the plurality of pool hoppers to correspond thereto, each of the sets consisting of a second cylindrical body having upper and lower open end portions, and a second bottom plate slidable to selectively open/close the lower open end portion of the second cylindrical body;

a plurality of metering means provided in association with the plurality of metering hoppers to separately meter the target metering objects received in the plurality of metering hoppers and to output electric signals, each of the metering means including
  (a) a base body,
  (b) a load cell, a mount side of which is mounted on the base body,
  (c) a cylindrical member mounted on a load side of the load cell and having a receiving port at an upper portion thereof to receive the target metering object and a discharge port at a lower portion thereof to discharge the target metering object therethrough,
  (d) an opening/closing member mounted on the load side of the load cell to open/close the discharge port, and
  (e) a drive portion mounted on the load side of the load cell to drive the opening/closing member substantially horizontally;

selecting means for selecting a combination of the target metering objects providing a predetermined metered value in the plurality of metering hoppers in accordance with the electric signals from the plurality of metering means; and means for collecting and discharging the target metering objects falling from corresponding ones of the plurality of metering hoppers in accordance with the combination of the target metering objects selected by the selecting means.

According to the present invention, there is also provided a combined metering apparatus comprising:

supply means for supplying target metering objects;

a plurality of pool hoppers for separately receiving the target metering objects supplied by the supply means, the plurality of pool hoppers being arranged in a horizontal direction in sets each consisting of a first cylindrical body having upper and lower open end portions, and a first bottom plate slidable to selectively open/close the lower open end portion of the first cylindrical body;

a plurality of metering hoppers for receiving the target metering objects separately falling from the plurality of pool hoppers, the plurality of metering hoppers being arranged in sets on a lower stage side of the plurality of pool hoppers to correspond thereto, each of the sets consisting of a second cylindrical body having upper and lower open end portions, and a second bottom plate slidable to selectively open/close the lower open end portion of the second cylindrical body;

a plurality of metering means provided in association with the plurality of metering hoppers to separately meter the target metering objects received in the plurality of metering hoppers and to output electric signals;

selecting means for selecting a combination of the target metering objects providing a predetermined metered value in the plurality of metering hoppers in accordance with the electric signals from the plurality of metering means;

a plurality of timing hoppers for receiving the target metering objects falling from corresponding ones of the plurality of metering hoppers in accordance with the combination of the target metering objects selected by the selecting means, the plurality of timing hoppers being arranged in sets on a lower stage side of the plurality of metering hoppers to correspond thereto, each of the sets consisting of a third cylindrical body having upper and lower open end portions, and a third bottom plate slidable to selectively open/close the lower open end portion of the third cylindrical body at a timing delayed from opening/closing operations of other third cylindrical bodies by a predetermined period of time; and means for collecting and discharging the target metering objects falling from the plurality of timing hoppers.

BRIEF DESCRIPTION OF THE DRAWINGS

FIG. 2 is a front view of the first embodiment;

FIG. 3 is a side view of the first embodiment;

FIGS. 8A to 8D are schematic front views for explaining the overall operation of the first embodiment;

FIG. 20 is a schematic side view showing the positional relationship among hoppers that are arranged vertically;

FIGS. 22A and 22B are schematic side views for explaining the operation of the third embodiment;

FIG. 25 is a front view showing the operation of the fourth embodiment of the present invention;

FIG. 27 is a side view of a circular feeder of the fifth embodiment;

FIG. 28 is a side view of a linear feeder of the fifth embodiment;

FIG. 31 is a perspective view of the main part of the fifth embodiment;

FIG. 32 is a perspective view of a metering hopper of the fifth embodiment;

BEST MODE OF CARRYING OUT THE INVENTION

Figure 1A:
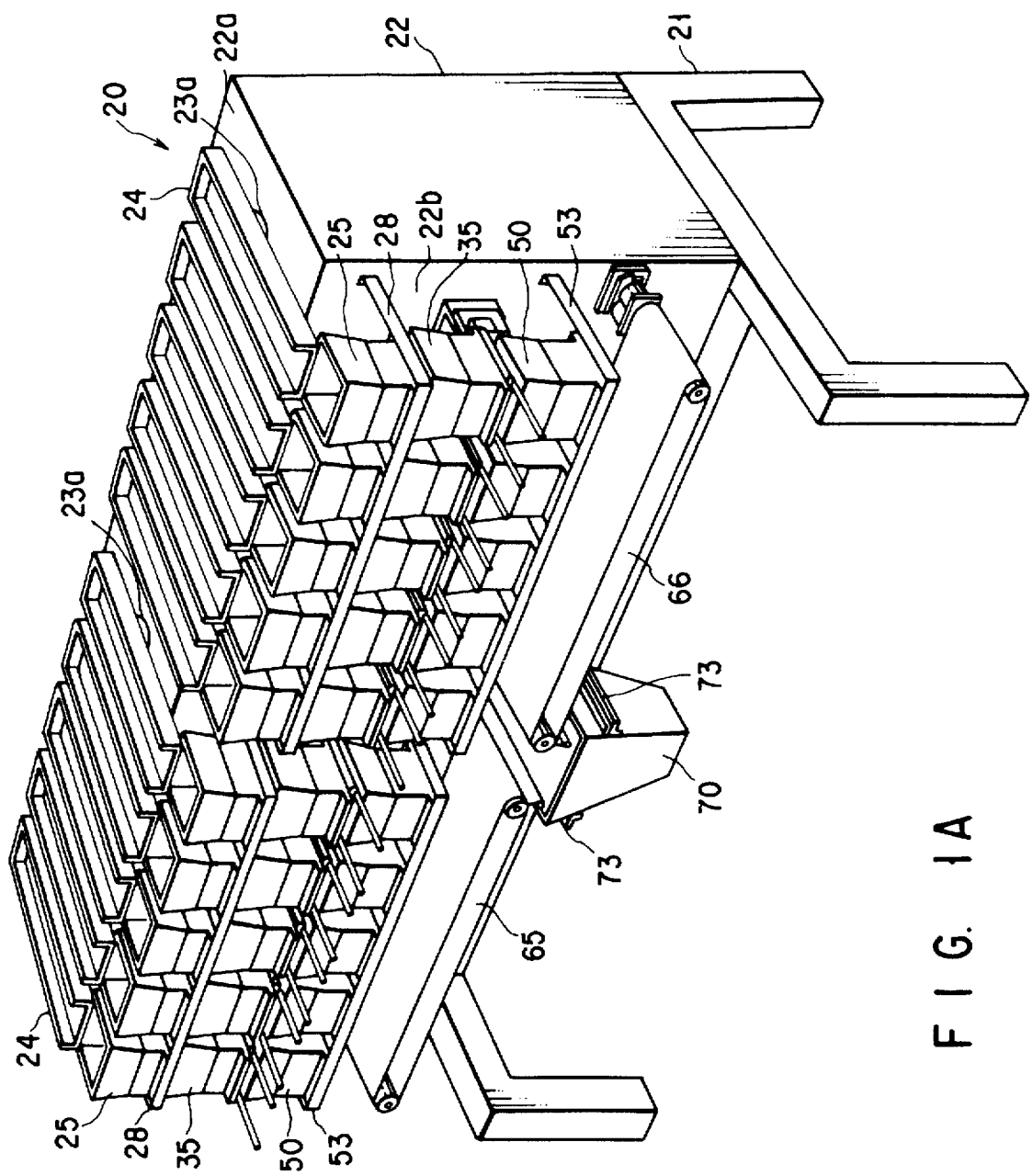
FIGS. 1A and 1B are perspective views respectively showing the outer appearances of the first embodiment and its modification of the present invention.

Several embodiments of the present invention will be described with reference to the accompanying drawings.

FIGS. 1A to 6 show the outer appearance of a combined metering apparatus 20 according to the first embodiment, which meters target metering objects having tackiness, and the schematic structures of its respective portions.

In FIGS. 1A to 6, a substantially rectangular parallelepiped housing 22 is supported on a base table 21 of the combined metering apparatus 20.

A plurality of (ten in this embodiment) electromagnetic vibrating units 23 are arranged in an array at the upper portion in the interior of the housing 22 in the widthwise direction of the housing 22, and vibrating shafts 23a of the respective vibrating units 23 project from an upper surface 22a of the housing 22.

Convey troughs 24 each formed into the shape of a gutter are mounted on the upper ends of the respective vibrating shafts 23a to be directed to the front side of the housing 22.

Figure 1B:
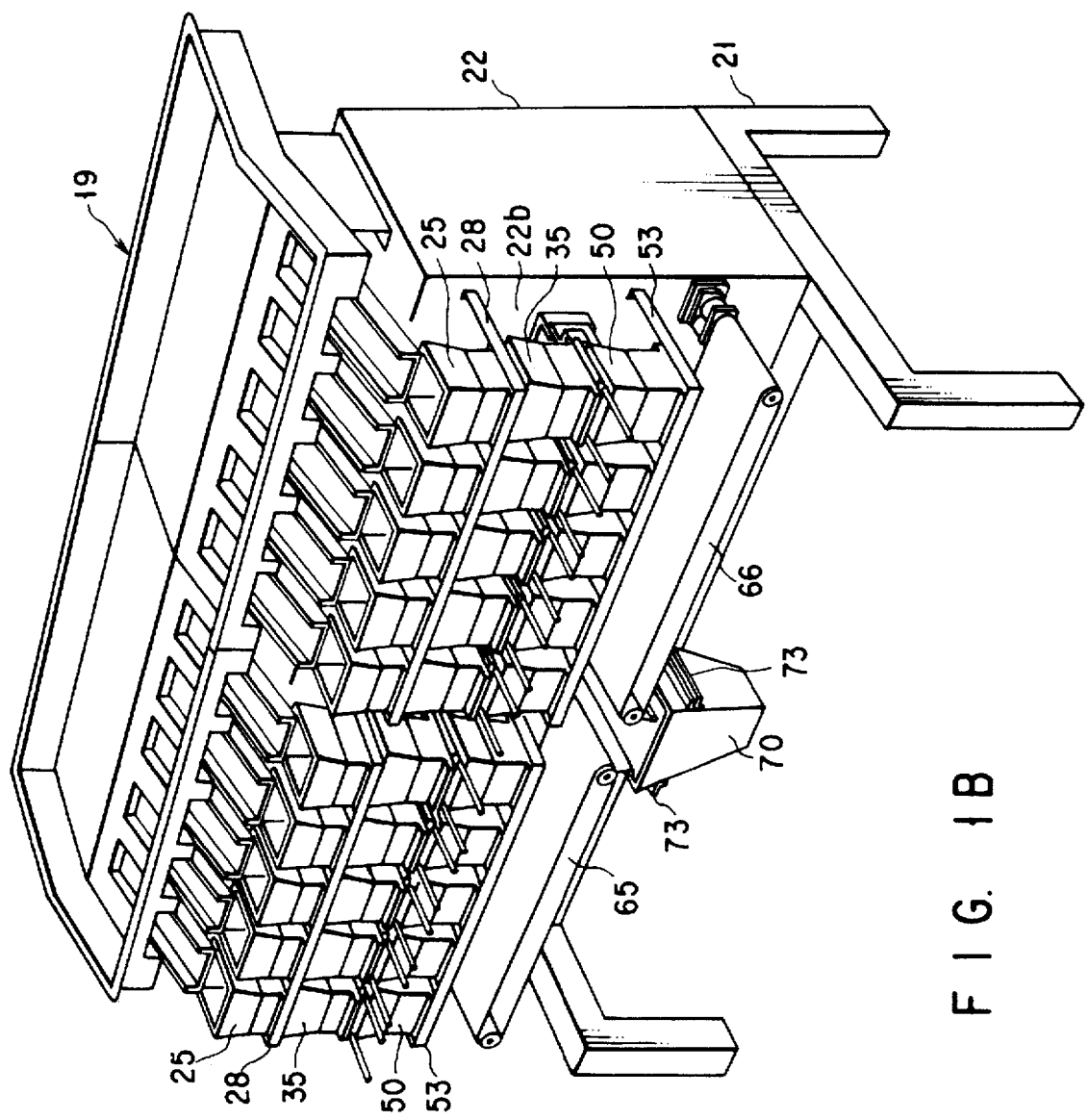

A target metering object is supplied to each convey trough 24 through a work table 19 shown in FIG. 1B, through a chute or a bucket conveyor (not shown), or manually.

Upon energization for a predetermined period of time, each vibrating unit 23 vibrates the corresponding convey trough 24 back and forth slightly upwardly with respect to the front surface side of the housing 22, to convey the target metering objects on the convey troughs 24 to the front end side by vibration.

Hollow square-cylindrical pool hoppers 25 having substantially rectangular upper and lower open ends are horizontally arranged in an array below the front ends of the respective convey troughs 24.

Figure 4:
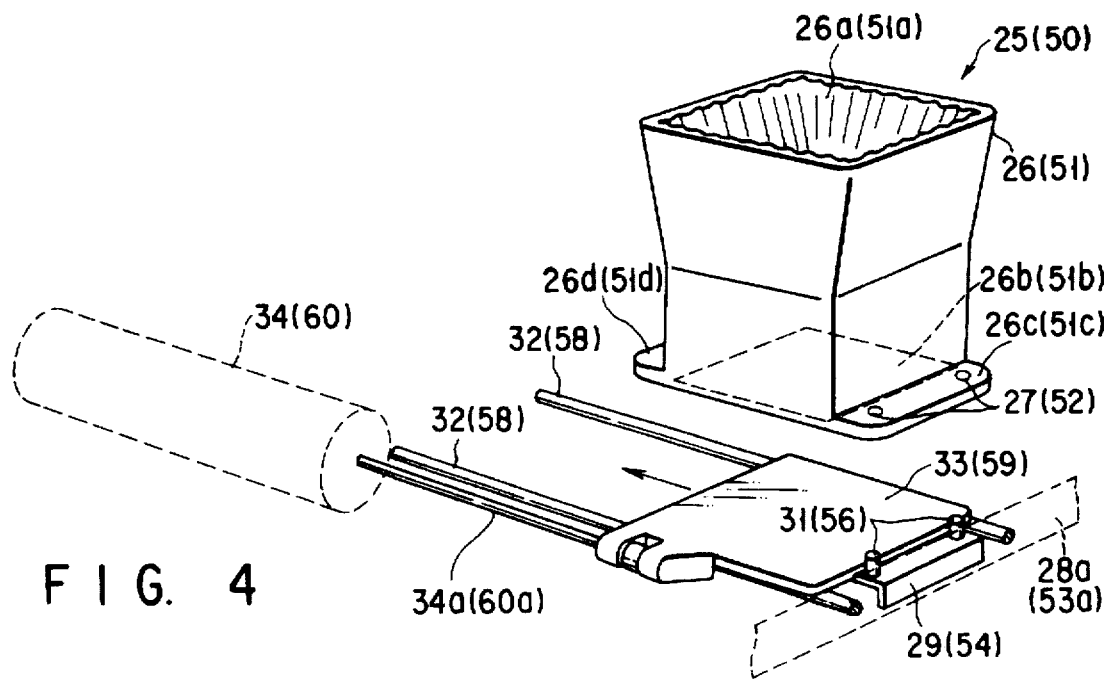
FIG. 4 is a perspective view of the main part of the first embodiment.

Each pool hopper 25 is constituted by a cylindrical body 26 made of a synthetic resin and having upper and lower open ends, and a bottom plate 33 to be described later, as shown in FIG. 4. As used throughout the specification and claims, the term cylindrical body is meant to encompass tubular members which have circular or any polygonal cross-sectional configuration, as is apparent from the drawings which show generally square cross-sectional configurations.

An upper open surface 26a of the cylindrical body 26 is formed to be slightly larger than a lower open surface 26b. Flanges 26c and 26d extend from the front and rear edges of the lower open surface 26b. Two locking holes 27 are formed in one flange 26c.

The pool hoppers 25 are supported by frames 28 mounted to the right and left portions of a front surface 22b of the housing 22.

More specifically, five pin fixing plates 29 are mounted on the inner side of a front plate 28a of each frame 28 at predetermined intervals.

Two locking pins 31 extend upright on each pin fixing plate 29 at the same gap as that of the locking holes 27 of the cylindrical body 26 of the pool hopper 25.

A pair of guide shafts 32 are bridged between the front plate 28a of the frame 28 and the front surface 22b of the housing 22 to extend parallel to each other on the two sides of each pair of locking pins 31.

A bottom plate 33 is supported on each pair of guide shafts 32.

Each bottom plate 33 is engaged with one guide shaft 32 on its lower surface side and supported to be slidable back and forth.

The cylindrical body 26 of each pool hopper 25 is supported to be placed on the bottom plate 33 such that its flange 26c where the locking holes 27 are formed faces the front, and the locking holes 27 are locked by the pair of locking pins 31.

Each bottom plate 33 is formed into a substantially rectangular shape having a size enough to close the lower open surface of the cylindrical body 26 of the pool hopper 25, and its rear portion on its one side portion is detachably coupled to the distal end of a cylinder shaft 34a projecting from the front surface 22b of the housing 22.

Each cylinder 34 provided in the housing 22 constitutes the first opening/closing drive unit of this embodiment. The cylinder 34 retracts the corresponding bottom plate 33 backward until the front end of the bottom plate 33 comes to a position below the flange 26d of the cylindrical body 26, thereby opening the lower open surface 26b of the cylindrical body 26. Inversely, the cylinder 34 pushes the bottom plate 23 forward until the front end of the bottom plate 23 comes to a position below the flange 26c of the cylindrical body 26, thereby closing the lower open surface 26b of the cylindrical body 26.

Metering hoppers 35 are horizontally arranged in an array below the respective pool hoppers 25.

Each metering hopper 35 is constituted by a cylindrical body 36 having the same shape as that of the cylindrical body 26 of the pool hopper 25, and a bottom plate 43 having the same shape as that of the bottom plate 33 of the pool hopper 25.

The cylindrical body 36 of the metering hopper 35 is supported to be aligned in the reverse direction with respect to the cylindrical body 26 of the pool hopper 25 at a position where its upper open surface 36a opposes to overlap the lower open surface 26b of the cylindrical body 26 of the pool hopper 25, so that it can receive the target metering object discharged from the cylindrical body 26 of the pool hopper 25.

Two locking holes 37 formed in one flange 36c, among flanges 36c and 36d provided on the front and rear sides of a lower open surface 36b of the cylindrical body 36, are supported by a corresponding hopper support 40 supported by the front surface 22b of the housing 22.

Two locking pins 41 are provided to project upright on the upper surface of the hopper support 40, and a pair of guide shafts 42 are mounted on the two end portions of the hopper support 40 to extend forward parallel to each other at a gap slightly larger than that of the locking pins 41.

A bottom plate 43 guided by the pair of guide shafts 42 to be slidable back and forth is supported on the pair of guide shafts 42.

The cylindrical body 36 of each metering hopper 35 is so supported as to be placed on the bottom plate 43 while its locking holes 37 are locked by the pair of locking pins 41.

Each bottom plate 43 is formed into a rectangle having a size enough to close the lower open surface of the cylindrical body 36 of the metering hopper 35, in completely the same manner as the bottom plate 33 of the pool hopper 25.

The rear portion of each bottom plate 43 on its one side portion is detachably coupled to the distal end of a cylinder shaft 44a projecting from the front surface of the housing 22.

Each cylinder 44 provided in the housing 22 constitutes the second opening/closing drive unit while the cylinder 34 that opens/closes the pool hopper 25, constitutes the first opening/closing drive unit and a cylinder 60 opens/closes a lower-stage timing hopper 50 which will be described later.

Inversely to the cylinders 34 and 60, the cylinder 44 moves the corresponding bottom plate 43 forward to open the lower open surface of the cylindrical body 36 of the corresponding metering hopper 35, and moves the corresponding bottom plate 43 backward to close the lower open surface of the cylindrical body 36 of the corresponding metering hopper 35.

Each hopper support 40 is detachably coupled to a disk-like coupling plate 45 arranged on the front surface of the housing 22 through a locking mechanism 46.

Each coupling plate 45 is supported by a load cell 47 fixed in the housing. Each cylinder 44 is also fixed to the coupling plate 45, and its cylinder shaft 44a projects ahead of the housing 22 through the coupling plate 45.

Accordingly, the weights of the metering hopper 35, the hopper support 40, the guide shafts 42, the bottom plate 43, the cylinder 44, the coupling plate 45, and the locking mechanism 46 are constantly applied to each load cell 47, and the weight of the target metering object is added to this constant load.

The timing hoppers 50 are arranged below the corresponding metering hoppers 35.

Each timing hopper 50 is constituted by a cylindrical body 51 and a bottom plate 59, in completely the same manner as the pool hopper 25. The cylindrical body 51 of the timing hopper 50 is supported on the front surface of the housing 22 to be aligned in the reverse direction with respect to the cylindrical body 36 of the metering hopper 35 (the front and rear sides of the timing hoppers 50 are aligned with those of the pool hoppers 25) at a position where its upper open surface 51a opposes to overlap the lower open surface 36b of the cylindrical body 36 of the metering hopper 35, such that it can receive the target metering object discharged from the cylindrical body 36 of the metering hopper 35.

More specifically, as shown in FIG. 4, among flanges 51c and 51d at the front and rear portions of the lower end of the cylindrical body 51 of each timing hopper 50, the flange 51c where two locking holes 52 are formed faces the front. In this state, the locking holes 52 are locked by locking pins 56 provided to project upright on a pin fixing plate 54 at the inner edge of a front plate 53a of each of frames 53 fixed to the right and left portions of the front surface 22b of the housing 22. Hence, the cylindrical body 51 of the timing hopper 50 is placed on a bottom plate 59, which is supported on a pair of guide shafts 58 provided between the front plate 53a of the frame 53 and the front surface of the housing to extend parallel to each other, and is slid back and forth.

Each bottom plate 59 is formed into a rectangle having a size enough to close the lower open surface of the timing hopper 50, and its rear portion on its one side portion is detachably coupled to the distal end of a cylinder shaft 60a projecting from the front surface of the housing 22.

Each cylinder 60 in the housing 22 constitutes the third opening/closing drive unit. Similarly to the cylinder 34 that opens/closes the pool hopper 25, the cylinder 60 retracts the corresponding cylinder shaft 60a to move the corresponding bottom plate 59 backward, thereby opening the lower open surface 51b of the cylindrical body 51 of the corresponding timing hopper 50. The cylinder also pushes the corresponding cylinder shaft 60a forward to move the corresponding bottom plate 59 forward, thereby closing the lower open surface 51b of the cylindrical body 51 of the corresponding timing hopper 50.

Two conveyors 65 and 66 are arranged left and right below the plurality of (ten in this embodiment) timing hoppers 50.

The left conveyor 65 receives the target metering objects discharged from the five left timing hoppers and conveys them to its right end.

The right conveyor 66 receives the target metering objects discharged from the five right timing hoppers and conveys them to its left end.

The two conveyors 65 and 66 are supported by the front surface 22b of the housing 22 and are respectively driven by motors 68 in the housing 22.

A funnel-shaped collecting chute 70 is supported under a portion between the two conveyors 65 and 66.

Figure 6:
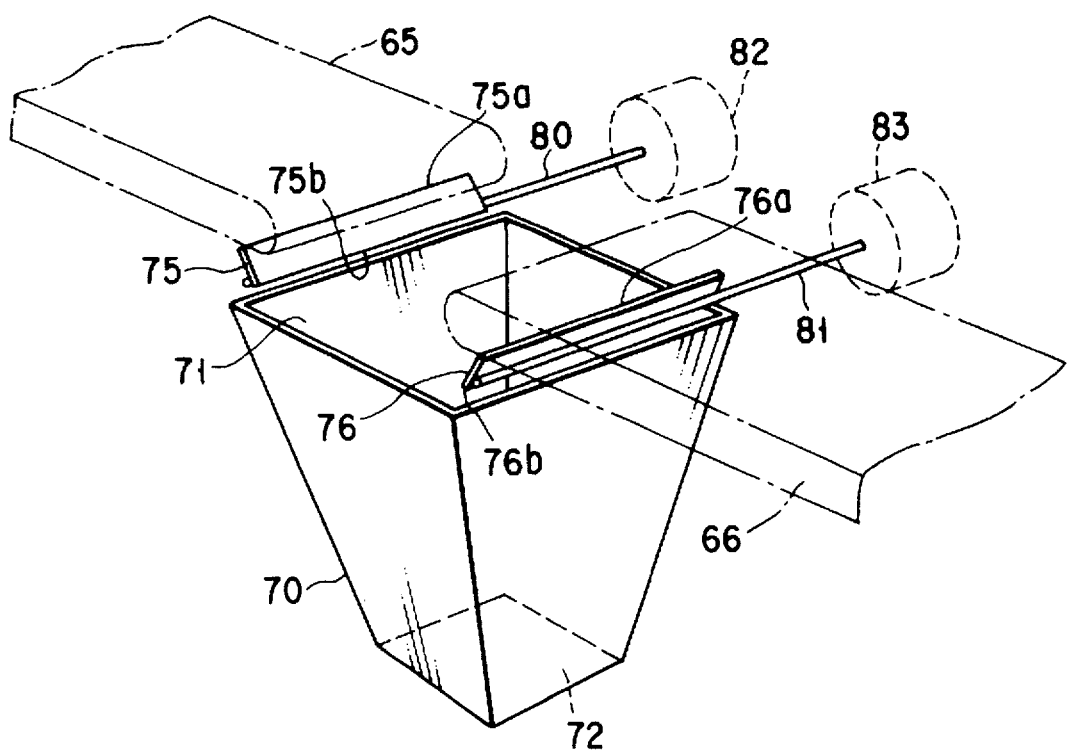
FIG. 6 is a perspective view of the main part of the first embodiment.

As shown in FIG. 6, the collecting chute 70 has, at its upper portion, a square open surface 71 of a necessary minimal size for receiving the target metering object conveyed from the ends of the conveyors 65 and 66, and a discharge port 72 at its lower portion. The collecting chute 70 has a sharply tilted inner wall surface so that the target metering object having tackiness, which is received through the open surface 71, can be discharged through the discharge port 72.

The collecting chute 70 is supported by a pair of support members 73 provided to extend from the front surface 22b of the housing 22 forward parallel to each other, such that it can be withdrawn forward.

Elongated plate-shaped return regulating plates 75 and 76 are arranged, between the left edge of the open surface 71 of the collecting chute 70 and the lower surface of the right end of the conveyor 65 and between the right edge of the open surface 71 and the lower surface of the left end of the conveyor 66, respectively, to extend in the widthwise direction of the conveyors.

The return regulating plates 75 and 76 have a shape of a thin rectangle and have a length almost equal to the width of the belts of the conveyors 65 and 66. Lower edge portions 75b and 76b of the return regulating plates 75 and 76 are respectively fixed by a pair of rotating shafts 80 and 81 projecting forward from the front surface of the housing 22 to be parallel to each other, while upper edge portions 75a and 76a of the return regulating plates 75 and 76 come close (almost in contact with) to the belts of the conveyors 65 and 66 on the lower surface side.

The rotating shafts 80 and 81 are driven by motors 82 and 83 provided in the housing 22, to pivot the return regulating plates 75 and 76 through a predetermined angle toward the inner side of the collecting chute 70, and to return them to the initial positions.

The motors 82 and 83 are driven by a control unit (to be described later) when the target metering objects on the conveyors 65 and 66 are discharged from their end portions on the collecting chute 70 side, to pivot the return regulating plates 75 and 76.

Figure 7:
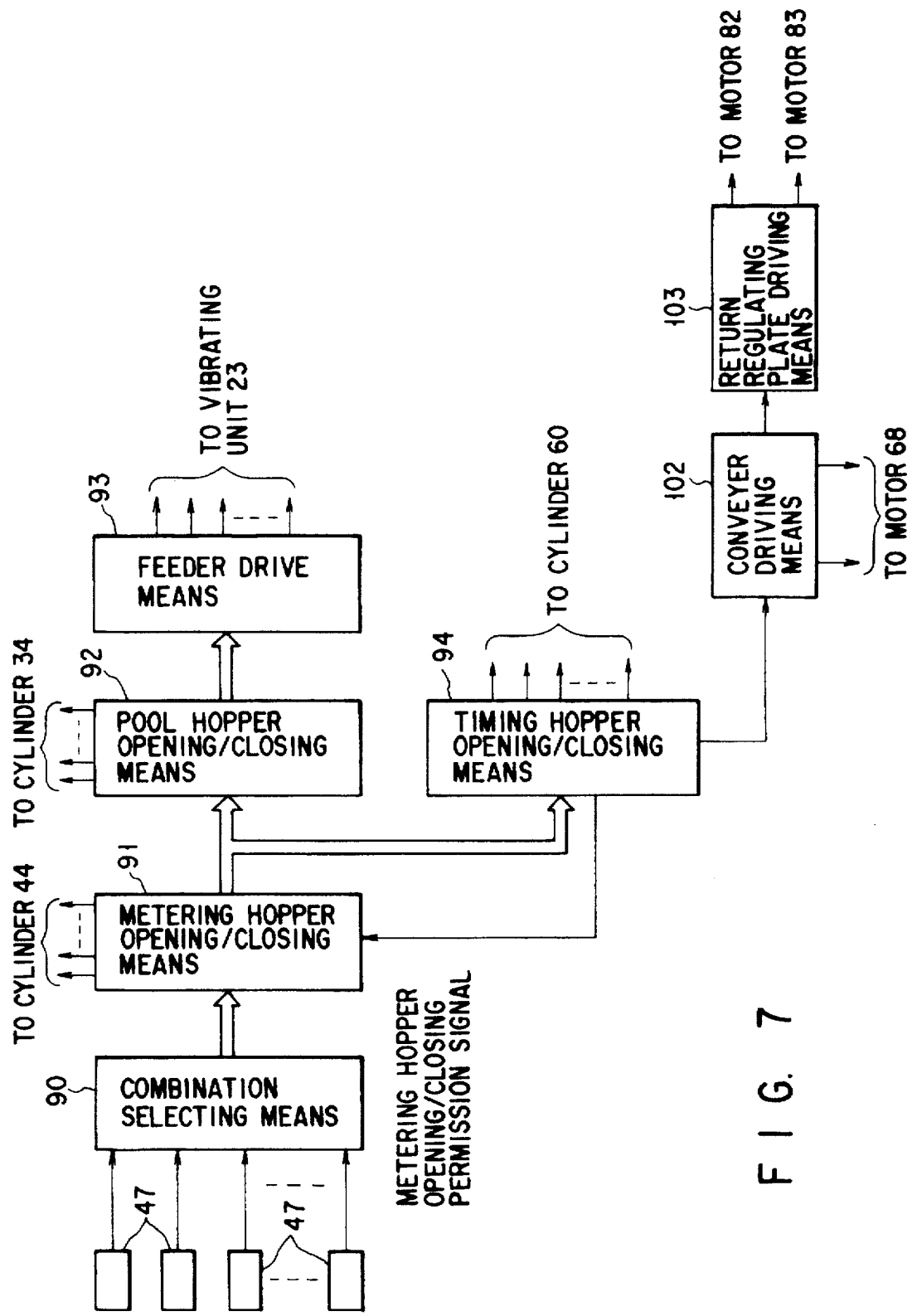
FIG. 7 is a functional block diagram showing the arrangement of a control unit of the first embodiment.

The vibrating units 23, the cylinders 34, 44 and 60, the motors 68, and the motors 82 and 83 described above are controlled by the control unit shown in FIG. 7.

More specifically, a combination selecting means 90 detects the weights of the target metering objects supplied to the respective metering hoppers from the output signals of the respective load cells 47. When the sum of the weights is close or equal to the preset target weight, the combination selecting means 90 selects this combination of the target metering objects as the target combination. The combination selecting means 90 outputs, to a metering hopper opening/closing means 91, a combination signal for specifying metering hoppers that store the target metering objects selected to constitute this combination.

The metering hopper opening/closing means 91 drives the cylinders 44 corresponding to the metering hoppers 35 specified by the combination signal almost simultaneously to move the bottom plates 43 forward, so that the lower open surfaces of the cylindrical bodies 36 of the metering hoppers 35 are opened forward from the rear side, thereby discharging the target metering objects stored in the metering hoppers 35 downward at once. Also, the metering hopper opening/closing means 91 outputs, to a pool hopper opening/closing means 92 and a timing hopper opening/ closing means 94, a metering hopper discharge signal for specifying metering hoppers that are emptied of the target metering objects upon discharge (i.e., timing hoppers that have received the target metering objects from the metering hoppers).

When the lower open surfaces of the cylindrical bodies 36 are opened completely and the target metering objects in the cylindrical bodies 36 are discharged completely, the bottom plates 43 are returned backward from the front side to close the lower open surfaces of the cylindrical bodies 36.

When the metering hopper opening/closing means 91 receives a metering hopper opening/closing permission signal from the timing hopper opening/closing means 94 (to be described later), except for the start of the operation, it opens and closes metering hoppers storing target metering objects that constitute a next combination selected by the combination selecting means 90.

After the lower open surfaces of the cylindrical bodies 36 of the metering hoppers 35 specified by the metering hopper discharge signal are opened completely and the target metering objects in the metering hoppers 35 are discharged, when the bottom plates 43 of the cylindrical bodies 36 of the metering hoppers 35 are started to return backward, the pool hopper opening/closing means 92 drives the cylinders 34 of the pool hoppers 25 corresponding to these metering hoppers almost simultaneously to start retraction of the bottom plates 33, and opens the lower open surfaces of the cylindrical bodies 36 of these pool hoppers 25 backward from the front side, thereby discharging the target metering objects stored in the cylindrical bodies 26 of the pool hoppers 25 downward.

After the lower open surfaces of the cylindrical bodies 26 are opened completely and the target metering objects in the cylindrical bodies 26 are discharged completely, the pool hopper opening/closing means 92 pushes the bottom plates 33 forward to close the lower open surfaces of the cylindrical bodies 26 forward from the rear side.

When the opening/closing operation of the bottom plate 33 is completed, the pool hopper opening/closing means 92 outputs, to a feeder drive means 93, a pool hopper discharge signal specifying pool hoppers that are emptied by this discharge.

The feeder drive means 93 drives the vibrating units 24 corresponding to the pool hoppers specified by the pool hopper discharge signal for a predetermined period of time, to supply target metering objects to the emptied pool hoppers 25.

The timing hopper opening/closing means 94 temporarily stores the metering hopper discharge signal sent from the metering hopper opening/closing means 91, starts a conveyor drive circuit 102 to drive the conveyors 65 and 66 for almost half the revolution at a predetermined speed V, and sequentially specifies, among the plurality of timing hoppers 50, the timing hoppers 50, ranging from those at the two ends farthest from the collecting chute 70 to those on the inner side that are closest to the collecting chute 70, at a time interval corresponding to the convey speed of the conveyors 65 and 66.

When the target metering object is stored in the specified timing hopper, the timing hopper opening/closing means 94 drives the cylinder 60 corresponding to this timing hopper 50 to retract its bottom plate 59, and opens the lower open surface of its cylindrical body 51 backward from the front side, thereby discharging the target metering object stored in the cylindrical body 51 onto the conveyor 65 or 66. After the lower open surface of this cylindrical body 51 is opened completely and the target metering object in the cylindrical body 51 is discharged completely, the timing hopper opening/closing means 94 pushes the bottom plate 59 forward to close the lower open surface of the cylindrical body 51 forward from the rear side.

By this opening/closing control operation of the timing hoppers 50, the target metering objects stored in the timing hoppers 50 are conveyed to the collecting chute 70 as they are gathered on the same positions of the conveyors 65 and 66.

The timing hopper opening/closing means 94 outputs the metering hopper opening/closing permission signal to the metering hopper opening/closing means 91 when the bottom plate 59 of a timing hopper closest to the collecting chute 70 is started to close.

The operation of this combined metering apparatus will be described with reference to FIGS. 8A to 8D, FIGS. 9A to 9G, and FIGS. 10A and 10B.

FIGS. 8A to 8D show the convey operation of the target metering objects (indicated by hatched portions) by the metering hoppers 35, the timing hoppers 50, and the conveyors 65 and 66.

FIGS. 9A to 9G show, from the side surface side, the operation of the bottom plates with respect to the respective cylindrical bodies of the set of pool hopper 25, the metering hopper 35, and the timing hopper 50 that are arranged vertically.

Assume that target metering objects have been supplied to all the convey troughs 24, the pool hoppers 25, and the metering hoppers 35 in advance, and that the weights of the target metering objects supplied to the metering hoppers 35 have been detected.

Among combinations of the weights, a combination which is close to or equal to the preset target weight is selected by the combination selecting means 90.

For example, if the target metering objects stored in the second, fifth, ninth, and tenth metering hoppers, when counted from the left, are selected to constitute the combination, the cylinders 44 corresponding to these metering hoppers are driven by the metering hopper opening/ closing means 91, and the target metering objects selected to constitute the combination are discharged at once into the corresponding timing hoppers 50, as shown in FIG. 8A.

Figures 9A, 9B, 9C, 9D:
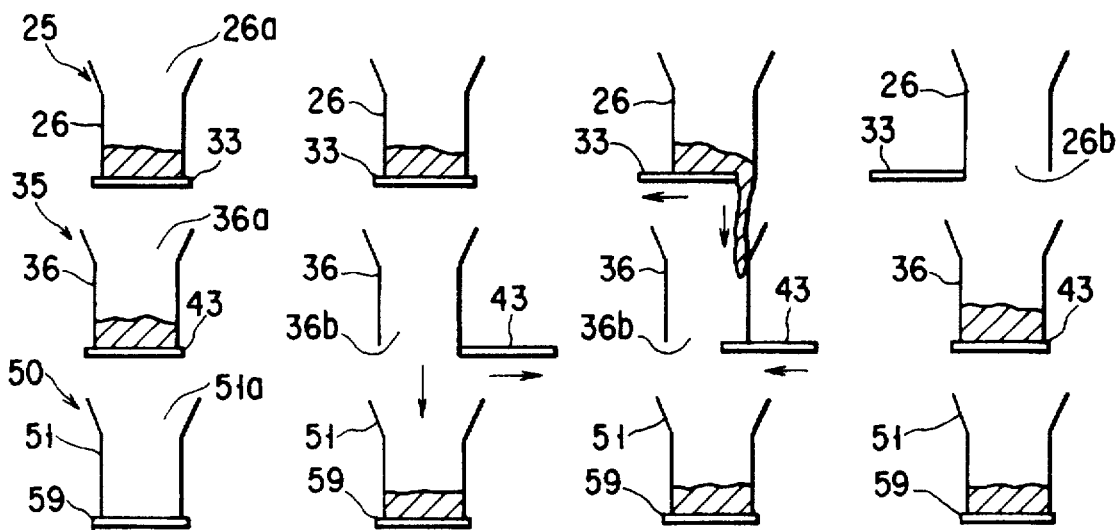
FIGS. 9A to 9G are schematic side views for explaining the operations of bottom plates of hoppers of the first embodiment that are arranged vertically.

More specifically, from a state wherein the target metering objects are stored in the pool hopper 25 and the metering hopper 35, as shown in FIG. 9A, the bottom plate 43 of the metering hopper 35 is pushed forward (to the right in FIG. 9A) to open the lower open surface 36b of the cylindrical body 36 forward from the rear side (from the left in FIG. 9A), and the target metering object falls to be stored in the lower-stage timing hopper 50, the upper open surface 51a of which coincides with the lower open surface 36b of the cylindrical body 36.

As shown in FIG. 9B, when the bottom plate 43 of the metering hopper 35 is moved to a position to open the lower open surface 36b of the cylindrical body 36 completely, the target metering object stored in the cylindrical body 36 is discharged completely, and is stored in the lower-stage timing hopper 50.

When the target metering objects selected to constitute the combination are stored in the timing hoppers 50 from the respective metering hoppers 35 in this manner, as shown in FIG. 8B, the target metering objects are supplied to the second, fifth, ninth, and tenth emptied metering hoppers 35, when counted from the left, from the corresponding pool hoppers 25.

This supply operation is started simultaneously when the bottom plate 43 of the metering hopper 35 is started to return.

More specifically, as shown in FIG. 9B, when the lower open surface 36b of the cylindrical body 36 of the metering hopper 35 is opened completely and the target metering object is discharged completely, as shown in FIG. 9C, the bottom plate 43 is retracted to close the lower open surface 36b of the cylindrical body 36 backward from the front side. Almost in synchronism with the return movement of the bottom plate 43, the bottom plate 33 of the upper-stage pool hopper 25 is retracted to open the lower open surface 26b of the cylindrical body 26 backward from the front side.

Therefore, the first part of the target metering object in the cylindrical body 26 of the pool hopper 25, which falls through the gap between the front end of the bottom plate 33 and the front end of the lower open surface 26b of the cylindrical body 26 falls along the front end-side inner wall of the cylindrical body 36 of the lower-stage metering hopper 35. Thus, this target metering object is placed on the bottom plate 43 that closes the lower open surface 36b of the cylindrical body 36 from the front side, and will not fall through the gap between the lower open surface 36b of the cylindrical body 36 and the rear end of the bottom plate 43.

As shown in FIG. 9D, when the bottom plate 43 of the metering hopper 35 is moved to a position to completely close the lower open surface 36b of the cylindrical body 36, the bottom plate 33 of the upper-stage pool hopper 25 is also moved to a position to completely open the lower open surface 26b of the cylindrical body 26, so that the target metering object in the cylindrical body 26 is discharged completely.

Figures 9E, 9F, 9G:
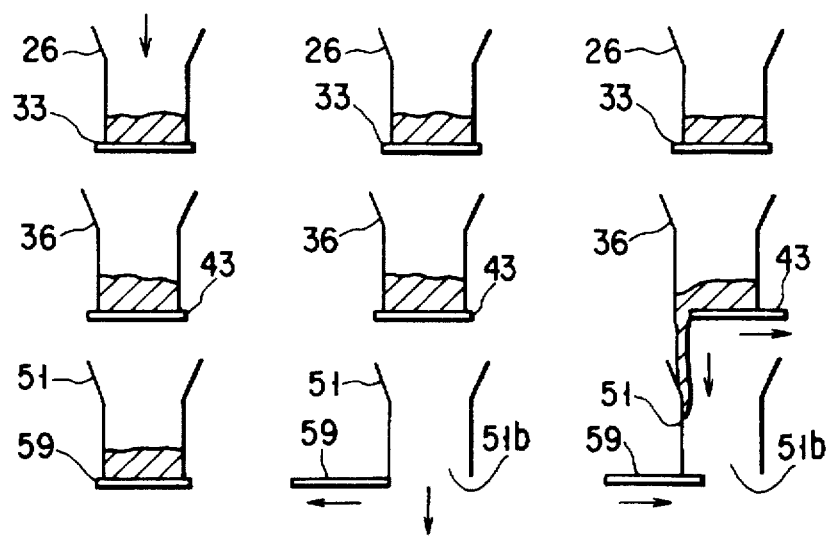

Then, after the bottom plate 33 of the pool hopper 25 is driven forward to close the lower open surface 26b of the cylindrical body 26, the vibrating unit 23 is driven, so that the target metering object is newly supplied from the convey trough 24 to the emptied pool hopper 35, as shown in FIG. 9E.

While the target metering objects are supplied from the pool hoppers 25 to the emptied metering hoppers 35 and the target metering objects are supplied from the convey troughs 24 to the emptied pool hoppers 25 in this manner, the conveyors 65 and 66 are driven, the timing hoppers are sequentially specified starting from the one farthest from the collecting chute 70, and the target metering objects in the specified timing hoppers are discharged onto the conveyors 65 and 66.

More specifically, of the timing hoppers 50 at the two ends that are specified first, the timing hopper 50 at the right end (tenth from the left) storing the target metering object is opened and closed, and the target metering object in it is discharged onto the conveyor 66, as shown in FIG. 8B. When this target metering object is conveyed to just below the ninth timing hopper 50 counted from the left, the second and ninth timing hoppers 50 counted from the left are specified, and the target metering objects stored in these timing hoppers 50 are respectively discharged onto the conveyors 65 and 66, as shown in FIG. 8C.

Therefore, the target metering object discharged from the ninth timing hopper 50 counted from the left is conveyed toward the collecting chute 70 as it is stacked on the target metering object discharged from the tenth timing hopper 50 counted from the left and conveyed by the conveyor 66.

When the target metering objects on the conveyors 65 and 66 are conveyed until the fifth and sixth timing hoppers 50 counted from the left, which are the closest to the collecting chute 70, are opened and closed, these two timing hoppers 50 are specified, and the fifth timing hopper 50 from the left is opened and closed.

Therefore, the target metering object discharged from the fifth timing hopper 50 counted from the left is conveyed toward the collecting chute 70 as it is stacked on the target metering object discharged from the second timing hopper 50 counted from the left and conveyed by the conveyor 65.

A next combination is selected by the combination selecting means 90 while the target metering objects are discharged from the respective timing hoppers 50 and are conveyed by the conveyors 65 and 66 as well.

Assume that the target metering object in the fourth metering hopper 35 counted from the left, which is the closest to the collecting chute 70, is selected again to constitute the combination. As shown in FIG. 9F, after the bottom plate 59 of the timing hopper 50 closest to the collecting chute 70 is opened and the target metering object in the cylindrical body 51 (the target metering object selected by the previous combination selection) is discharged completely, as shown in FIG. 9G, the bottom plate 59 is started to return forward. Almost in synchronism with this 77 return, the bottom plate 43 of the upper-stage metering hopper 35 is started to move forward, thereby discharging the target metering object in the cylindrical body 35.

In this case, in the same manner as in the supply operation from the pool hopper 25 to the metering hopper 35 described above, the first part of the target metering object in the cylindrical body 36 of the pool hopper 35, which falls through the gap between the rear end of the bottom plate 43 and the rear end of the lower open surface 36b of the cylindrical body 36 falls along the rear end-side inner wall of the cylindrical body 51 of the lower-stage timing hopper 50. Thus, this target metering object is placed on the bottom plate 59 that closes the lower open surface 51b of the cylindrical body 51 from the rear side, and will not fall through the gap between the lower open surface 51b of the cylindrical body 51 and the front end of the bottom plate 59.

When the bottom plate 59 of the timing hopper 50 is moved to a position to completely close the lower open surface 51b of the cylindrical body 51, the bottom plate 43 of the metering hopper 35 is moved to a position to completely open the lower open surface 36b of the cylindrical body 36. After the target metering object in the cylindrical body 36 is discharged completely, when the bottom plate 43 is started to return backward, as shown in FIG. 9C, the bottom plate 33 of the upper-stage pool hopper 25 is started to open, thereby starting supply of the next target metering object.

Figure 10A:
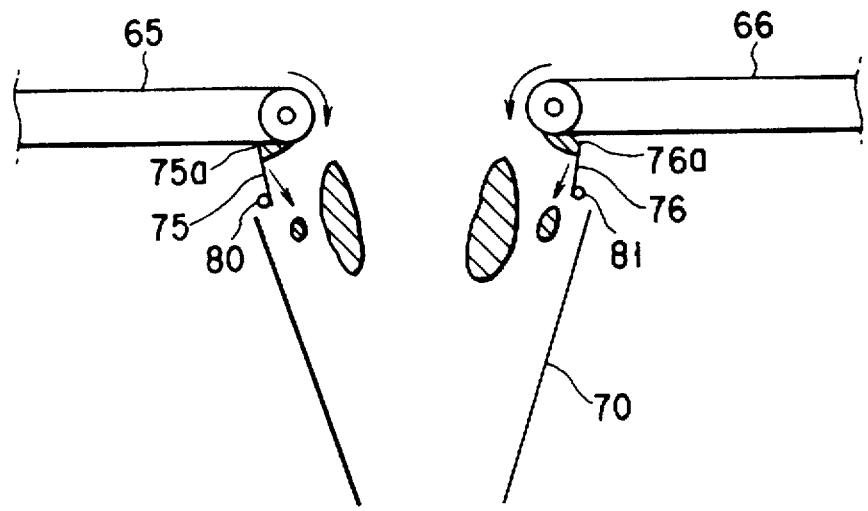
FIGS. 10A and 10B are schematic diagrams for explaining the collecting/discharging operation of the first embodiment.

Most of the target metering objects that are gathered on the conveyors 65 and 66 and conveyed to the collecting chute 70 are unloaded from the ends of the conveyors 65 and 66 to fall into the collecting chute 70. Meanwhile, same of the target metering objects stick to the belt surfaces of the conveyors 65 and 66 due to their tackiness and go round to the lower surfaces, as shown in FIG. 10A.

However, as the upper edge portions 75a and 76a of the return regulating plate 75 and 76 are located at positions where they are almost in contact with the belts on the lower surfaces of the conveyors, the target metering objects that have gone round to the lower surfaces of the belts are scraped from the belts to fall into the collecting chute 70.

Figure 10B:
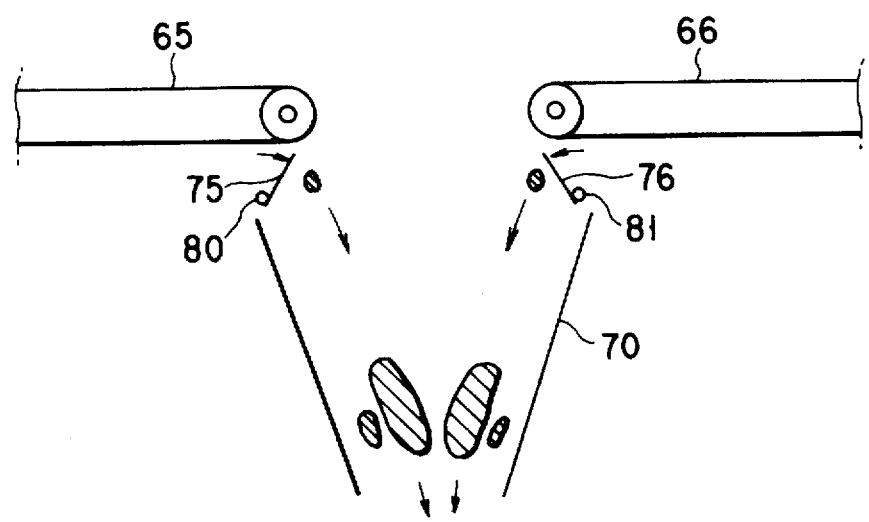

When the drive of the conveyors 65 and 66 by a half revolution is completed, as shown in FIG. 10B, the motors 82 and 83 are driven almost simultaneously to rotate the return regulating plates 75 and 76 through a predetermined angle toward the inner side of the collecting chute 70, thereby returning them to the initial position. Then, the target metering objects attaching to the return regulating plates 75 and 76 also fall into the collecting chute 70.

Therefore, the target metering objects selected to constitute the combination do not remain on the conveyors 65 and 66 or fall outside the collecting chute 70, but are entirely discharged into the collecting chute 70 and are discharged through the discharge port 72.

Thereafter, of the target metering objects supplied from the uppermost-stage pool hoppers 25 to the middle-stage metering hoppers 35, those selected to constitute the combination based on their weights are discharged to the lowermost-stage timing hoppers 50, and are discharged from the respective timing hoppers 50 into the conveyors 65 and 66, in the same manner as described above.

In this manner, in the combined metering apparatus of this embodiment, the direction in which the lower open surface of the cylindrical body of the upper-stage hopper is opened and the direction in which the lower open surface of the cylindrical body of the lower-stage hopper is closed are set the same, and the operation of closing the lower-stage hopper and the operation of opening the upper-stage hopper are performed almost simultaneously. Therefore, the convey efficiency of the target metering object from the upper-stage hopper to the lower-stage hopper can be increased remarkably.

In this embodiment, three vertical stages of hoppers are constituted by the pool hoppers 25, the metering hoppers 35, and the timing hoppers 50. The target metering objects are conveyed from the uppermost-stage pool hoppers 25 to the middle-stage metering hoppers 35 and weighed. The target metering objects selected to constitute the combination are conveyed from the metering hoppers to the lowermost-stage timing hoppers 50 and are discharged onto the conveyors. However, the present invention can similarly be applied to a combined metering apparatus which is constituted by two stages of pool hoppers and metering hoppers without timing hoppers, or by four or more stages of hoppers.

In the above embodiment, the bottom plates of the respective hoppers are moved in a direction perpendicular to the direction along which the hoppers of the respective stages are aligned (in a direction perpendicular to the front surface of the housing 22). However, the bottom plates of the respective hoppers may be moved in a direction along which the hoppers of the respective stages are aligned (to be parallel to the front surface of the housing 22).

In the above embodiment, with regard to the pool hoppers and the metering hoppers that are arranged vertically, assuming that the forward direction (a direction to separate from the front surface of the housing) is defined as the first direction and that the backward direction (a direction to be close to the front surface of the housing) is defined as the second direction, when the bottom plates of the metering hoppers are moved in the second direction, the bottom plates of the pool hoppers are also moved in the second direction almost in synchronism with the movement of the bottom plates of the metering hoppers. However, the backward direction (a direction to be close to the front surface of the housing) may be defined as the first direction, and the forward direction (a direction to separate from the front surface of the housing) may be defined as the second direction, just like the relationship between the metering hoppers and the timing hoppers.

As described above, in the combined metering apparatus according to the first embodiment of the present invention, with regard to the hoppers that are vertically adjacent to each other, the direction in which the lower open surface of the cylindrical body of the upper-stage hopper is opened and the direction in which the lower open surface of the cylindrical body of the lower-stage hopper is closed are set the same. Also, when the bottom plate of the lower-stage hopper is moved in a direction to close the lower open surface of the corresponding cylindrical body, the bottom plate of the upper-stage hopper is moved in the same direction in almost synchronism with the movement of the bottom plate of the lower-stage plate, thereby opening the lower open surface of the cylindrical body of the upper-stage hopper. Therefore, the convey efficiency of the target metering object from the upper-stage hopper to the lower-stage hopper can be increased remarkably, thereby improving the operational efficiency of the entire apparatus.

Therefore, according to the first embodiment as described above, the combined metering apparatus having an improved operational efficiency can be provided by increasing the convey efficiency of the target metering object from the upper-stage hopper to the lower-stage hopper.

The second embodiment of the present invention will be described with reference to the accompanying drawings.

Figure 11:
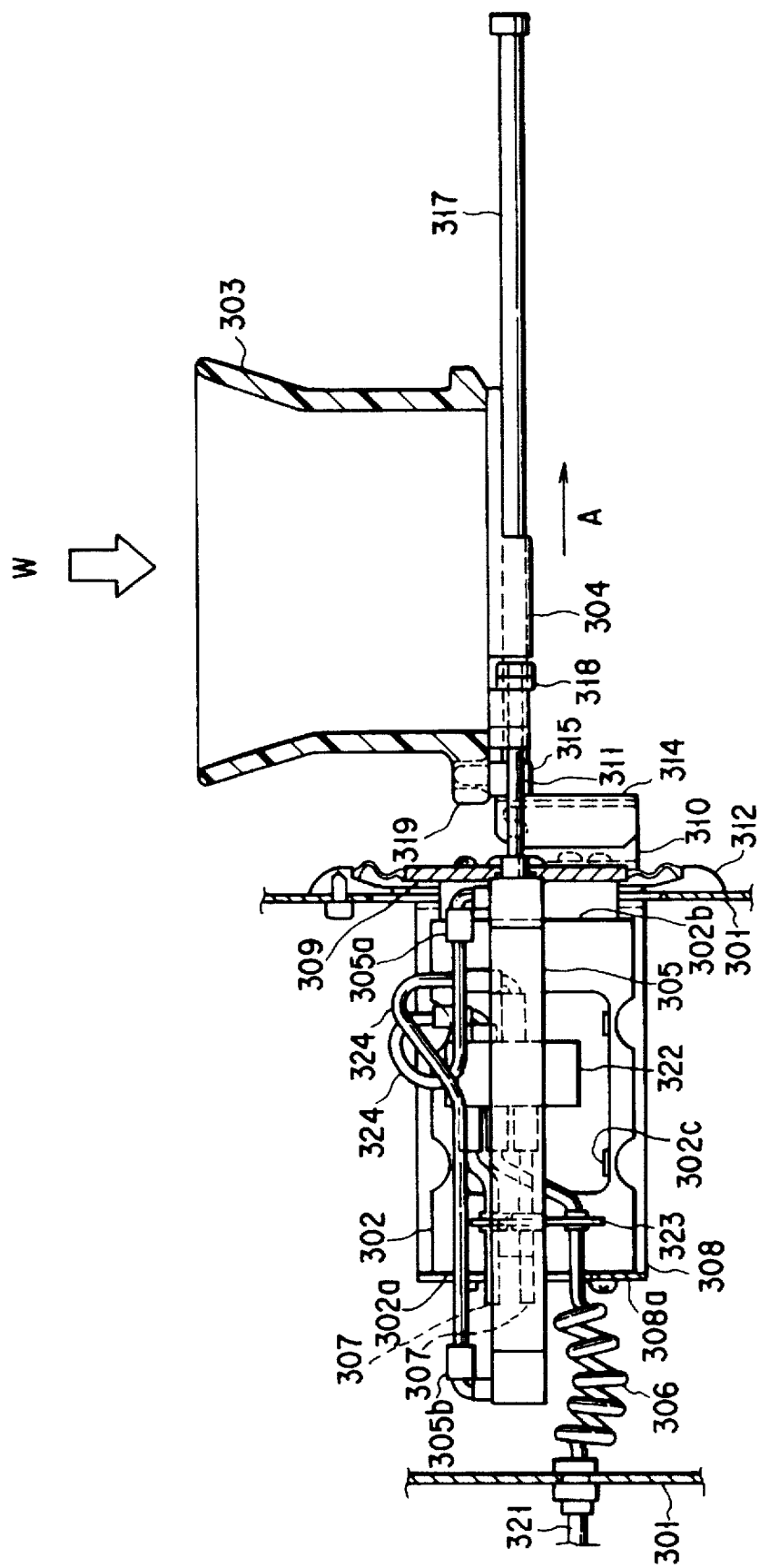
FIG. 11 is a front view showing the main part of the second embodiment of the present invention.
Figure 12:
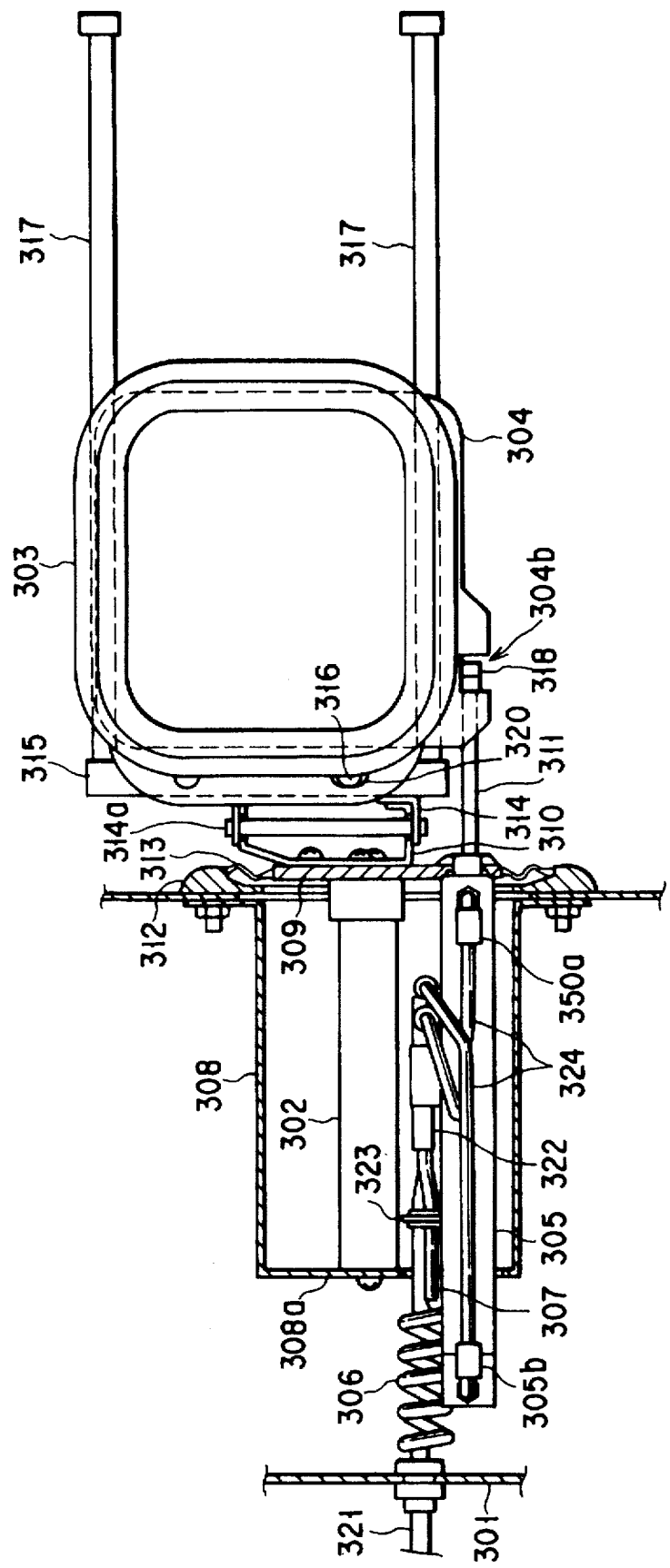
FIG. 12 is a plan view showing the main part of the second embodiment.
Figure 14:
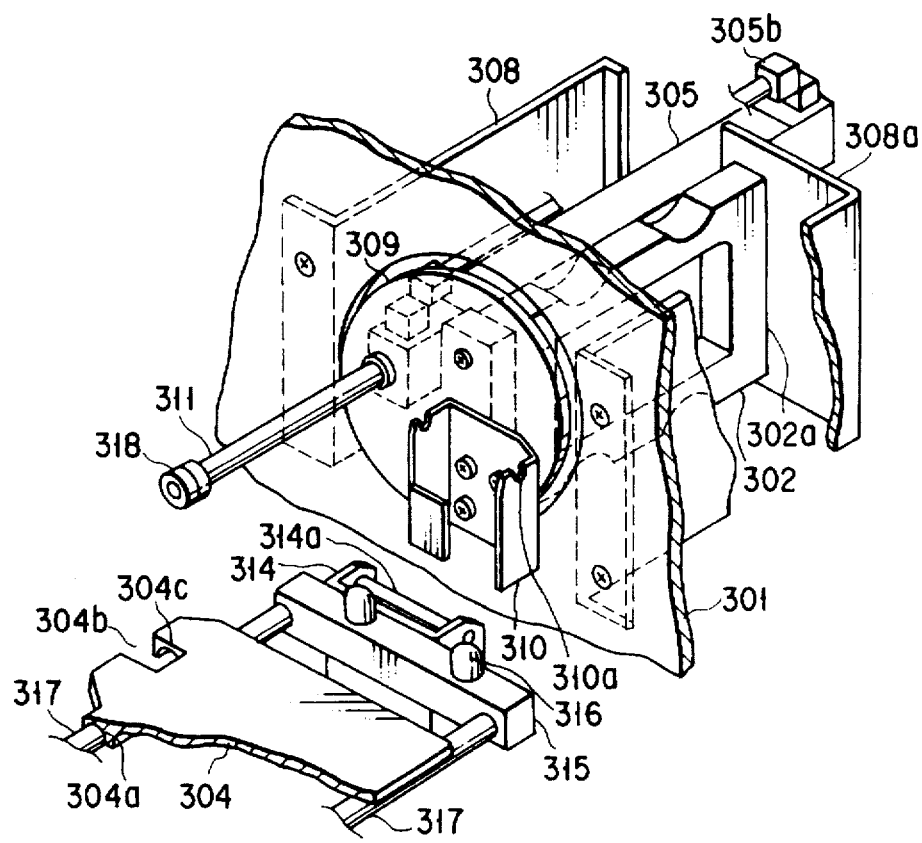
FIG. 14 is a perspective view showing the main part of the second embodiment.

FIG. 11 is a front view of only the main part of FIGS. 1A and 1B as the second embodiment of the present invention. FIG. 12 is a plan view of the same, and FIG. 14 is a perspective view of the same.

A channel-like mount plate 308 is mounted inside a base body 301 serving as part of the housing 22 shown in FIGS. 1A and 1B.

A mount side 302a of a load cell 302 is fixed to a projecting portion 308a of the mount plate 308.

Figure 5:
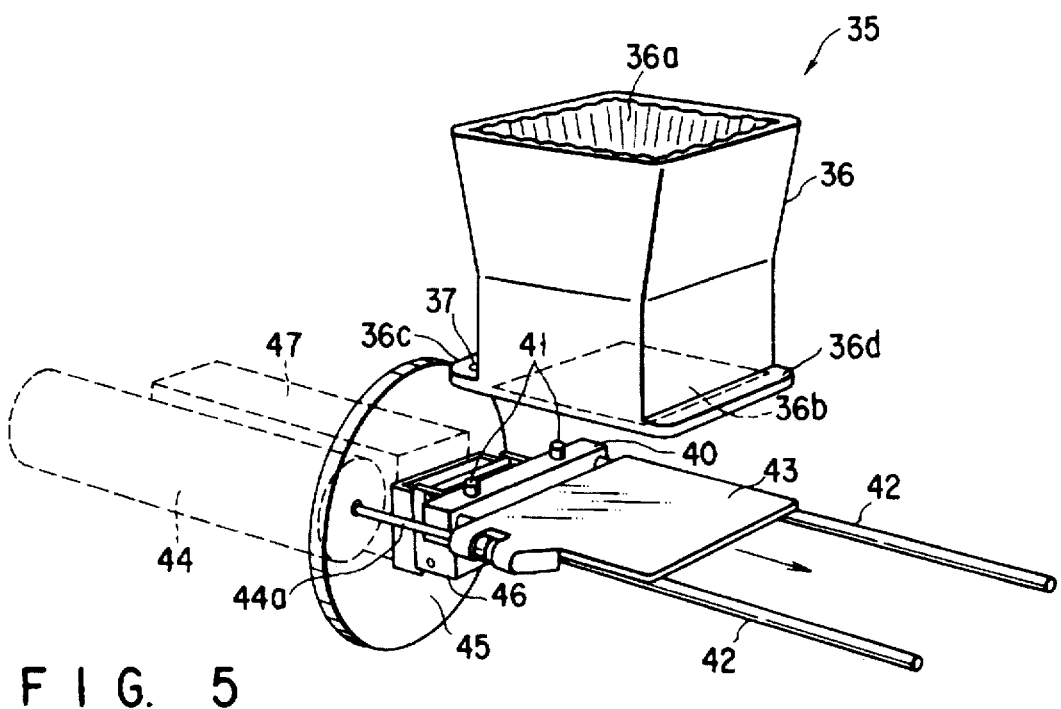
FIG. 5 is a perspective view of the main part of the first embodiment.

The depth and length of the mount plate 308 are set such that a load side 302b of the load cell 302 corresponding to the load cell 47 shown in FIG. 5 projects slightly from the front surface of the base body 1.

For this purpose, the base body 1 is punched circularly, and the load side 302b of the load cell 302 projects to the front surface side.

A disk-like panel 309 having a diameter slightly smaller than that of the circle punched in the base body 301 is mounted on the projecting load side 302b of the load cell 302.

A channel-like support member 310 is fixed to the front surface of the panel 309.

Upwardly open notches 310a are formed in the upper ends of the two sides of the support member 10.

An air cylinder 305 is mounted inside the panel 309, and its piston 311 is moved reciprocally on the front surface of the panel 309.

More specifically, the mount side 302a of the load cell 302 is fixed to the base body 301, and the support member 310, to which a load is applied, and the air cylinder 305 are mounted on the load side 302b of the load cell 302 through the panel 309.

A decoration panel 312 is mounted to surround the circular punched hole of the base body 301, and a bellows 313 made of rubber is provided to close the gap between the decoration panel 312 and the panel 309.

A hanging member 314 has the shape of a channel, and a round rod 314a is provided to extend between the two opposing sides of the hanging member 314.

A square rod-shaped fixing block 315 is mounted on the one side of the hanging member 314.

Two guide pins 316 are mounted on the upper surface of the fixing block 315.

Round rod-shaped guide rails 317 are fixed on a surface of the fixing block 315 opposing the hanging member 314 at portions close to the two end faces of the fixing block 315 in the cantilevered manner.

An opening/closing member 304 has the shape of a substantially square flat plate, and is placed on the two guide rails 317.

Regarding the shape of the opening/closing member 4, its one side which is placed on one guide rail 317 has the shape of a flat plate, and a semicircular groove 304a is formed in the lower surface of its other side which is placed on the other guide rail 317 to match the shape of the guide rail 317.

Hence, the opening/closing member 304 can slide on the guide rails 317.

Part of the side surface of the opening/closing member 304 where the semicircular groove 304a is formed extends, and a notched portion 304b is formed in this extension so as to lock a lock nut 318 mounted on the distal end of the piston 311 of the air cylinder 305.

A semicircular groove 304c is formed in the lower surface of the opening/closing member 304 to be engageable with the piston 311.

A cylindrical member 303 corresponding to the metering hopper 35 of the first embodiment has a substantially square outer shape, and its upper opening portion is wider than its lower opening portion. A flange 319 is formed on one outer side of this lower opening portion, and two guide holes 320 are formed in the flange 319.

By utilizing the guide holes 320, the cylindrical member 303 is placed on the fixing block 315 such that its guide holes 320 are fitted with the guide pins 316 provided to the fixing block 315. Accordingly, the bottom surface of the cylindrical member 303 is brought into contact with the upper surface of the opening/closing member 304.

Regarding supply/discharge of air used for driving the air cylinder 305, first, an air supply unit (not shown) and the base body 301 are connected through an air supply pipe 321.

A flexible tube 306 (e.g., a spiral tube made of a resin is preferable) is connected between the air supply pipe 321 fixed to the base body 301 and a solenoid valve 322 fixed to the air cylinder 305.

The intermediate portion of the tube 306 is fixed and held with a fixing plate 323 fixed to the air cylinder 305.

Rigid or flexible pipes 324 are connected between the solenoid valve 322 and a supply port 305a of the air cylinder 305, between a supply port 305b of the air cylinder 305 and the solenoid valve 322, and between the solenoid valve 322 and an exhaust unit 307, respectively.

The exhaust unit 307 is fixed to the fixing plate 323 mounted to the air cylinder 305 such that its exhaust direction is set in the horizontal direction.

The operation will be described.

First, the round rod 314a of the hanging member 314 is engaged with the notches of the support member 310, and the guide rails 317 are mounted to extend from the fixing block 315.

Subsequently, the opening/closing member 304 is placed on the two guide rails 317 such that the notched portion 304b of the opening/closing member 304 is engaged with the lock nut 318 of the piston 311 of the air cylinder 305.

The cylindrical member 303 is placed on the opening/closing member 304 and the fixing block 315 such that the guide holes 320 are fitted on the guide pins 316 on the fixing block 315.

At this time, since air is sent from the air supply pipe 321 to the solenoid valve 322 and is supplied to the supply port 305a side of the air cylinder 305, the piston 311 of the air cylinder 305 is retracted.

More specifically, the lower open surface of the cylindrical member 303 is closed with the opening/closing member 304 so that a target metering object W can be introduced into the cylindrical member 303 and metered.

The target metering object W is introduced into the cylindrical member 303 and stacked on the upper surface of the opening/closing member 304.

In this state, the load of the metering container formed by the cylindrical member 303 and the opening/closing member 304 and that of the deposited target metering object W are metered by the load cell 302 mounted to the mount plate 308, together with the loads of the guide rails 317, the fixing block 315, the hanging member 314, the support member 310, and the panel 309.

The weights of the air cylinder 305 mounted to the panel 309, the solenoid valve 322 accompanying the air cylinder 305, and the fixing plate 323 of the tube 306 are also metered as the load of the load cell 302, as a matter of course.

Since air is constantly supplied from the air supply pipe 321, a pressure acts in the interior of the tube 306 connected between the base body 301 and the load side of the load cell 302.

However, as the tube 306 is flexible, it does not have rigidity, so that this pressure does not act on the load side of the load cell 302.

When metering of the target metering object W is ended, the target metering object is discharged from the cylindrical member 303.

In this case, the solenoid valve 322 is switched to supply air to the supply port 305b of the air cylinder 305.

Figure 13:
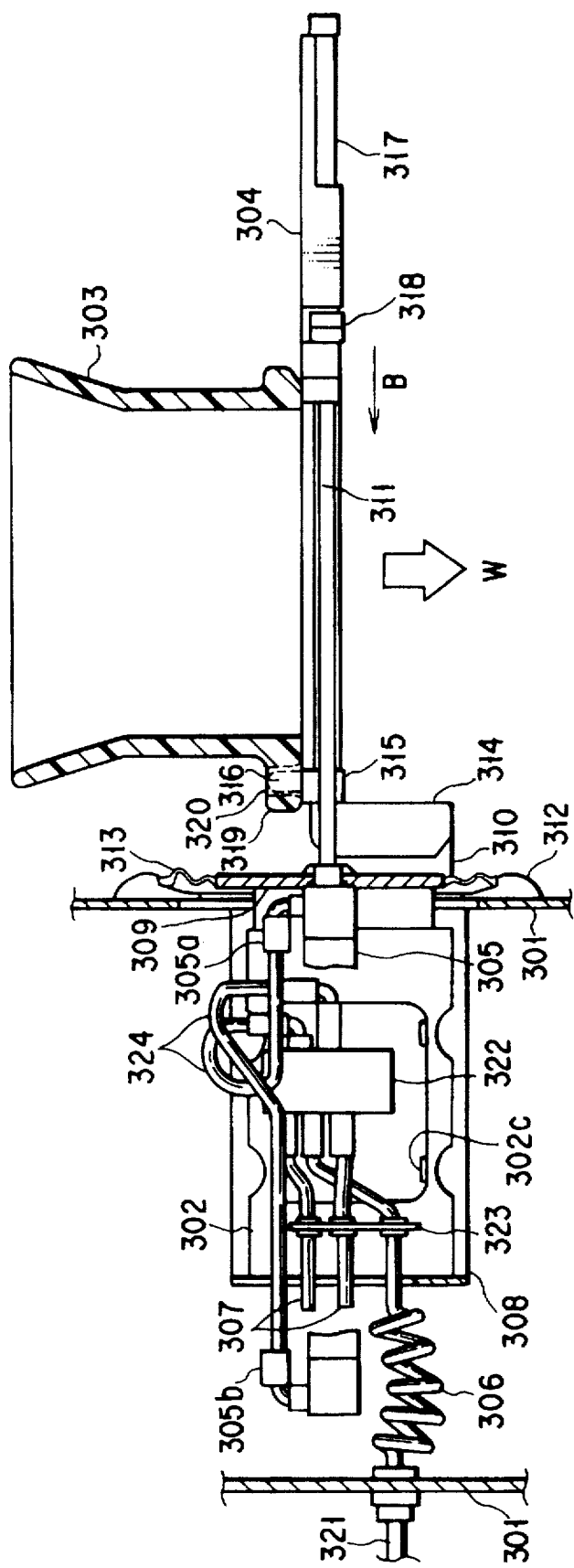
FIG. 13 is a front view showing the operation of the main part of the second embodiment.

Then, the piston 311 is pushed out, and the opening/closing member 304 is moved on the guide rails 317 accordingly, as indicated by an arrow A in FIG. 11. Hence, the lower open surface of the cylindrical member 303 is opened, as shown in FIG. 13, to drop and discharge the target metering object W.

At this time, air pushed out from the supply port 305a side of the air cylinder 305 passes through the pipes 324 and the solenoid valve 322 and is exhausted from the exhaust unit 307.

Since the exhaust unit 307 is mounted on the fixing plate 323 to be set in the horizontal direction, the air injecting direction is also horizontal.

Therefore, the air injecting direction and the load direction of the load cell 302 are perpendicular to each other, so that the influence of air injection does not act on the load.

When discharge of the target metering object W is ended, the solenoid valve 322 is switched, and air is supplied from the supply port 305a side of the air cylinder 305 to the air cylinder 305.

The piston 311 is retracted into the air cylinder 305 to move the opening/closing member 304 to a position to close the lower open surface of the cylindrical member 303, as indicated by an arrow B in FIG. 13, and the target metering object W is introduced.

At this time, air pushed out from the supply port 305b of the air cylinder 305 passes through the pipes 324 and the solenoid valve 322 and is exhausted from the exhaust unit 307.

After this, the operations of introduction, metering, and discharge of the target metering object W are repeated sequentially in accordance with the movement of the opening/closing member 304. Every time metering is performed, an electric signal output from the strain sensor 302c of the load cell 302 is supplied to an operational circuit (not shown) to calculate the weight of the target metering object W.

Since the mount side of the load cell is fixed to the base body and the cylindrical member, the opening/closing member, and the air cylinder are mounted on the load side of the load cell, as described above, there will be no unstable contact portions during metering, so that stable metering can be performed. Also, since no special mechanism is required for preventing contact, the structure is simple.

In addition, since the operating direction of the air cylinder and the exhaust direction of air from the exhaust unit are different from the load direction of the load cell, the load of the load cell will not vary.

Since the tube for supplying air from the base body side to the air cylinder is flexible, even if an air pressure is applied to the tube, the tube between the base body and the air cylinder does not become rigid, thereby not adversely affecting the load of the load cell.

Therefore, according to the second embodiment as described above, a combined metering apparatus having high measuring precision with a simple structure can be provided.

The third embodiment will be described. Since the arrangement and operation of the third embodiment are identical to those of the first embodiment shown in FIGS. 1A, 1B, 2, 3, 6, 7, 8A to 8D, and 10, a description thereof will be omitted, and only portions different from the first embodiment will be described with reference to FIGS. 15 to 22.

Figure 15:
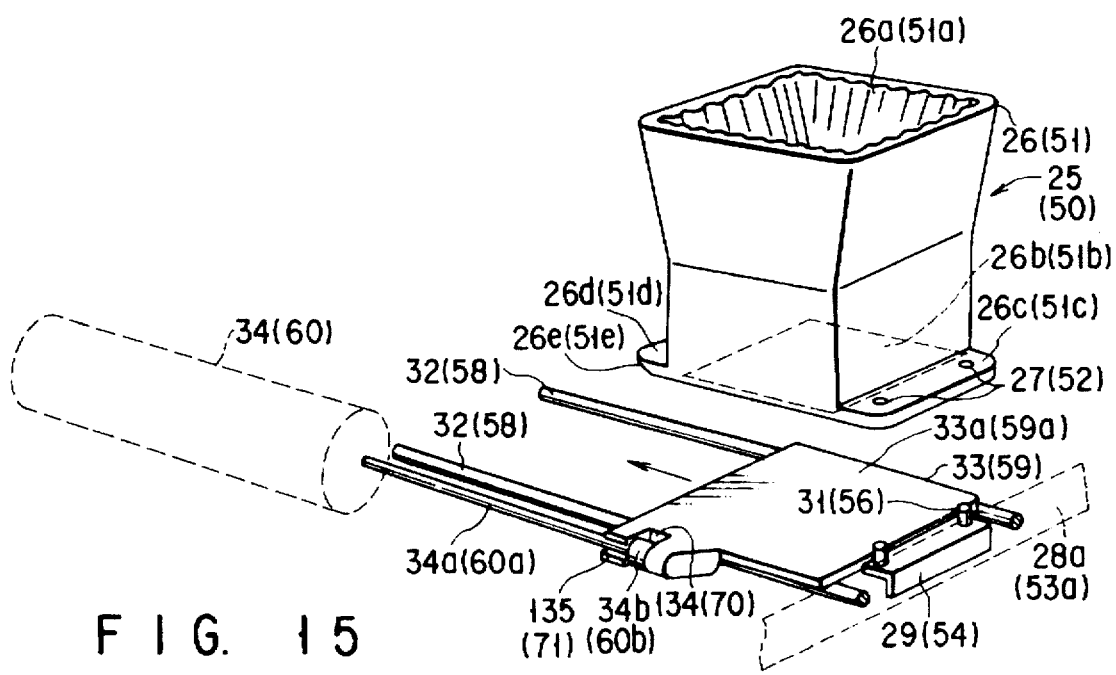
FIG. 15 is a perspective view of the main part of the third embodiment.
Figure 16:
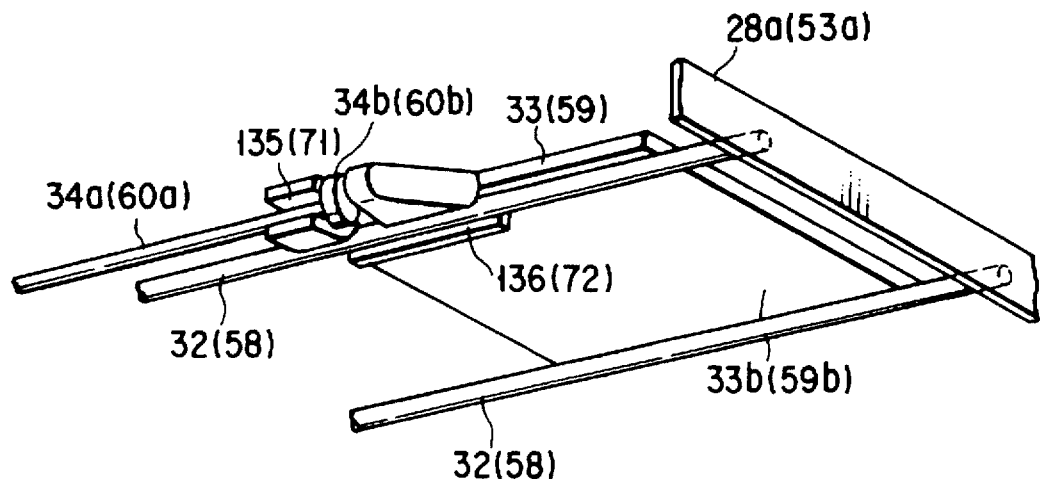
FIG. 16 is a perspective view of the main part of the third embodiment seen from the lower surface side.

Both FIGS. 15 and 16 show the arrangement of a timing hopper 50 to be described later.

First, as shown in FIG. 15, in a cylindrical body 26, in addition to flanges identical to those of the first embodiment, a tilted surface 26e is formed on the lower surface of the other flange 26d such that its height from its lower end surface is gradually increased toward the outer side.

A bottom plate 33 is supported on each of a pair of guide shafts 32 such that the height of its upper surface 33a is the same as the height of a pin fixing plate 29.

The upper surface 33a of each bottom plate 33 is formed flat into a substantially square shape having a size enough to close a lower open surface 26b of the cylindrical body 26. A notched portion 134 having a predetermined width is formed in the rear side of one side portion (left side when seen from the front surface) of the bottom plate 33 such that it is notched inwardly.

A first bearing portion 135 having the shape of a U-shaped groove with an open side is formed in the side surface between the notched portion 134 and the rear end portion of the bottom plate 33.

As shown in FIG. 16, a second bearing portion 136 having the shape of a U-shaped groove with a lower open side is formed in the notched portion 134 side end portion of the lower surface 33b of the bottom plate 33 to extend by a predetermined length from the rear end of the lower surface.

The first bearing portion 135 and the second bearing portion 136 are adjacent to be parallel to each other.

Cylinders 34 serving as drive units for moving the bottom plates 33 of respective pool hoppers 25 are provided in a housing 22 at positions to correspond to the respective pairs of guide shafts 32.

A drive shaft 34a of each cylinder 34 projects from the front surface of the housing 22, and is reciprocally driven at a position slightly outside one (the left one when seen from the front) of the pair of guide shafts 32 to be parallel to the guide shafts 32.

The gap between the drive shaft 34a of each cylinder 34 and one (the left one) guide shaft 32 is set almost equal to the gap between the first bearing portion 135 and the second bearing portion 136 of the bottom plate 33.

A distal end portion 34b of the drive shaft 34a has such a length that it can laterally enter the notched portion 134 of the bottom plate 33 and an outer diameter larger than the inner diameter of the first bearing portion 135.

Each bottom plate 33 is slidably supported on the pair of guide shafts 32 while the distal end portion 34b of the drive shaft 34a is received by the notched portion 134, the drive shaft 34a is loosely fitted in the first bearing portion 135, the left guide shaft 32 is engaged with the second bearing portion 136, and the other (right) guide shaft 32 is abutted against the other end portion of a lower surface 33b.

Figure 17:
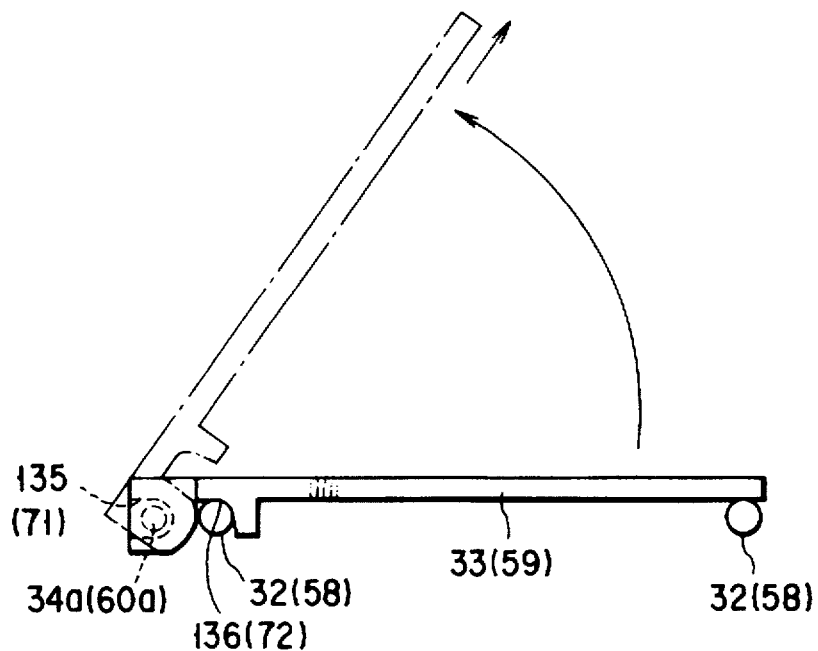
FIG. 17 is a schematic front view of the main part of the third embodiment.

Accordingly, as shown in FIG. 17, when the right end of the bottom plate 33 is lifted upward and the bottom plate 33 is pivoted counterclockwise about the drive shaft 34a engaging with the first bearing portion 135 as the fulcrum, the second bearing portion 136 and the left guide shaft 32 are disengaged from each other.

After this disengagement, when the bottom plate 33 is lifted in the upper right direction, the drive shaft 34a and the first bearing portion 135 are also disengaged from each other, so that the bottom plate 33 can be removed easily.

Reversely, when mounting the bottom plate 33, after the left end of the bottom plate 33 is directed downward and the first bearing portion 135 is engaged with the drive shaft 34a, the right end of the bottom plate may be moved downward clockwise, and the second bearing portion 136 and the left guide shaft 32 may be engaged with each other.

The cylindrical body 26 of each pool hopper 25 is supported on the bottom plate 33 such that the lower surface of its front-side flange 26c is abutted against the upper surface of the pin fixing plates 29 by inserting a pair of locking pins 31 of the pin fixing plates 29 in locking holes 27 and that the lower end face of its rear-side flange 26d is abutted against the upper surface 33a of the bottom plate 33.

Thus, when the bottom plate 33 of the cylindrical body 26 is driven by the cylinder 37 to move to a position where the front end of the bottom plate 33 and the pin fixing plates 29 are brought into contact with each other, the lower open surface 26b of the cylindrical body 26 is closed completely. When the front end of the bottom plate 33 is moved to the lower end face of the rear-side flange 26d, the lower open surface 26b is opened completely.

Since the cylindrical body 26 is restricted merely in its horizontal movement by the locking pins 31 that are inserted in the locking holes 27 from below, when it is only lifted upward to disengage the locking pins 31 and the locking holes 27 from each other, it can be removed easily.

Metering hoppers 35 are arranged in an array below the pool hoppers 25.

Figure 18:
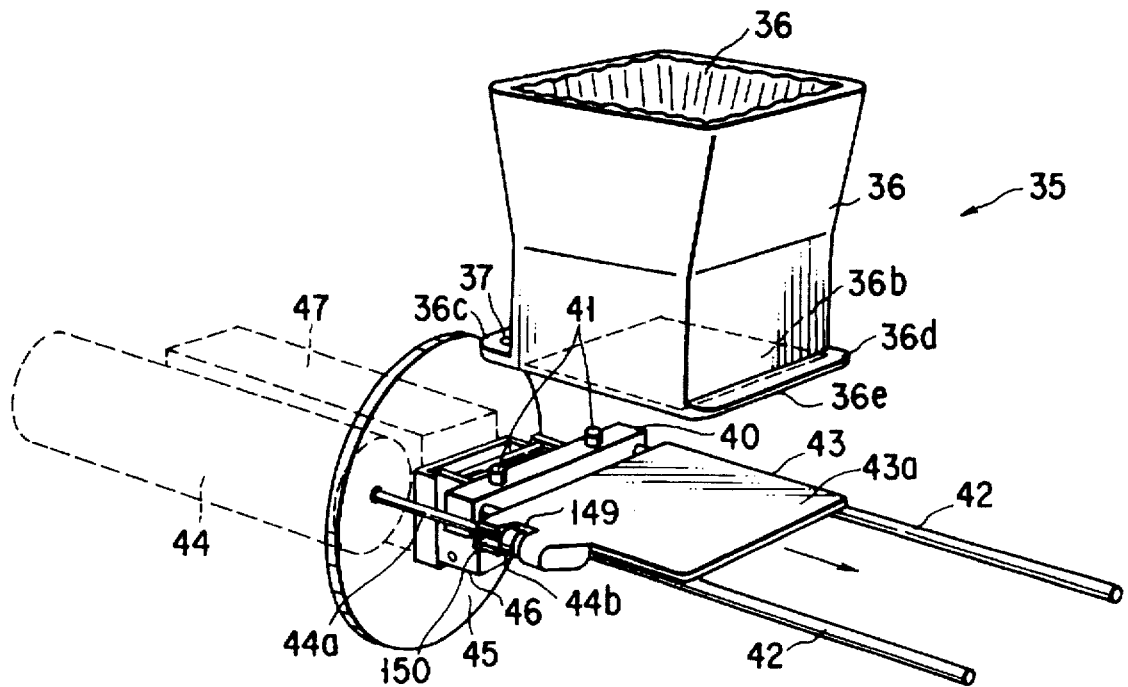
FIG. 18 is a perspective view of the main part of the third embodiment.

As shown in FIG. 18, each metering hopper 35 is constituted by a cylindrical body 36 having completely the same shape as that of the cylindrical body 26 of the pool hopper 25, and a bottom plate 43 having completely the same shape as that of the bottom plate 33 of the pool hopper 25.

The cylindrical body 36 is supported to be aligned in the reverse direction with the cylindrical body 26 of the pool hopper 25 such that its upper open surface 36a vertically overlaps the lower open surface 26b of the cylindrical body 26 of the upper-stage pool hopper 25.

Two locking pins 41 provided to project upright on the upper surface of each hopper support 40 supported by a front surface 22b of the housing 22 are inserted through two locking holes 37 formed in one flange 36c, of flanges 36c and 36d provided to the front and rear sides of a lower open surface 36b of the cylindrical body 36.

A pair of guide shafts 42 are mounted to the two end portions of each hopper support 40 so as to extend forward horizontally and to be parallel to each other at a gap identical to that of the pair of guide shafts 32 that support the bottom plate 33 of the pool hopper 25.

A bottom plate 43 is supported on the pair of guide shafts 42 to be guided by them to be slidable back and forth.

In completely the same manner as the bottom plate 33 of the pool hopper 25, the upper surface 43 of each bottom plate 43 is formed flat into a substantially square shape having a size enough to close the lower open surface 36b of the cylindrical body 36. A notched portion 149 is formed on the rear side of one side portion (left side) of the bottom plate 43.

A first bearing portion 150 having the shape of a U-shaped groove with an open side is formed in the side surface between the notched portion 149 and the rear end portion of the bottom plate 43.

Figure 19:
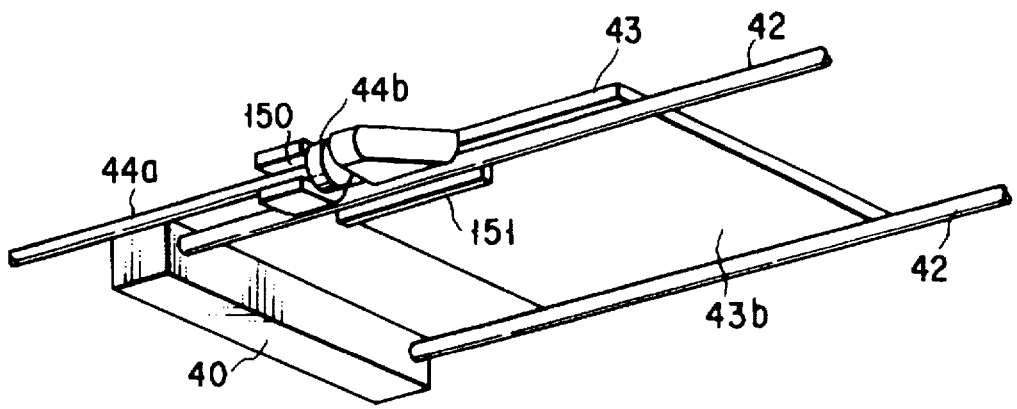
FIG. 19 is a perspective view of the main part of the third embodiment seen from the lower surface side.

As shown in FIG. 19, a second bearing portion 151 having the shape of a U-shaped groove with a lower open side is formed in the notched portion 149 side end portion of a lower surface 48b of the bottom plate 43.

Cylinders 44 serving as drive units to move the bottom plates 43 of the respective pool hoppers 35 are provided in the housing 22 at positions to correspond to the respective pairs of guide shafts 42.

A drive shaft 44a of each cylinder 44 projects from the front surface of the housing 22, and is reciprocally driven at a position slightly outside one (the left one when seen from the front) of the pair of guide shafts 42 to be parallel to the guide shafts 42.

The gap between the drive shaft 44a of each cylinder 44 and one (the left one) guide shaft 42 is set almost equal to the gap between the first bearing portion 150 and the second bearing portion 151 of the bottom plate 43.

A distal end portion 44b of the drive shaft 44a has such a length that it can laterally enter the notched portion 149 of the bottom plate 43 and an outer diameter larger than the inner diameter of the first bearing portion 150.

Each bottom plate 43 is slidably supported on the pair of guide shafts 42 while the distal end portion 44b of the drive shaft 44a is received by the notched portion 149, the drive shaft 44a is loosely fitted in the first bearing portion 150, the left guide shaft 42 is engaged with the second bearing portion 151, and the other (right) guide shaft 42 is abutted against the other end portion of the lower surface 43b.

Accordingly, the bottom plate 43 of each metering hopper 35 can also be easily removed and mounted by a simple pivot operation, as shown in FIG. 17.

The cylindrical body 36 of each metering hopper 35 is supported on the bottom plate 43 such that the lower surface of its rear-side flange 36c is abutted against the upper surface of the hopper support 40 by inserting the pair of locking pins 41 of the hopper support 40 in the locking holes 37 and that the lower end face of its front-side flange 36d having the tilted surface 36e is abutted against an upper surface 48a of the bottom plate 43.

Thus, when the bottom plate 43 of the cylindrical body 36 is driven by the cylinder 44 to move to a position where the rear end of the bottom plate 43 and the hopper support 40 are brought into contact with each other, the lower open surface 36b of the cylindrical body 36 is closed completely. When the front end of the bottom plate 43 is moved to the lower end face of the front-side flange 36d, the lower open surface 36b is opened completely.

The timing hoppers 50 are arranged below the respective metering hoppers 36.

As shown in FIGS. 15 and 16, each timing hopper 35 is constituted by a cylindrical body 51 having completely the same shape as that of the cylindrical body 26 of the pool hopper 25, and a bottom plate 59 having completely the same shape as that of the bottom plate 33 of the pool hopper 25.

The cylindrical body 51 is supported to be aligned in the reverse direction with the cylindrical body 36 of the metering hopper 35 (that is, to be aligned with the cylindrical body 26 of the pool hopper 25 in the same direction) such that its upper open surface 51a vertically overlaps the lower open surface 36b of the cylindrical body 36 of the upper-stage metering hopper 35.

Two locking holes 52 formed in one flange 51c, of flanges 51c and 51d provided to the front and rear sides of a lower open surface 51b of the cylindrical body 51, are locked by locking pins 56 which are provided to project upright on a pin fixing plate 54 on the inner edge of a front plate 53a of each of frames 53 that are fixed to the right and left portions of the front surface 22b of the housing 22.

A pair of guide shafts 58 are provided between the front plate 53a of each frame and the front surface of the housing 22 so as to extend forward horizontally and to be parallel to each other at a gap identical to that of the pair of guide shafts 32 that support the bottom plate 33 of the pool hopper 25.

A bottom plate 59 is supported on the pair of guide shafts 58 to be guided by them to be slidable back and forth.

In completely the same manner as the bottom plates 33 and 43 of the pool hoppers 25 and the metering hoppers 35, an upper surface 59a of each bottom plate 59 is formed flat into a substantially square shape of a size to close a lower open surface 61b of a cylindrical body 61. A notched portion 70 is formed in the rear side of one side portion (left side) of the bottom plate 59.

A first bearing portion 71 having the shape of a U-shaped groove with an open side is formed in the side surface between the notched portion 70 and the rear end portion of the bottom plate 59.

A second bearing portion 72 having the shape of a U-shaped groove with a lower open side is formed in the notched portion 70 side end portion of a lower surface 59b of the bottom plate 59.

Cylinders 60 serving as drive units to move the bottom plates 59 that support the respective timing hoppers 50 are provided in the housing 22 at positions to correspond to the respective pairs of guide shafts 58.

A drive shaft 60a of each cylinder 60 projects from the front surface of the housing 22, and is reciprocally driven at a position slightly outside one (the left one when seen from the front) of the pair of guide shafts 58 to be parallel to the guide shafts 58.

The gap between the drive shaft 60a of each cylinder 60 and one (the left one) guide shaft 58 is set almost equal to the gap between the first bearing portion 71 and the second bearing portion 72 of the bottom plate 59.

A distal end portion 60b of the drive shaft 60a has such a length that it can laterally enter the notched portion 70 of the bottom plate 59 and an outer diameter larger than the inner diameter of the first bearing portion 71.

Each bottom plate 59 is slidably supported on the pair of guide shafts 58 while the distal end portion 60b of the drive shaft 60a is received by the notched portion 70, the drive shaft 60a is loosely fitted in the first bearing portion 71, the left guide shaft 58 is engaged with the second bearing portion 72, and the other (right) guide shaft 58 is abutted against the other end portion of the lower surface 59b.

Accordingly, the bottom plate 59 of each timing hopper 50 can also be easily removed and mounted by a simple pivot operation, as shown in FIG. 17.

The cylindrical body 51 of each timing hopper 50 is supported on the bottom plate 69 such that the lower surface of its front-side flange 51c is abutted against the upper surface of the pin fixing plate 54 by inserting the pair of locking pins 56 of the pin fixing plate 54 in the locking holes 52 and that the lower end face of its rear-side flange 51d having the tilted surface 51e is abutted against the upper surface 59a of the bottom plate 59.

Thus, when the bottom plate 59 of the cylindrical body 51 is driven by the cylinder 60 to move to a position where the front end of the bottom plate 59 and the hopper support 40 are brought into contact with each other, the lower open surface 51b is closed completely. When the front end of the bottom plate 59 is moved to the lower end face of the rear-side flange 51d, the lower open surface 51b is opened completely.

FIG. 20 shows the positions of the cylindrical bodies 26, 36, and 51 of the pool hopper 25, the metering hopper 35, and the timing hopper 50, that are vertically arranged in three stages, from the side surface.

The cylindrical body 36 of the metering hopper 35 is supported, within a range in which its upper open surface 36a vertically overlaps the lower open surface 26b of the cylindrical body 26 of the pool hopper 25, at a position close to a side (namely, the front surface side of the housing 22) toward which the bottom plate 33 is moved when the pool hopper 25 is opened.

The cylindrical body 51 of the timing hopper 50 is supported, within a range in which its upper open surface 51a vertically overlaps the lower open surface 36b of the cylindrical body 36 of the metering hopper 35, at a position close to a side (in a direction to remote from the front surface of the housing) toward which the bottom plate 43 is moved when the metering hopper 35 is opened.

The operation of the combined metering apparatus according to the third embodiment will be described. The basic operation of the third embodiment is similar to that of the first embodiment shown in FIGS. 8A to 8D, and thus description will be made with reference to FIGS. 21A to 21G.

FIGS. 21A to 21G show, from the side surface side, the operation of the bottom plates with respect to the respective cylindrical bodies of the set of pool hopper 25, the metering hopper 35, and the timing hopper 50 that are arranged vertically.

Figures 21A, 21B, 21C, 21D:
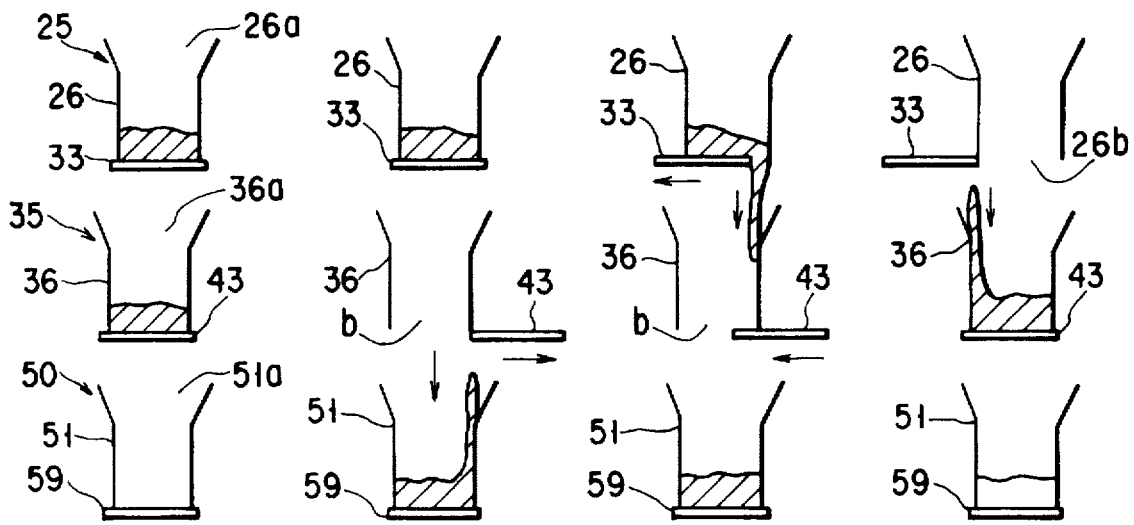
FIGS. 21A to 21G are schematic side views for explaining the operations of bottom plates of the hoppers of the third embodiment that are arranged vertically.

From a state wherein the target metering objects are stored in the pool hopper 25 and the metering hopper 35, as shown in FIG. 21A, the bottom plate 43 of the metering hopper 35 is pushed forward (to the right in FIG. 21A) to open the lower open surface 36b of the cylindrical body 36 forward from the rear side (from the left in FIG. 21A), and the target metering object falls to be stored in the lower-stage timing hopper 50.

As shown in FIG. 21B, when the bottom plate 43 of the metering hopper 35 is moved to a position to open the lower open surface 36b of the cylindrical body 36 completely, the target metering object stored in the cylindrical body 36 is discharged completely, and is stored in the lower-stage timing hopper 50.

Subsequently, as shown in FIG. 21B, when the lower open surface 36b of the cylindrical body 36 of the metering hopper 35 is opened completely and the target metering object is discharged completely, as shown in FIG. 21C, the bottom plate 43 is retracted to close the lower open surface 36b of the cylindrical body 36 backward from the front side. Almost in synchronism with the return movement of the bottom plate 43, the bottom plate 33 of the upper-stage pool hopper 25 is retracted to open the lower open surface 26b of the cylindrical body 26 backward from the front side.

Therefore, the first part of the target metering object in the cylindrical body 26 of the pool hopper 25, which falls through the gap between the front end of the bottom plate 33 and the front end of the lower open surface 26b of the cylindrical body 26 falls along the front end-side inner wall of the cylindrical body 36 of the lower-stage metering hopper 35. As the bottom plate 43 that supports the metering hopper 35 is moved in the same direction as the moving direction of the bottom plate 33 and the upper open surface 36a of the cylindrical body 36 of the metering hopper 35 is set close to the side toward which the bottom plate 33 is moved, the target metering object is placed on the bottom plate 43 that closes the lower open surface 36b of the cylindrical body 36 from the front side, and will not fall through the gap between the lower open surface 36b of the cylindrical body 36 and the rear end of the bottom plate 43.

As shown in FIG. 21D, when the bottom plate 43 supporting the metering hopper 35 is moved to a position to completely close the lower open surface 36b of the cylindrical body 36, the bottom plate 33 of the upper-stage pool hopper 25 is also moved to a position to completely open the lower open surface 26b of the cylindrical body 26, so that the target metering object in the cylindrical body 26 is discharged completely.

At this time, the target metering object which is discharged finally from the pool hopper 25 is slightly dragged in the direction in which the bottom plate 33 is moved and is obliquely discharged to the housing 22 side. As described above, the upper open surface 36a of the cylindrical body 36 of the lower-stage metering hopper 35 is located at a position close to the housing side with respect to the lower open surface 26b of the cylindrical body 26 of the pool hopper 25. Thus, the target metering object being discharged from the pool hopper 25 will not be scattered to outside the metering hopper 35 but reliably falls into the cylindrical body 36 of the metering hopper 35.

Since the two ends of the lower surface of the bottom plate 43 that supports the metering hopper 35 are supported by the pair of guide shafts 42, the load of the target metering object that falls from above does not directly act on the drive shaft 44a. Also, only one of the pair of guide shafts 42 is engaged with the second bearing portion 151 and the bottom plate 43 is in contact with the other guide shaft 42 from above. Thus, even if the pair of guide shafts have a low parallelism, the bottom plate 43 is moved smoothly.

Since the first bearing portion 150 engaged with the drive shaft 44a and the second bearing portion 151 engaged with the guide shaft 42 are close to each other, the rotation moment applied by the drive shaft 44a to the bottom plate 43 is very small, and this rotation moment will not interfere with the movement of the bottom plate 43.

Even if vertical vibration is applied to the bottom plate 43, the vertical movement of the guide shaft 42 is regulated by the drive shaft 44a laterally engaged with the bottom plate 43, so that the bottom plate 43 will not be disengaged.

The above discussion similarly applies to the bottom plate 33 of the pool hopper 25 and the bottom plate 59 that supports the timing hopper 50.

Figures 21E, 21F, 21G:
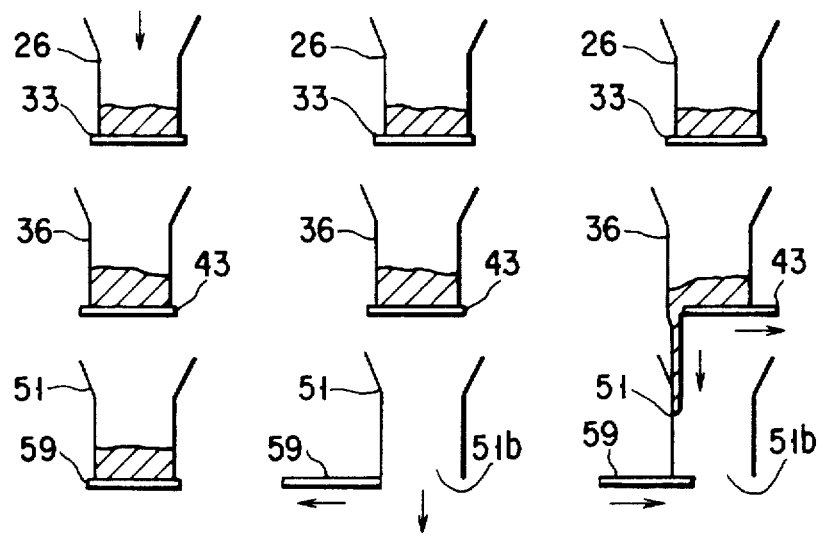

When supply of the target metering object to the metering hopper 35 is completed in this manner, after the bottom plate 33 of the pool hopper 25 is driven forward to close the lower open surface 26b of the cylindrical body 26, the vibrating unit 23 is driven, so that the target metering object is newly supplied from a convey trough 24 to the emptied pool hopper 25, as shown in FIG. 21E.

While the target metering objects are supplied from the pool hoppers 25 to the emptied metering hoppers 35 and the target metering objects are supplied from the convey troughs 24 to the emptied pool hoppers 25 in this manner, conveyors 65 and 66 are driven, the timing hoppers are sequentially specified starting from one farthest from a collecting chute 70, and the target metering objects in the specified timing hoppers are discharged onto the conveyors 65 and 66.

A next combination is selected by a combination selecting means 90 while the target metering objects are discharged from the respective timing hoppers 50 and are conveyed by the conveyors 65 and 66 as well.

Assume that the target metering object in the fourth metering hopper 35 counted from the left, which is the closest to the collecting chute 70, is selected again to constitute the combination. As shown in FIG. 21F, after the bottom plate 59 of the timing hopper 50 closest to the collecting chute 70 is opened and the target metering object in the cylindrical body 51 (the target metering object selected by the previous combination selection) is discharged completely, as shown in switch 21G, the bottom plate 59 is started to return forward. Almost in synchronism with this return, the bottom plate 43 of the upper-stage metering hopper 35 is started to move forward, thereby discharging the target metering object in the cylindrical body 35.

This operation is performed in the same manner as in the supply operation from the pool hopper 25 to the metering hopper 35 described above.

When the bottom plate 59 supporting the timing hopper 50 is moved to a position to completely close the lower open surface 51b of the cylindrical body 51, the bottom plate 43 of the metering hopper 35 is moved to a position to completely open the lower open surface 36b of the cylindrical body 36.

At this time, the target metering object which is discharged finally from the metering hopper 35 is slightly dragged in the direction in which the bottom plate 43 is moved and is obliquely discharged forward (in a direction to separate from the housing 22).

The upper open surface 51a of the cylindrical body 51 of the lower-stage timing hopper 50 is located at a position close to the front side with respect to the lower open surface 36b of the cylindrical body 36 of the metering hopper 35. The target metering object being discharged from the metering hopper 40 will not be scattered outside the timing hopper 50 but reliably falls into the cylindrical body 51 of the timing hopper 50.

After the target metering object in the cylindrical body 36 is discharged completely in this manner, when the bottom plate 43 is started to return backward, the bottom plate 33 of the upper-stage pool hopper 25 is started to open, as shown in FIG. 21C, and supply of the next target metering object is started.

When cleaning each hopper, its cylindrical body can be removed easily only by lifting it upward and disengaging the locking pins from the locking holes.

While the cylindrical body is removed, when one end portion (right end when seen from the front) of the bottom plate is lifted upward to disengage the second bearing portion from the left guide shaft, and then the bottom plate is lifted in the upper right direction, each bottom plate can be removed only by disengaging the first bearing portion from the drive shaft.

Since the cylindrical bodies and bottom plates of the respective hoppers are of the same shape, a large number of cylindrical bodies and bottom plates that are removed can be cleaned without being discriminated according to the types of hoppers, and the cleaned cylindrical bodies and bottom plates can be used for arbitrary hoppers. Thus, very high convenience can be obtained in the cleaning operation and component maintenance.

In this combined metering apparatus, in order to convey the target metering object from the upper-stage hopper to the lower-stage hopper efficiently, the direction in which the lower open surface of the cylindrical body of the upper-stage hopper is opened and the direction in which the lower open surface of the cylindrical body of the lower-stage hopper is closed are set the same, and the operation of closing the lower-stage hopper and the operation of opening the upper-stage hopper are performed almost simultaneously.

Instead of this, the timing at which the opening operation of the bottom plate of the upper-stage hopper is started and the timing at which the closing operation of the bottom plate of the lower-stage hopper is started may be synchronized completely, since the upper open surface of the lower-stage hopper is set close to a side toward which the lower open surface of the upper-stage hopper is opened.

Alternatively, the timing at which the opening operation of the bottom plate of the upper-stage hopper is started may be set slightly ahead of the timing at which the closing operation of the bottom plate of the lower-stage hopper is started.

Namely, in either case, the target metering object discharged from the upper-stage hopper can be reliably stored in the lower-stage hopper. The arrangement in which the position of the lower-stage hopper is deviated from the upper-stage hopper, as described above, largely contributes to an improvement in convey efficiency of the target metering object.

The tilted surface 26e and tilted surfaces 36e and 61e, which are tilted to be higher on the outer sides, are respectively formed on the lower surfaces of the flanges 26d, 36d, and 51d of the cylindrical bodies 26, 36, and 51 of the hoppers 25, 35, and 50 on the sides toward which the bottom plates 33, 43, and 69 that support the cylindrical bodies 26, 36, and 51 are opened.

Hence, as shown in FIG. 22A, tailings D of the target metering object which have moved to the outer side of the cylindrical body 26 (36, 51) while they attach onto the bottom plate 33 (43, 59) are not scraped by the side wall of the flange 26d (36d, 51d) when the bottom plate 33 (43, 59) is returned in the closing direction, but are directly moved to the lower open surface side of the cylindrical body 26 (36, 51).

Therefore, an article which is dried and denatured will not mix in the target metering object in the lower-stage hopper or will not cause an error in the metering result.

In the above embodiment, in order to improve the discharge efficiency of the target metering object, the direction in which the lower open surface of the cylindrical body of the upper-stage hopper is opened and the direction in which the lower open surface of the cylindrical body of the lower-stage hopper is closed are set the same. Also, when the bottom plate of the lower-stage hopper is moved in a direction to close the lower open surface of the corresponding cylindrical body, the bottom plate of the upper-stage hopper is moved in the same direction in almost synchronism with the movement of the bottom plate of the lower-stage plate, thereby opening the lower open surface of the cylindrical body of the upper-stage hopper.

This arrangement does not limit the present invention. The present invention can also be similarly applied to a combined metering apparatus in which the direction in which the lower open surface of the cylindrical body of the upper-stage hopper is opened and the direction in which the lower open surface of the cylindrical body of the lower-stage hopper is opened are the same.

As described above, in the combined metering apparatus according to the third embodiment of the present invention, the lower-stage hopper is arranged, within a range in which the lower open surface of the upper-stage hopper and the upper open surface of the lower-stage hopper overlap vertically, to be close to the side toward which the bottom plate of the upper-stage hopper is opened. Thus, the target metering object which is discharged obliquely downward along with the movement of the bottom plate of the upper-stage hopper can be reliably received in the upper open surface of the cylindrical body of the lower-stage hopper, so that convey of the target metering object can be performed reliably.

In the combined metering apparatus according to the third embodiment of the present invention, the two end portions of the bottom plate are supported by a pair of guide shafts that are substantially parallel to each other, and the bottom plate is engaged with the drive shaft of the drive unit, so that the bottom plate is slidably moved in the lengthwise direction of the guide shafts. Therefore, the load of the target metering object supplied onto the bottom plate from above is not directly applied to the drive shaft, and the bottom plate can be moved smoothly, thereby reliably conveying the target metering object.

In the combined metering apparatus according to the third embodiment of the present invention, a tilted surface, the height of which from the lower end face is gradually increased farther to the side, is formed on the outer circumferential portion of the lower end of the cylindrical body constituting the hopper. The cylindrical body is arranged such that this tilted surface is located on a side toward which the bottom plate is moved to open the lower open surface of the cylindrical body. Therefore, the tailings of the target metering object which have moved to the outer side of the cylindrical body while they attach onto the bottom plate are stacked on the outer wall of the cylindrical body and are not discharged into the lower-stage hopper, thereby stably performing convey of the target metering object.

The fourth embodiment of the present invention will be described with reference to the accompanying drawings.

Figure 23:
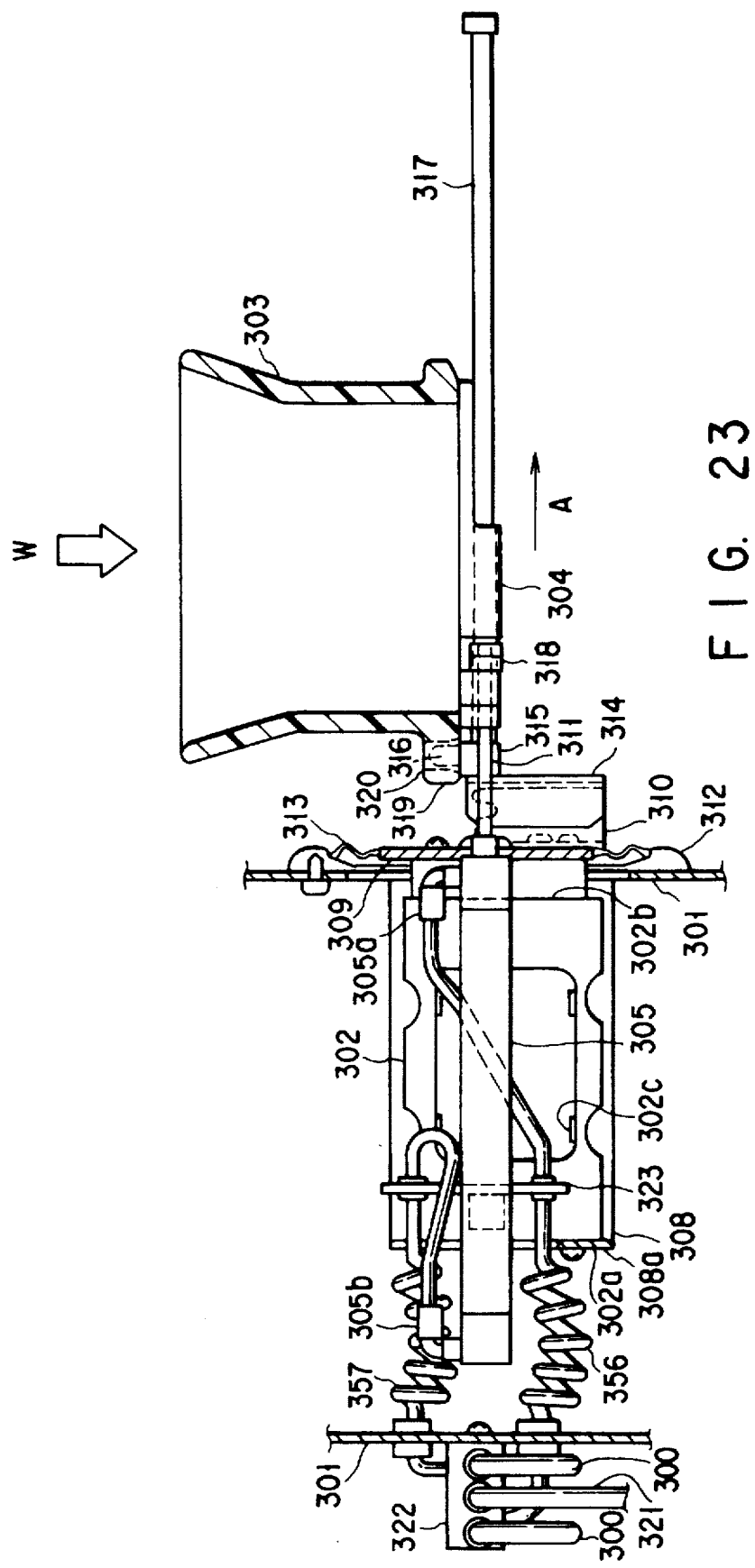
FIG. 23 is a front view showing the fourth embodiment of the present invention.
Figure 24:
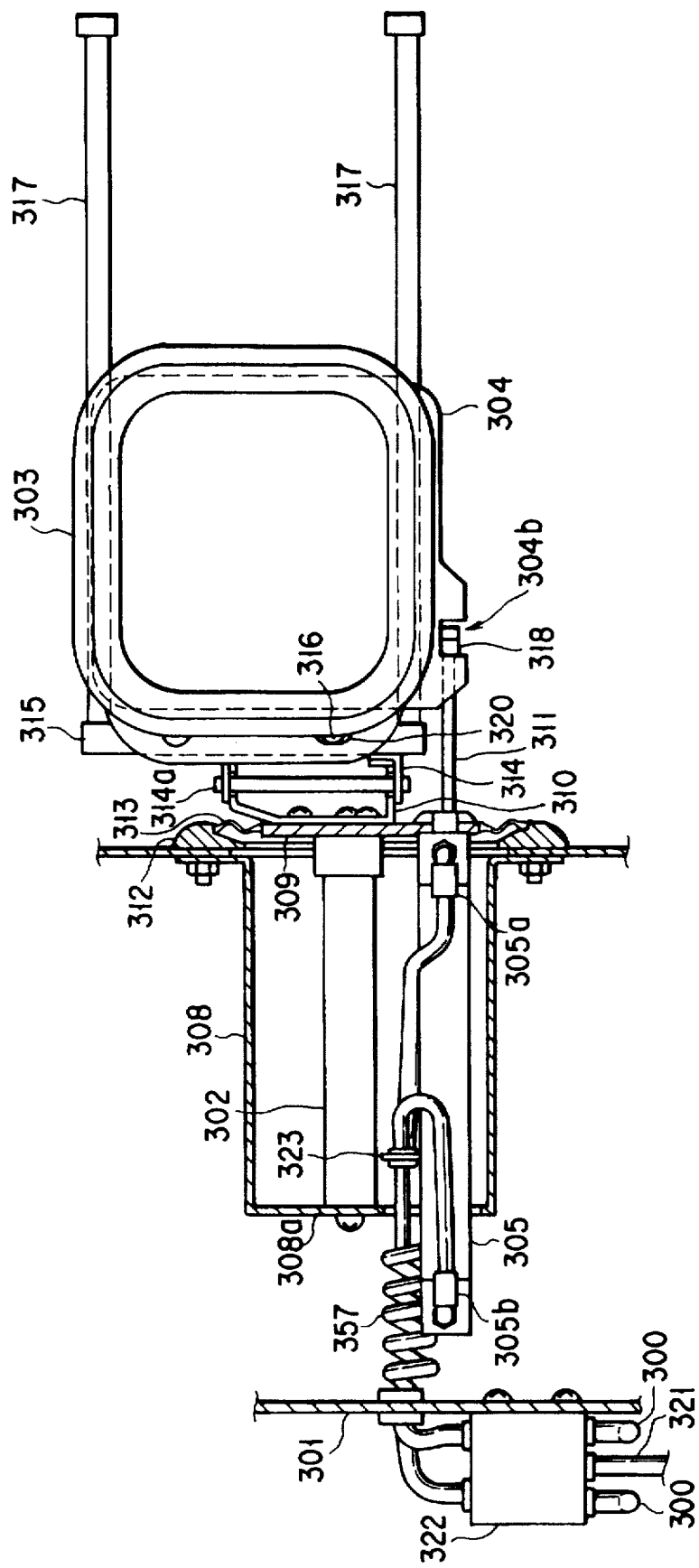
FIG. 24 is a plan view showing the fourth embodiment of the present invention.

FIG. 23 is a front view of only the main part of FIGS. 1A and 1B as the fourth embodiment of the present invention, and FIG. 24 is a plan view of the same.

Similar to the second embodiment described above, the fourth embodiment is related to a load cell 2 portion corresponding to the load cell 47 of the first embodiment shown in FIG. 5.

In the fourth embodiment, a description of portions identical to those of FIGS. 11, 12, and 14 that are employed in the second embodiment described above is omitted, and only portions that are different from the second embodiment will be described with reference to FIGS. 23 to 25.

Referring to FIGS. 23 and 24, regarding supply and discharge of air employed for driving an air cylinder 305, a rigid pipe 321 is connected between an air supply unit (not shown) and a solenoid valve 322 fixed to the outer side of a base body 301, and flexible tubes 306 and 307 are connected between the solenoid valve 322 and the air cylinder 305 with their intermediate portions being fixed and held by a fixing plate 323 mounted on the air cylinder 305.

Two tubes 356 and 357 respectively serve to supply and discharge air upon switching operation of the solenoid valve 322. For example, the flexible tubes 356 and 357 are preferably spiral tubes made of a resin.

As shown in the drawings, the tubes 356 and 357 extend almost in the horizontal direction entirely between the base body 301 and the fixing plate 323, although they sag slightly, to connect the solenoid valve 322 and the air cylinder 305 with each other.

The discharge air is discharged from the solenoid valve 322 provided to the outside of the base body to the outer side of the base body 301 through an exhaust unit 300.

As the exhaust unit 300 is not connected to the load cell 302, the discharge air does not adversely affect the load cell 302. Hence, the discharge air need not have a directivity.

As a matter of course, the solenoid valve 322 may be mounted on the inner side of the base body 301 instead. It suffices if the exhaust unit 300 is directed to the outer side of the base body 301.

The operation will be described.

A hanging member 314 hangs from a support member 310 as a round rod 314a of the hanging member 314 is engaged with the notches of the support member 310 and guide rails 317 extend from a fixing block 315 fixed to the hanging member 314.

Subsequently, an opening/closing member 304 is placed on the two guide rails 317 such that a notched portion 304b of the opening/closing member 304 is engaged with a lock nut 318 of a piston 311 of the air cylinder 305.

The cylindrical member 303 is placed on the opening/closing member 304 and the fixing block 315 such that its guide holes 320 are fitted on pins 316 on the fixing block 315.

At this time, air is sent from the air supply pipe 321 to the solenoid valve 322 and is supplied to the supply port 5a side of the air cylinder 305 through the tube 356.

Hence, the piston 311 of the air cylinder 305 is set in the retracted state.

More specifically, the lower open surface of the cylindrical member 303 is closed with the opening/closing member 304 so that a target metering object W can be introduced into the cylindrical member 303 and metered. The target metering object W is introduced into the cylindrical member 303 and stacked on the upper surface of the opening/closing member 304.

In this state, the load of the metering container formed by the cylindrical member 3 and the opening/closing member 304 and that of the deposited target metering object W are metered by the load cell 302 fixed to a mount plate 308, together with the loads of the guide rails 317, the fixing block 315, the hanging member 314, the support member 310, and the panel 309.

The weight of the air cylinder 305 mounted to the panel 309 and that of the fixing plate 323 of the tubes 356 and 357 accompanying the air cylinder 305 are also metered as the load of the load cell 302, as a matter of course.

Air is constantly supplied from the air supply pipe 321, and a pressure acts in the interior of the tube 356 connected between the solenoid valve 322 and the air cylinder 305.

However, as the tube 356 is flexible, it does not have rigidity, so this pressure does not act on the load side of the load cell 302.

When metering of the target metering object W is ended, the target metering object is discharged from the cylindrical member 303. In this case, the solenoid valve 322 is switched to supply air to the supply port 305b of the air cylinder 305 through the tube 357.

Then, the piston 311 is pushed out, and the opening/closing member 304 is moved on the guide rails 317 accordingly, as indicated by an arrow A in FIG. 23. Hence, the lower open surface of the cylindrical member 303 is opened, as shown in FIG. 25, to drop and discharge the target metering object W.

At this time, air blown out from the supply port 305a side of the air cylinder 305 passes through the tube 356 and the solenoid valve 322 and is discharged from the exhaust unit 300 to the outside of the base body 1.

When discharge of the target metering object W is ended, the solenoid valve 322 is switched, and air is supplied from the supply port 305a side of the air cylinder 305 to the air cylinder 305 through the tube 6.

The piston 311 is retracted into the air cylinder 305 to move the opening/closing member 304 to a position to close the lower open surface of the cylindrical member 303, as indicated by an arrow B in FIG. 25, and the target metering object W is introduced.

At this time, air blown out from the supply port 305b of the air cylinder 305 passes through the tube 357 and the solenoid valve 322 and is discharged from the exhaust unit 300 to the outside of the base body 301.

After this, the operations of introduction, metering, and discharge of the target metering object W are repeated sequentially in accordance with the movement of the opening/closing member 304 driven by the air cylinder 305. Every time metering is performed, an electric signal output from a strain sensor 302c of the load cell 302 is calculated by an operational circuit (not shown), thereby calculating the weight of the target metering object W.

As described above, according to the fourth embodiment, since the mount side of the load cell is fixed to the base body, and the cylindrical member, the opening/closing member, and the air cylinder are mounted to the load side of the load cell, there will be no unstable contact portions during metering, so that stable metering can be performed. Also, since no special mechanism is required for preventing contact, the structure is simple.

In addition, in the fourth embodiment, since the operating direction of the air cylinder is different from the load direction of the load cell, the load of the load cell will not vary.

In the fourth embodiment, since the tubes for supplying air from the base body side to the air cylinder and exhausting air from the air cylinder to the outside of the base body are flexible, even if an air pressure is kept applied to the tubes, the tubes between the base body and the air cylinder do not become rigid, thereby not adversely affecting the load of the load cell.

Moreover, in the fourth embodiment, since the air exhaust unit is provided to be directed to the outside of the base body, a lubricant contained in the air will not attach to the inner side of the base body, thereby preventing deposition of contamination and dust.

The fifth embodiment of the present invention will be described with reference to the accompanying drawings.

Figure 26:
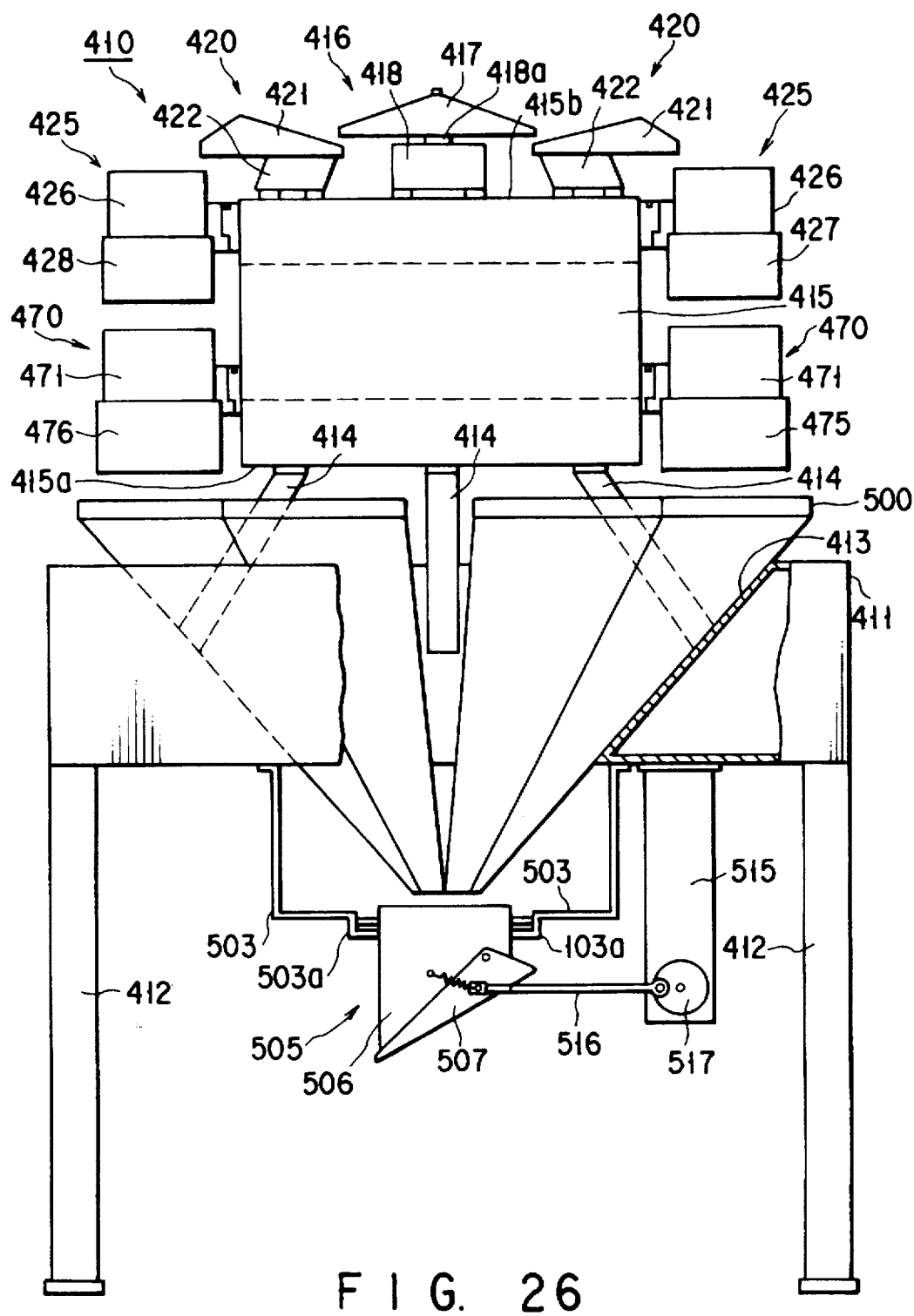
FIG. 26 is a schematic side view of the fifth embodiment of the present invention.

FIG. 26 shows the overall arrangement of a combined metering apparatus 410 according to the fourth embodiment of the present invention.

In this combined metering apparatus 410, a plurality of linear feeders, intermediate hoppers, and metering hoppers are arranged annularly in the circumferential direction of a prismatic housing. FIG. 26 shows only part of the plurality of linear feeders, the intermediate hoppers, and metering hoppers that are arranged annularly.

Referring to FIG. 26, a base table 411 of the combined metering apparatus 410 has a substantially square outer shape, and is supported by legs 412 mounted on the four corners of its lower surface.

An inverted conical support hole 413 for supporting a collecting chute 400 (to be described later) is formed in the center of the base table 411, and four housing supports 414 are mounted on the inner wall surface of the support hole 413 to project upward.

A prismatic housing 415 having, e.g., 412 side surfaces is arranged above the support hole 413 such that its lower surface 415a side is supported by the housing supports 414.

A circular feeder 416 is arranged at the center of an upper surface 415b of the housing 415, and a plurality of (e.g., 12) linear feeders 420 are arranged radially around the circular feeder 416.

The circular feeder 416 is constituted by a circular umbrella-shaped convey table 417 and a vibrating drive unit 418. The convey table 417 supported on the upper end of a drive shaft 418a of the vibrating drive unit 418 is vertically vibrated while being rotated reciprocally, thereby dispersing, to its peripheral portion, the target metering object which is supplied by dropping by an article convey unit (e.g., a conveyor) (not shown) from above to the top portion of the convey table 417.

The convey table 417 of the circular feeder 416 which is brought into contact with the target metering object is monolithically formed into the shape of a circular umbrella with a synthetic resin, e.g., polypropylene incorporated with an anti-fungus material such as silver zeolite. As shown in FIG. 27, the hexagonal distal end of the drive shaft 418 is received in a bearing 417a provided at the center of the lower surface of the convey table 417, and a set screw 417b is threadably engaged with the drive shaft 418 from the top portion side of the convey table 417, so that the convey table 417 is coupled to the drive shaft 418a.

Hence, the convey table 417 can be removed from the vibrating drive unit 418 by loosening the set screw 417b.

Each linear feeder 420 is constituted by a gutter-like convey table 421 and a vibrating drive unit 422. The target metering object unloaded from the convey table 417 of the circular feeder 416 is received by the convey table 421, and the convey table 421 is vibrated toward the outer circumference of the housing 415, thereby linearly conveying the target metering object to a position above the respective side surfaces of the housing 415.

Similar to the convey table 417 of the circular feeder 416, the convey table 421 of the linear feeders 420 which is brought into contact with the target metering object is formed integrally with a synthetic resin, e.g., polypropylene incorporated with an anti-fungus material such as silver zeolite. As shown in FIG. 28, L-shaped hooks 421b and 421c are provided at the front and rear portions of a lower surface 421a of the convey table 421. The hook 421b is locked at the rear portion of a vibrating table 422a of the vibrating drive unit 422, and the hook 421c is locked by a locking member (patching lock) 422b mounted to the front portion of the vibrating table 422a, so that the convey table 421 is fixed on the vibrating drive unit 422.

Accordingly, when the locking member 422b is unlocked, the convey table 421 can be easily removed from the vibrating drive unit 422.

In this manner, since the convey tables 417 and 421 of the circular feeder 416 and the plurality of linear feeders 420 are formed integrally with a synthetic resin, e.g., polypropylene incorporated with an anti-fungus material such as silver zeolite, they can be made lightweight when compared to convey tables made of stainless steel. Thus, power required for vibration drive can be small, and the vibrating drive unit can be made small.

Even if scratches are formed on the surfaces of the convey tables, proliferation of bacteria can be prevented due to the action of the anti-fungus material. Thus, a sufficiently high cleaning effect can be obtained only with water washing.

As shown in FIG. 26, intermediate hoppers 425 are arranged above the respective side surface 415c of the housing 415 to respectively receive the target metering objects unloaded from the convey tables 421 of the respective linear feeders 420 and discharge them.

Figure 29:
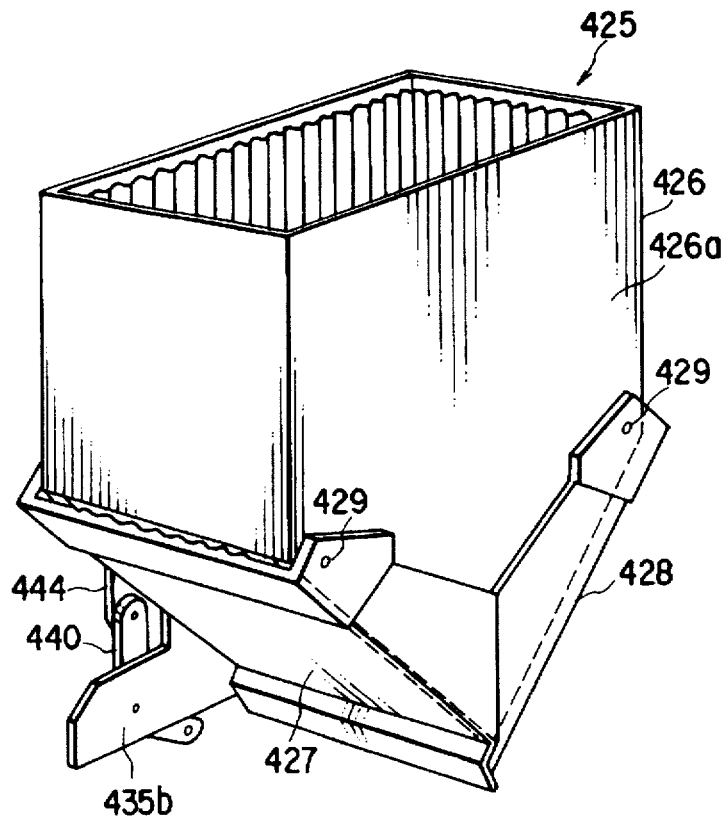
FIG. 29 is a perspective view of an intermediate hopper of the fifth embodiment.
Figure 30:
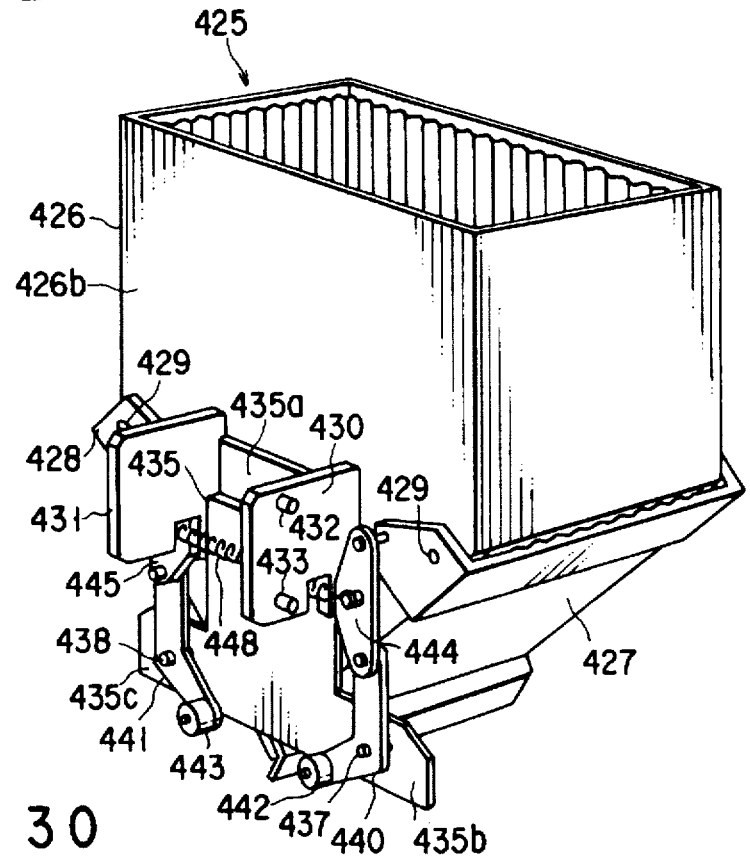
FIG. 30 is a perspective view of the intermediate hopper of the fifth embodiment.

As shown in FIGS. 29 and 30, each intermediate hopper 425 is a double swing hopper in which the lower open surface of a prismatic hopper body 426 having upper and lower openings is opened/closed with two discharge gates 427 and 428. The hopper body 426 and the discharge gates 427 and 428 which are brought into contact with the target metering object discharged from the linear feeder 420 are formed integrally with a synthetic resin, e.g., polypropylene incorporated with an anti-fungus material such as silver zeolite.

The inner wall surface of the hopper body 426 is waved to prevent the target metering object having tackiness from being left.

Pivot shafts 429 are provided to project from the two sides of a front surface 426a and the two sides of 426b of the hopper body 426, the lower portion of which is formed into an inverted triangle. The two discharge gates 427 and 428 are pivoted while their two side portions are supported by the pivot shafts 429, thereby opening/closing the tilted lower open surface of the hopper body 426.

The inner wall surfaces of the discharge gates 427 and 428 are also waved to prevent the target metering object having tackiness from being left.

Two rectangular locking segments 430 and 431 are provided upright at right and left portions of the central portion of the rear surface 426b of the hopper body 426 to oppose each other.

Locking pins 432 and 433 project outward from the upper and lower portions of the distal end sides of the locking segments 430 and 431.

A mechanism support plate 435 is fixed between the two locking segments 430 and 431.

The mechanism support plate 435 has a fixing portion 435a and support portions 436b and 436c. The fixing portion 435a is fixed, between the locking segments 430 and 431, to the rear surface 426b of the hopper body 426 by screwing. The support portions 436b and 436c are formed on the lower portion of the fixing portion 435a, to be higher than the fixing portion 435a so as not to interfere with the opening/closing operation of the two discharge gates 427 and 428, and extend to the left and right. Lever shafts 437 and 438 are provided to project on the distal ends of the support portions 436b and 436c, respectively.

The lever shafts 437 and 438 respectively support the intermediate portions of V-shaped pivot levers 440 and 441 to be pivotal in symmetric directions.

Rollers 442 and 443 are mounted to the lower ends of the two pivot levers 440 and 441, respectively.

The lower ends of link plates 444 and 445 are pivotally coupled to the upper ends of the two pivot levers 440 and 441, respectively.

The upper ends of the link plates 444 and 445 are pivotally coupled to the upper ends of the side portions of the discharge gates 427 and 428, respectively. The intermediate portions of the link plates 444 and 445 are biased by a spring 448 in directions to be retracted by each other.

The sizes of the respective portions are set such that when the discharge gates 427 and 428 are kept closed, the intermediate portions of the link plates 444 and 445 are abutted against the locking segments 430 and 431, and the link plates 444 and 445 and the upper portions of the pivot levers 440 and 441 are aligned on one line.

Therefore, for example, when the roller of one pivot lever is pushed upward, the upper portion of this pivot lever is moved outwardly downward, so that the link plate coupled to this pivot lever is pulled downward, thereby opening the discharge gate coupled to this link plate.

Since the mechanism support plate 435, the pivot levers 440 and 441 supported by the mechanism support plate 435, and the link plates 444 and 445 are not usually brought into contact with the target metering object, they can be formed with either a synthetic resin incorporating an anti-fungus material or a metal. If these components are formed with a synthetic resin incorporating an anti-fungus material, the entire portion of the hopper excluding the spring 448 can be cleaned at once at room temperature.

If these components are formed with a metal, the mechanism support plate 435 may be removed from the hopper body 426, and the hopper body 426 and the discharge gates 427 and 428 may be cleaned at room temperature.

The intermediate hopper 425 formed in this manner is detachably locked on the upper portion of the side surface of the housing 415.

More specifically, as shown in FIG. 31, a channel-like locking plate 450 is mounted to the upper portion of a side surface 415c of the housing 415.

The size of the gap between opposing segments 451 and 452 of the locking plate 450 is slightly larger than the gap between the outer sides of the locking segments 430 and 431 of the intermediate hopper 425. Grooves 453 and 454 for receiving the upper locking pins 432 of the locking segments 430 and 431 are formed in the upper portions of the opposing segments 451 and 452. Stepped portions 455 and 456 to be abutted against the lower locking pins 433 of the locking segments 430 and 431 are formed in the lower portions of the opposing segments 451 and 452.

The intermediate hopper 425 is supported by the housing 415 such that the upper locking pins 432 of its locking segments 430 and 431 are fitted in the upper grooves 453 and 454 of the locking plate 450 and that the lower locking pins 433 are abutted against the stepped portions 455 and 456 of the locking plate 450.

A drive lever 457 pivoted by a drive unit (e.g., a motor or an air cylinder) in the housing 415 is mounted below the locking plate 450.

Upon the pivot operation of the drive lever 457, the pivot levers 440 and 441 of the intermediate hopper 425 are driven selectively, so that the discharge gates 427 and 428 are opened/closed selectively.

A locking plate 458 for supporting a metering hopper 470 (to be described later), and drive levers 465 and 466 for opening/closing the metering hopper 470 are provided to project below the drive lever 457.

The locking plate 458 projects from the side surface of the housing 415 as it is coupled to a metering unit (not shown) fixed in the housing. Grooves 461 and 462 are formed in the upper portions of opposing segments 459 and 460 of the locking plate 458, and stepped portions 463 and 464 are formed in the lower portions of the opposing segments 459 and 460 of the locking plate 458, in completely the same manner as in the locking plate 450.

The target metering objects discharged from the respective intermediate hoppers 425 are stored in the metering hoppers 470 arranged below them, and are metered.

Figure 33:
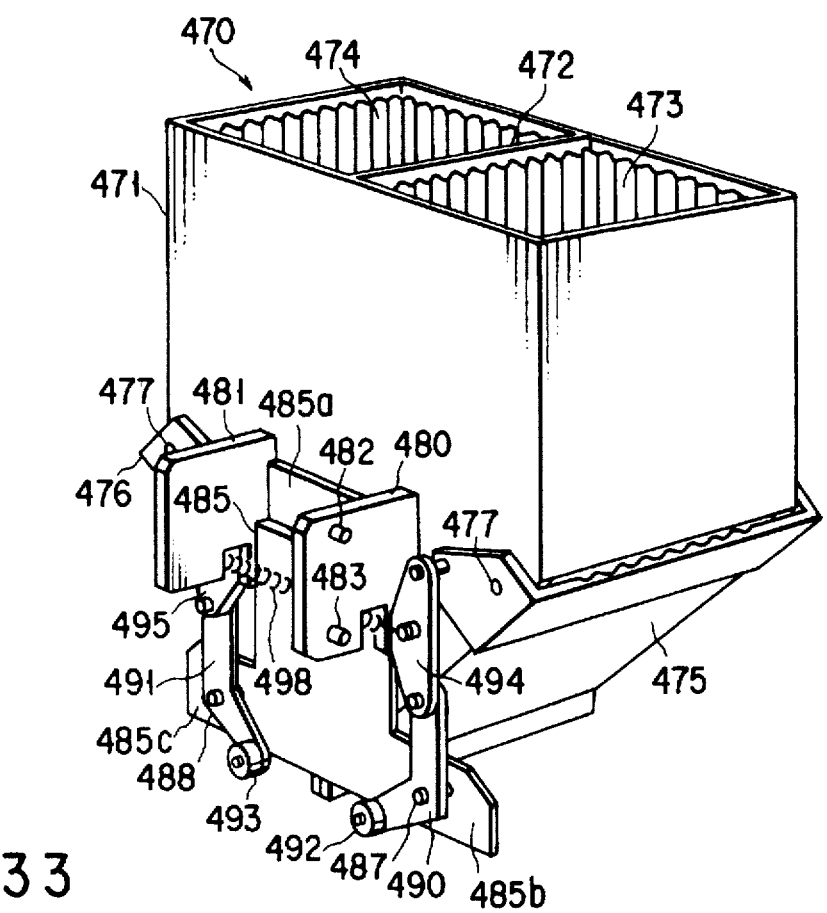
FIG. 33 is a perspective view of the metering hopper of the fifth embodiment.

As shown in FIGS. 32 and 33, the metering hopper 470 has almost the same arrangement as that of the intermediate hopper 425, except that the interior of its hopper body 471 is divided into left and right storing portions 473 and 474 with a partitioning segment 472 provided upright at the center.

More specifically, the metering hopper 470 is a double swing hopper in which the lower open surfaces of the respective storing portions 473 and 474 of the prismatic hopper body 471 having upper and lower openings are opened/closed with two discharge gates 475 and 476 independently of each other. The hopper body 471 and the discharge gates 475 and 476 which are brought into contact with the target metering object are formed integrally with a synthetic resin, e.g., polypropylene incorporated with an anti-fungus material such as silver zeolite.

The inner wall surface of the hopper body 471 is waved to prevent the target metering object having tackiness from being left.

Pivot shafts 477 are provided to project from the two sides of a front surface 471a and the two sides of a rear surface 471b of the hopper body 471, the lower portion of which is formed into an inverted triangle.

The two discharge gates 475 and 476 are pivoted while their two side portions are supported by the pivot shafts 477, thereby opening/closing the lower open surfaces of the storing portions 473 and 474.

The inner wall surfaces of the discharge gates 475 and 476 are also waved to prevent the target metering object having tackiness from being left.

Two rectangular locking segments 480 and 481 are suspended at right and left portions of the central portion of the rear surface 471b of the hopper body 471 to oppose each other.

Locking pins 482 and 483 project outward from the upper and lower portions of the distal end sides of the locking segments 480 and 481.

A mechanism support plate 485 is fixed between the two locking segments 480 and 481.

The mechanism support plate 485 has a fixing portion 485a and support portions 485b and 485c. The fixing portion 485a is fixed, between the locking segments 480 and 481, to the rear surface 471b of the hopper body 471 by screwing. The support portions 485b and 485c are formed on the lower portion of the fixing portion 485a, to be higher than the fixing portion 485a so as not to interfere with the opening/closing operation of the two discharge gates 475 and 476, and extend to the left and right. Lever shafts 487 and 488 are provided to project on the distal ends of the support portions 485b and 485c, respectively.

The lever shafts 487 and 489 respectively support the intermediate portions of V-shaped pivot levers 490 and 491 to be pivotal in symmetric directions.

Rollers 492 and 493 are mounted to the lower ends of the two pivot levers 490 and 491, respectively.

The lower ends of link plates 449 and 495 are pivotally coupled to the upper ends of the two pivot levers 490 and 491, respectively.

The upper ends of the link plates 494 and 495 are pivotally coupled to the upper ends of the side portions of the discharge gates 475 and 476, respectively.

The intermediate portions of the link plates 494 and 495 are biased by a spring 498 in directions to be retracted by each other.

The metering hopper 470 is supported by the locking plate 458 by fitting the upper locking pins 482 of the locking segments 480 and 481 in upper grooves 461 and 462 of the locking plate 458 of the housing 415 and abutting the lower locking pins 483 against the stepped portions 463 and 464 of the locking plate 458.

At this time, when the discharge gate 427 is opened, the target metering object in the intermediate hopper 425 is discharged into the storing portion 473 of the metering hopper 470.

The joint portion of the discharge gates 427 and 428 of the intermediate hopper 425 is located immediately above the partitioning segment 472 of the metering hopper 470 so that the target metering object in the intermediate hopper 425 is discharged into the storing portion 474 of the metering hopper 470 when the discharge gate 428 is opened.

The rollers 492 and 493 of the pivot levers 490 and 491 of the metering hopper 470 are respectively located above the drive levers 465 and 466.

The weights of the target metering objects stored in the metering hoppers 470 supported by the respective locking plates 458 are detected by the metering units coupled to the locking plates 458 in units of the storing portions, and the combination of the detected weights is selected.

When the drive lever, of the drive levers 465 and 466, which corresponds to the storing portion storing the target metering object selected to constitute the combination is pivoted, the discharge gate corresponding to this storing portion is opened and then closed, and the target metering object selected to constitute the combination is discharged.

Similar to the intermediate hopper 425, since the mechanism support plate 485, the pivot levers 490 and 491, and the link plates 494 and 495 of the metering hopper 470 are not brought into direct contact with the target metering object, they can be formed with either a synthetic resin incorporating an anti-fungus material or a metal.

When cleaning the metering hopper, whether the entire hopper or only the hopper body and the gates will be cleaned at room temperature may be selected in accordance with the material of these components.

In this manner, since the hopper bodies 426 and 471, and the discharge gates 427, 428, 475, and 476 that are brought into contact with the target metering object in the intermediate hopper 425 and metering hopper 470 are formed integrally with a synthetic resin, e.g., polypropylene incorporating an anti-fungus material such as silver zeolite, they can be formed considerably lightweight when compared to a hopper made of stainless steel or a hopper having a gate. Thus, noise occurring when opening/closing the gate and load to the metering unit can be small, and a small metering unit can be used.

Even if scratches are formed on the surfaces of these components, proliferation of bacteria can be prevented due to the operation of the anti-fungus material. Thus, a sufficiently high cleaning effect can be obtained only with cleaning at room temperature.

The target metering objects discharged from the respective metering hoppers 470 are received by a collecting chute 500 mounted in the support hole 413 of the base table 411 and are discharged through a discharge port at the lower portion of the base table 411.

Figure 34:
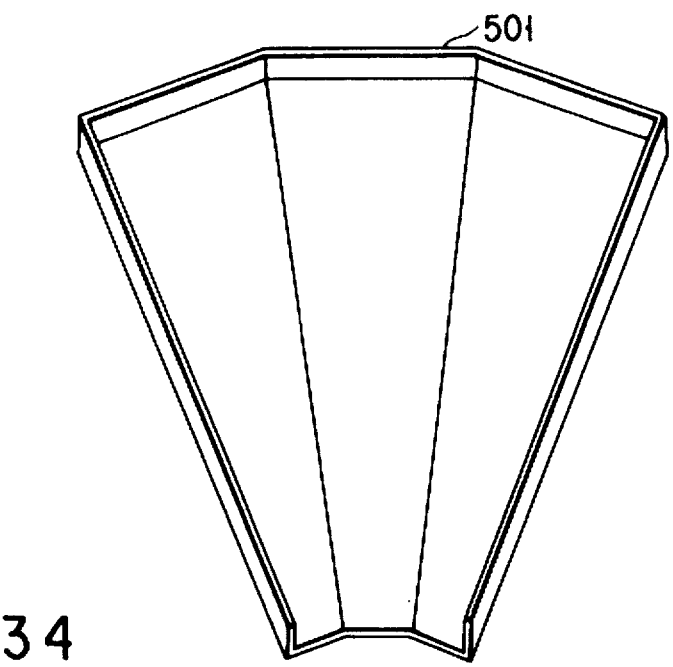
FIG. 34 is a perspective view of chute plates of the fifth embodiment.

As shown in FIG. 34, the collecting chute 500 is formed into a funnel shape with four divided chute plates 501 such that it can be inserted in the support hole 413 so as to escape from the housing supports 414 provided upright in the support hole 413.

Each chute plate 501 is formed integrally with a synthetic resin, e.g., polypropylene incorporating an anti-fungus material such as silver zeolite, in the same manner as the intermediate hoppers 425 and the metering hoppers 470.

Hence, the chute plates 501 become considerably lightweight compared to the conventional chute plates made of stainless steel. Thus, the chute plates that are very large as the components constituting the apparatus can be removed or mounted easily. Also, similar to the convey path and the hoppers, since proliferation of bacteria is prevented due to the operation of the anti-fungus material, a sufficiently high cleaning effect can be obtained with only cleaning at room temperature.

A discharge hopper 505 is detachably supported on the lower surface of the base table 411 with a discharge hopper support 503.

The target metering object discharged from the collecting chute 500 is stored in the discharge hopper 505 and is then discharged into a packaging machine (or a packaging line or the like).

Figure 35:
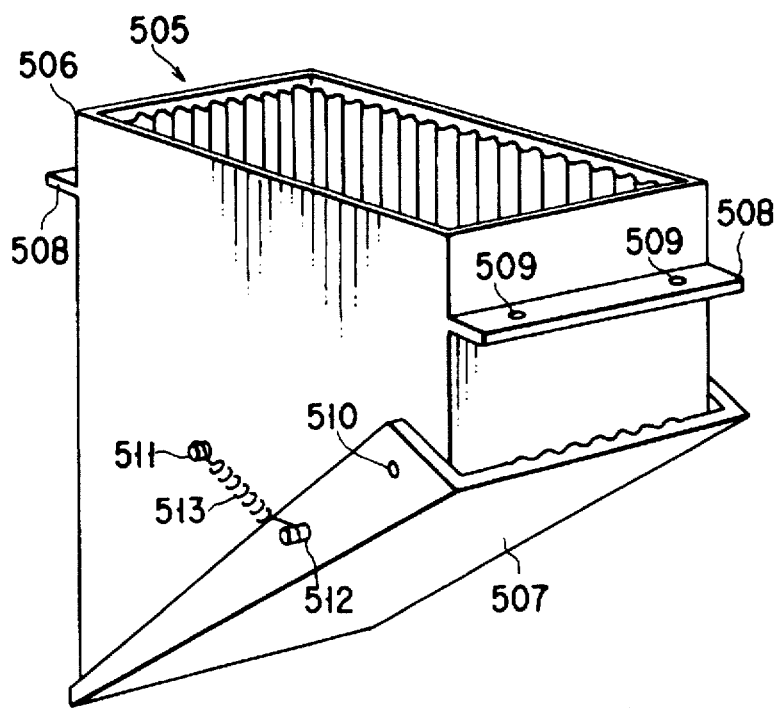
FIG. 35 is a perspective view of a discharge hopper of the fifth embodiment.
Figure 36:
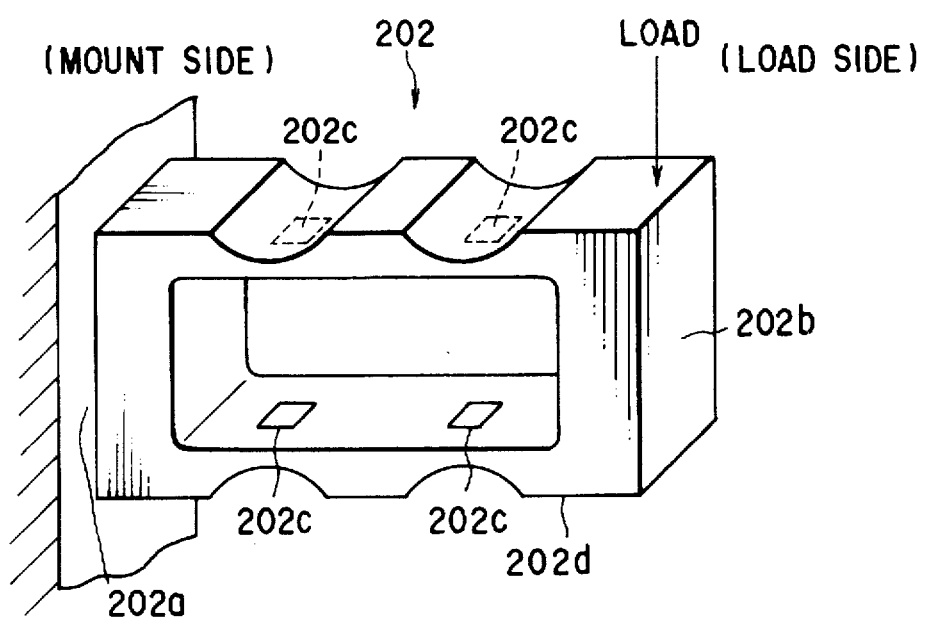
FIG. 36 is a schematic view showing the outline of a load cell.
Figure 37:
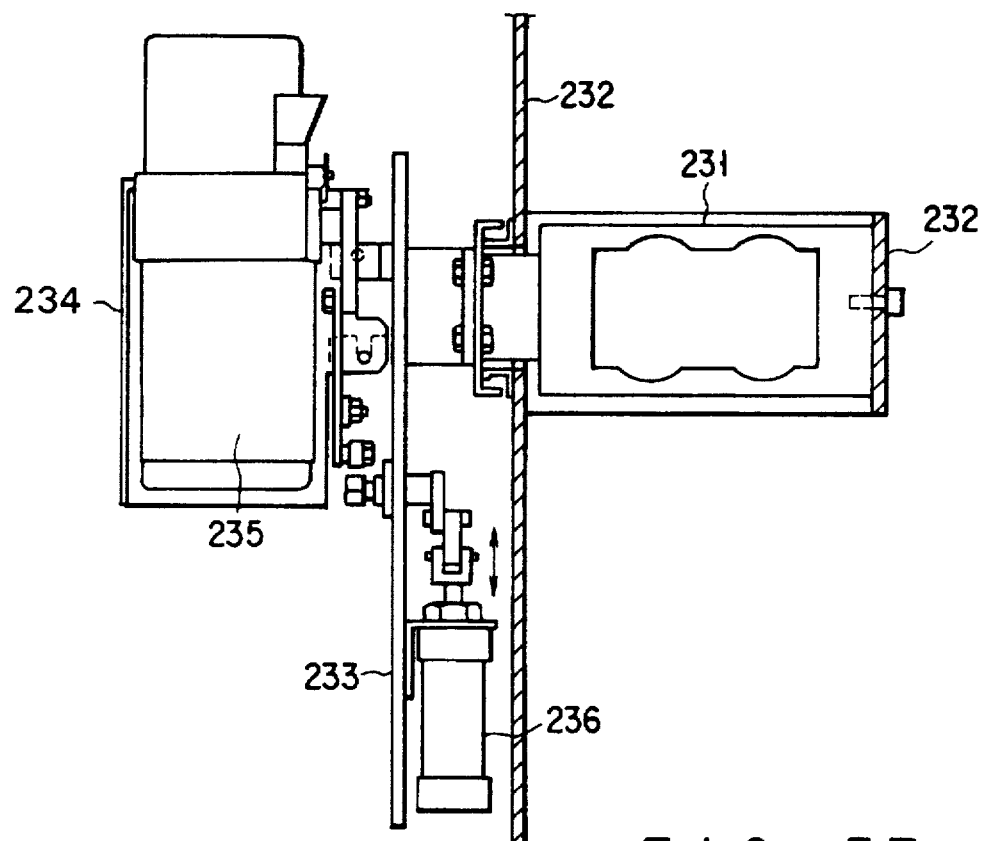
FIG. 37 is a front view showing a prior art.
Figure 38:
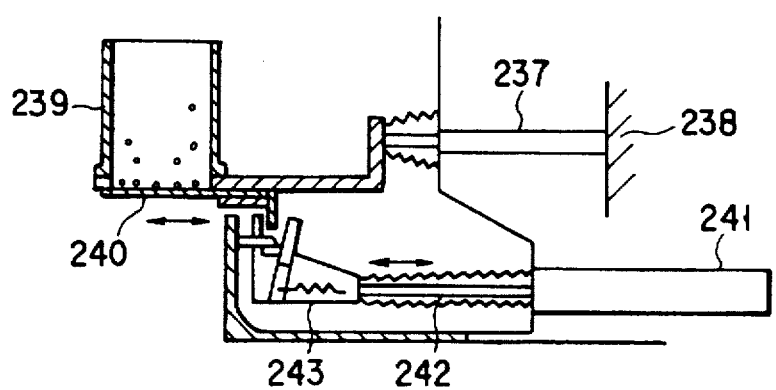
FIG. 38 is a front view showing a prior art.
Figure 39A:
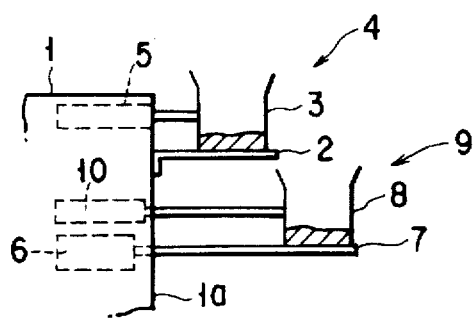
FIGS. 39A, 39B, and 39C are functional block diagrams showing the arrangement of a control unit of the fourth embodiment.
Figure 40A:
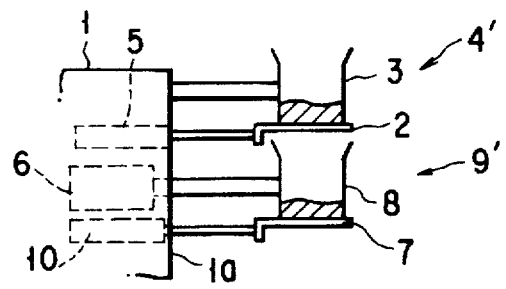
FIGS. 40A, 40B, and 40C are schematic front views for explaining the overall operation of the fourth embodiment.
Figure 39B:
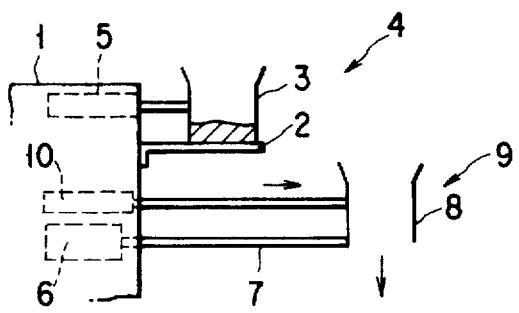
Figure 40B:
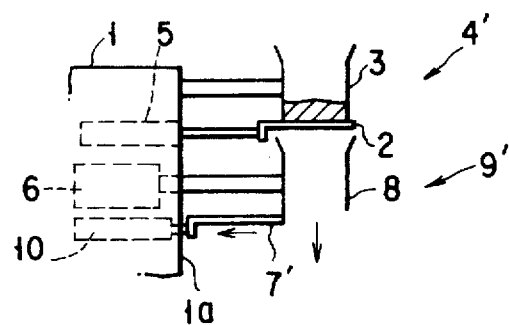
Figure 39C:
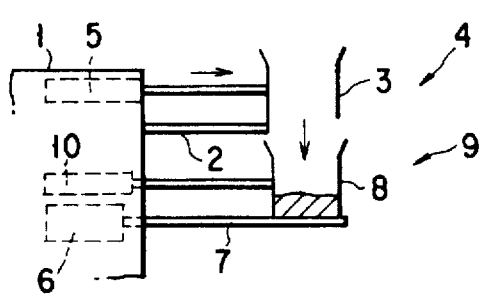
Figure 40C:
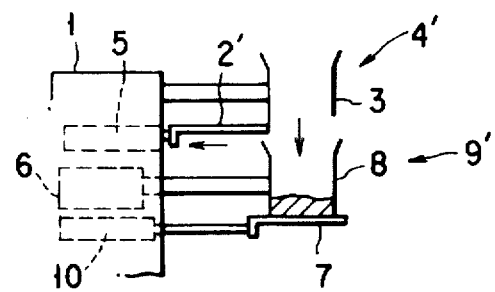
Figure 41A:
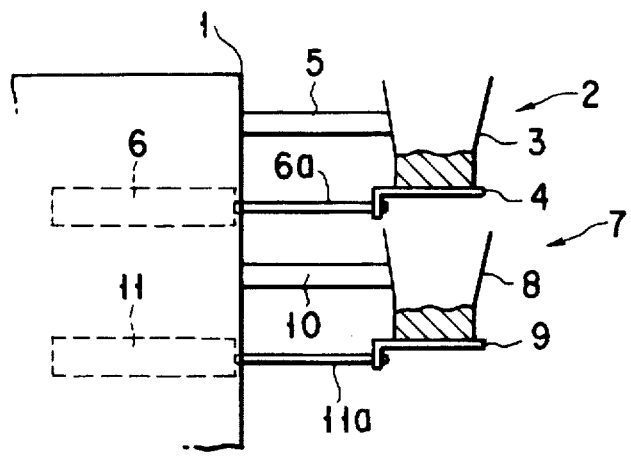
FIGS. 41A, 41B, and 41C are schematic side views for explaining the arrangement and operation of a conventional apparatus.
Figure 41B:
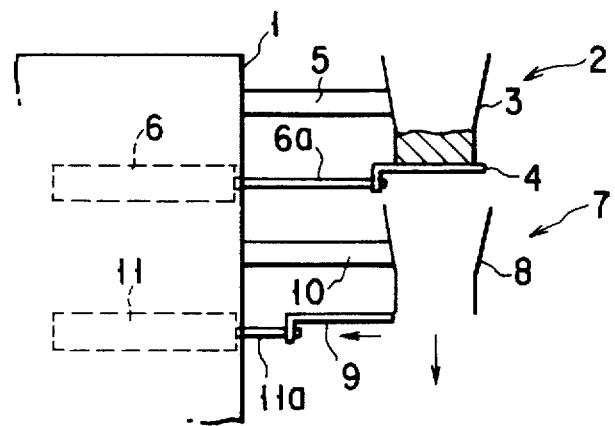
Figure 41C:
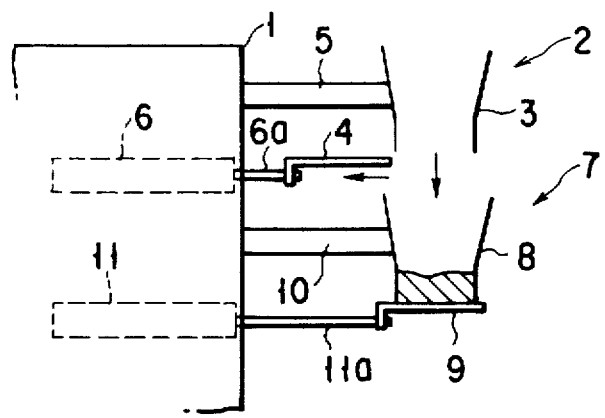

As shown in FIG. 35, the discharge hopper 505 is a single swing hopper formed with a prismatic hopper body 506 and a discharge gate 507. The hopper body 506 and the discharge gate 507 are formed integrally with a synthetic resin, e.g., polypropylene incorporating an anti-fungus material such as silver zeolite. The inner wall surfaces of the hopper body 506 and the discharge gate 507 are waved so that the target metering object having tackiness will not remain on them.

Although this discharge hoppers 505 is formed to be larger than the intermediate hopper 525 or the metering hoppers 570 in order to store the target metering objects discharged from the plurality of metering hoppers 570, since its hopper body 506 and discharge gate 507 are made of a synthetic resin, it can be mounted and removed easily when compared to the conventional hopper made of stainless steel. Also, as described above, the discharge hopper 505 can be cleaned easily due to the operation of the anti-fungus material.

Locking segments 508 projecting outward are provided to the two side surfaces of the hopper body 506.

Locking holes 509 are formed in the locking segments 508.

The discharge hopper 505 is fixed at a position where it can receive the target metering object discharged from the collecting chute 500 in it, by inserting its two locking segments 508 in support grooves 503a of the discharge hopper support 503 and locking its locking pins (not shown) biased to enter the support grooves 503a in the locking holes 509.

The locking pins can be unlocked by pulling out the discharge hopper 505 firmly.

A pivot shaft 510 is provided to project through the front and rear surfaces of the hopper body 506, and the side portion of the discharge gate 507 is pivotally supported by the pivot shaft 510 to open/close the lower open surface of the hopper body 106.

Shafts 511 and 512 are provided to project from the intermediate portion of the side portion of the discharge gate 507 and the front surface of the hopper body 506, respectively, and a spring 513 is hooked between the shafts 511 and 512.

For this reason, the discharge gate 507 is constantly biased in a direction to close the lower open surface of the hopper body 506.

As shown in FIG. 26, the distal end portion of a drive arm 516 of an opening/closing drive unit 515 is locked by the shaft 512 of the pivot gate 510 side.

The opening/closing drive unit 515 fixed to the lower surface of the base table 511 pivotally supports the other end of the drive arm 516 with the edge portion of a rotary plate 517, and drives the rotary plate 517 to rotate, so that the drive arm 516 is reciprocally moved almost horizontally and the discharge gate 507 of the discharge hopper 505 is driven to open/close, thereby discharging the target metering object in the discharge hopper 505 to a packaging machine or a packaging line (not shown).

As described above, in this combined metering apparatus 410, the convey tables 417 and 421 of the circular feeder 416 and the linear feeders 420, the hopper main bodies and discharge gates of the intermediate hoppers 425, the metering hoppers 470, and the discharge hopper 405, and the collecting chute 500 are made of a synthetic resin incorporating anti-fungus material. Thus, the entire apparatus can be made considerably lightweight, its drive portion can be made small, and machining aiming at preventing attachment of a target metering object having tackiness can be performed at a low cost, thereby greatly decreasing the cost of the entire apparatus.

Since the main bodies and discharge gates of the respective hoppers are made of a synthetic resin, noise occurring upon an opening/closing operation can be decreased. Even if scratches are formed on the surfaces of these components, proliferation of bacteria can be prevented due to the action of the anti-fungus material, and a sufficiently high sterilization effect can be obtained with cleaning at room temperature, thereby greatly decreasing the cleaning cost.

In the fifth embodiment, the present invention is applied to the combined metering apparatus in which a plurality of supply units and hoppers are annularly arranged along the outer circumference of a prismatic housing. The present invention can be applied not only to the combined metering apparatus having this structure but also to a combined metering apparatus in which a plurality of supply units and hoppers are arranged in a line, as in the first embodiment shown in FIGS. 1A and 1B.

In the fifth embodiment, the hopper bodies and discharge gates of the intermediate hoppers, the metering hoppers, and the discharge hopper are formed with a synthetic resin incorporating an anti-fungus material. However, only the hopper bodies or the discharge gates may be formed with a synthetic resin incorporating an anti-fungus material.

In the fifth embodiment, in the combined metering apparatus, all the constituent components that are brought into contact with the target metering object, i.e., the convey tables of the supply units, the hopper bodies and gates of the respective hoppers, the collecting chute, and the convey belts of the conveyors are formed with a synthetic resin incorporating an anti-fungus material. However, only some of these components may be formed with a synthetic resin incorporating an anti-fungus material.

In the fifth embodiment, the convey tables of the supply units, the main bodies and discharge gates (bottom plates) of the hoppers, the collecting chute, and the like are formed with polypropylene incorporating silver zeolite as the anti-fungus material. However, other anti-fungus materials, e.g., copper ion, quaternary ammonium salt, and the like may be utilized. The synthetic resin material is not limited to polypropylene, and other materials can be used.

As described above, in the combined metering apparatus according to the fifth embodiment of the present invention, at least one component among a plurality of supply units, hoppers, and the collecting units which are brought into contact with the target metering object is formed with a synthetic resin incorporating an anti-fungus material. Thus, the entire apparatus can be made considerably lightweight, its drive portion can be made small, and noise during driving can be decreased, thereby greatly decreasing the cost.

Even if bacteria enter scratches formed on the surfaces of these components, proliferation of the bacteria is prevented due to the action of the anti-fungus material, and a sufficiently high cleaning effect can be obtained with cleaning at room temperature. Thus, the cleaning cost is decreased greatly, satisfying requirements for both sanitation and cost.

We claim:

1. A combined metering apparatus comprising:

a supply for supplying target metering objects;

a plurality of pool hoppers for separately receiving the target metering objects supplied by said supply, said plurality of pool hoppers being arranged in a horizontal direction in sets, each pool hopper including a first cylindrical body having upper and lower open end portions, and a first bottom plate slidable to selectively open/close said lower open end portion of said first cylindrical body;

a plurality of metering hoppers for receiving the target metering objects separately falling from said plurality of pool hoppers, said plurality of metering hoppers being arranged in sets on a lower stage side of said plurality of pool hoppers to correspond thereto, each of the metering hoppers including:

(a) a second cylindrical body having a receiving port at an upper portion thereof to receive the target metering object and a discharge port at a lower portion thereof to discharge the target metering object therethrough, and (b) a second bottom plate slidable to selectively open/close said lower open end portion of said second cylindrical body;

a plurality of metering devices provided in association with said plurality of metering hoppers to separately meter the target metering objects received in said plurality of metering hoppers and to output electric signals corresponding thereto, each of said metering devices including:

(a) a base body having a mount portion, (b) a load cell having:

(i) a mount side mounted on the mount portion of said base body, and (ii) a load side, (c) an engage member mounted on the load side of said load cell and having a support portion, with said second cylindrical body mounted on the support portion of said engage member and said second bottom plate forming an opening/closing member movably attached relative to the discharge port of said second cylindrical body to open/close said discharge port of said second cylindrical body, and (d) a drive portion mounted on said engage member to drive said opening/closing member substantially horizontally, wherein each of said metering devices permits stable metering without preventing unstable contact portions during metering since the mount side of said load cell is substantially fixed to said base body and said second cylindrical body, said opening/closing member, and said drive portion are substantially mounted on the load side of said load cell via said engage member;

a selecting unit for selecting a combination of the target metering objects providing a predetermined metered value in said plurality of metering hoppers in accordance with the electric signals from said plurality of metering devices; and a device for collecting and discharging the target metering objects falling from corresponding ones of said plurality of metering hoppers in accordance with the combination of the target metering objects selected by said selecting unit.

2. A combined metering apparatus according to claim 1, wherein each of said plurality of metering devices includes, when said drive portion comprises an air cylinder, a flexible tube connected to supply air from said base body to said air cylinder, and an exhaust unit mounted to said load side of said load cell to direct air discharged from said air cylinder almost horizontally.

3. A combined metering apparatus according to claim 1, further comprising:

a first opening/closing drive unit related to said plurality of pool hoppers to move said first bottom plate in a first direction to close said lower open end portion of said first cylindrical body and to move said first bottom plate in a second direction opposite to the first direction to open said lower open end portion of said first cylindrical body, and a second opening/closing drive unit forming said drive portion and related to said plurality of metering hoppers to move said second bottom plate in the second direction to close said lower end portion of said second cylindrical body and to move said second bottom plate in the first direction to open said lower end portion of said second cylindrical body.

4. A combined metering apparatus according to claim 3, further comprising a control unit for controlling said first and second opening/closing drive units such that movement of said second bottom plate in the second direction and movement of said first bottom plate in the second direction are almost in synchronism with each other.

5. A combined metering apparatus according to claim 1, wherein said upper open end portion of said second cylindrical body is larger than said upper open end portion of said first cylindrical body, and said second cylindrical body is arranged, within a range where said upper open end portion of said second cylindrical body and said lower open end portion of said first cylindrical body overlap vertically, close to a side toward which said first bottom plate is opened.

6. A combined metering apparatus according to claim 1, wherein each of said first and second bottom plates has two end portions that are supported by a pair of guide shafts supported substantially horizontally and parallel to each other, and is slidably moved in a lengthwise direction of said pair of guide shafts upon reception of a force of a drive shaft of a drive unit.

7. A combined metering apparatus according to claim 6, wherein each of said first and second bottom plates has a first bearing portion formed into a groove in a side surface side of one end portion in order to laterally receive said drive shaft, thereby transmitting the force of said drive shaft to said bottom plate, a second bearing portion formed into a groove in a lower surface side of said one end portion in order to receive one of said pair of guide shafts from below, thereby regulating movement of said bottom plate in a direction perpendicular to the lengthwise direction of said guide shafts, and each of said first and second bottom plates is supported by said pair of guide shafts such that said drive shaft is engaged with said first bearing portion, one of said pair of guide shafts is engaged with said second bearing portion, and the other one of said guide shafts is abutted against a lower surface of the other end portion.

8. A combined metering apparatus according to claim 1, wherein each of said first and second cylindrical bodies has a tilted surface at an outer circumferential portion of a lower end thereof, said tilted surface being formed such that a height thereof from a lower end face is gradually increased toward an outer side, and said tilted surface is located on a side toward which each of said first and second bottom plates is moved to open said lower open end portion.

9. A combined metering apparatus according to claim 1, wherein each of said plurality of metering devices includes, when said drive portion comprises an air cylinder, two flexible tubes connected between said base body and said air cylinder to supply and discharge air, and an exhaust unit provided to discharge air discharged from said air cylinder to an outside of said base body.

10. A combined metering apparatus according to claim 9, further comprising:

a first opening/closing drive unit related to said plurality of pool hoppers to move said first bottom plate in a first direction to close said lower open end portion of said first cylindrical body and to move said first bottom plate in a second direction opposite to the first direction to open said lower open end portion of said first cylindrical body, and a second opening/closing drive unit forming said drive portion and related to said plurality of metering hoppers to move said second bottom plate in the second direction to close said lower end portion of said second cylindrical body and to move said second bottom plate in the first direction to open said lower end portion of said second cylindrical body.

11. A combined metering apparatus according to claim 10, further comprising a control unit for controlling said first and second opening/closing drive units such that movement of said second bottom plate in the second direction and movement of said first bottom plate in the second direction are almost in synchronism with each other.

12. A combined metering apparatus according to claim 9, wherein:

said upper open end portion of said second cylindrical body is larger than said upper open end portion of said first cylindrical body, and said second cylindrical body is arranged, within a range where said upper open end portion of said second cylindrical body and said lower open end portion of said first cylindrical body overlap vertically, close to a side toward which said first bottom plate is opened.

13. A combined metering apparatus according to claim 9, wherein each of said first and second bottom plates has two end portions that are supported by a pair of guide shafts supported substantially horizontally and parallel to each other, and is slidably moved in a lengthwise direction of said pair of guide shafts upon reception of a force of a drive shaft of a drive unit.

14. A combined metering apparatus according to claim 13, wherein each of said first and second bottom plates has a first bearing portion formed into a groove in a side surface side of one end portion in order to laterally receive said drive shaft, thereby transmitting the force of said drive shaft to said bottom plate, a second bearing portion, formed into a groove in a lower surface side of said one end portion in order to receive one of said pair of guide shafts from below, thereby regulating movement of said bottom plate in a direction perpendicular to the lengthwise direction of said guide shafts, and each of said first and second bottom plates is supported by said pair of guide shafts such that said drive shaft is engaged with said first bearing portion, one of said pair of guide shafts is engaged with said second bearing portion, and the other one of said guide shafts is abutted against a lower surface of the other end portion.

15. A combined metering apparatus according to claim 9, wherein each of said first and second cylindrical bodies has a tilted surface at an outer circumferential portion of a lower end thereof, said tilted surface being formed such that a height thereof from a lower end face is gradually increased toward an outer side, and said tilted surface is located on a side toward which each of said first and second bottom plates is moved to open said lower open end portion.

16. A combined metering apparatus comprising:

a supply for supplying target metering objects;

a plurality of pool hoppers for separately receiving the target metering objects supplied by said supply, said plurality of pool hoppers being arranged in a horizontal direction in sets, each pool hopper including a first cylindrical body having upper and lower open end portions, and a first bottom plate slidable to selectively open/close said lower open end portion of said first cylindrical body;

a plurality of metering hoppers for receiving the target metering objects separately falling from said plurality of pool hoppers, said plurality of metering hoppers being arranged in sets on a lower stage side of said plurality of pool hoppers to correspond thereto, each of the metering hoppers including a second cylindrical body having upper and lower open end portions, and a second bottom plate slidable to selectively open/close said lower open end portion of said second cylindrical body;

a plurality of metering devices provided in association with said plurality of metering hoppers to separately meter the target metering objects received in said plurality of metering hoppers and to output electric signals corresponding thereto;

a selecting unit for selecting a combination of the target metering objects providing a predetermined metered value in said plurality of metering hoppers in accordance with the electric signals from said plurality of metering devices;

a plurality of timing hoppers for receiving the target metering objects falling from corresponding ones of said plurality of metering hoppers in accordance with the combination of the target metering objects selected by said selecting unit, said plurality of timing hoppers being arranged in sets on a lower stage side of said plurality of metering hoppers to correspond thereto, each of the timing hoppers including a third cylindrical body having upper and lower open end portions, and a third bottom plate slidable to selectively open/close said lower open end portion of said third cylindrical body at a timing delayed from opening/closing operations of other third cylindrical bodies by a predetermined period of time; and a device for collecting and discharging the target metering objects falling from said plurality of timing hoppers.

17. A combined metering apparatus according to claim 16, wherein each of said plurality of metering devices includes:

(a) a base body;

(b) a load cell having a mount side mounted on said base body, with said second cylindrical body mounted on a load side of said load cell and having a receiving port at the upper end portion thereof to receive the target metering object and a discharge port at the lower end portion thereof to discharge the target metering object therethrough, and said second bottom plate forming an opening/closing member mounted on said load side of said load cell to open/close said discharge port, (c) an air cylinder mounted on said load side of said load cell to drive a piston in a horizontal direction to actuate said opening/closing member, (d) a flexible tube connected to supply air from said base body to said air cylinder; and (e) an exhaust unit mounted on said load side of said load cell to direct air discharged from said air cylinder almost horizontally.

18. A combined metering apparatus according to claim 17, further comprising:

first opening/closing drive unit related to said plurality of pool hoppers to move said first bottom plate in a first direction to close said lower open end portion of said first cylindrical body and to move said first bottom plate in a second direction opposite to the first direction to open said lower open end portion of said first cylindrical body, and a second opening/closing drive unit including said air cylinder and related to said plurality of metering hoppers to move said second bottom plate in the second direction to close said lower end portion of said second cylindrical body and to move said second bottom plate in the first direction to open said lower end portion of said second cylindrical body.

19. A combined metering apparatus according to claim 18, further comprising a control unit for controlling said first and second opening/closing drive units such that movement of said second bottom plate in the second direction and movement of said first bottom plate in the second direction are almost in synchronism with each other.

20. A combined metering apparatus according to claim 17, wherein:

said upper open end portion of said second cylindrical body is larger than said upper open end portion of said first cylindrical body, and said second cylindrical body is arranged, within a range where said upper open end portion of said second cylindrical body and said lower open end portion of said first cylindrical body overlap vertically, close to a side toward which said first bottom plate is opened.

21. A combined metering apparatus according to claim 17, wherein each of said first and second bottom plates has two end portions that are supported by a pair of guide shafts supported substantially horizontally and parallel to each other, and is slidably moved in a lengthwise direction of said pair of guide shafts upon reception of a force of a drive shaft of a drive unit.

22. A combined metering apparatus according to claim 21, wherein each of said first and second bottom plates has a first bearing portion formed into a groove in a side surface side of one end portion in order to laterally receive said drive shaft, thereby transmitting the force of said drive shaft to said bottom plate, a second bearing portion formed into a groove in a lower surface side of said one end portion in order to receive one of said pair of guide shafts from below, thereby regulating movement of said bottom plate in a direction perpendicular to the lengthwise direction of said guide shafts, and each of said first and second bottom plates is supported by said pair of guide shafts such that said drive shaft is engaged with said first bearing portion, one of said pair of guide shafts is engaged with said second bearing portion, and the other one of said guide shafts is abutted against a lower surface of the other end portion.

23. A combined metering apparatus according to claim 17, wherein each of said first and second cylindrical bodies has a tilted surface at an outer circumferential portion of a lower end thereof, said tilted surface being formed such that a height thereof from a lower end face is gradually increased toward an outer side, and said tilted surface is located on a side toward which each of said first and second bottom plates is moved to open said lower open end portion.

24. A combined metering apparatus according to claim 16, wherein each of said plurality of metering devices includes:

(a) a base body;

(b) a load cell having a mount side mounted on said base body, with said second cylindrical body mounted on a load side of said load cell and having a receiving port at the upper end portion thereof to receive the target metering object and a discharge port at the lower end portion thereof to discharge the target metering object therethrough, and said second bottom plate forming an opening/closing member mounted on said load side of said load cell to open/close said discharge port, (c) an air cylinder mounted on said load side of said load cell to drive a piston in a horizontal direction to actuate said opening/closing member, (d) two flexible tubes connected between said base body and said air cylinder to supply and discharge air, and (e) an exhaust unit to discharge air discharged from said air cylinder to an outside of said base body.

25. A combined metering apparatus according to claim 24, further comprising:
first opening/closing drive unit related to said plurality of pool hoppers to move said first bottom plate in a first direction to close said lower open end portion of said first cylindrical body and to move said first bottom plate in a second direction opposite to the first direction to open said lower open end portion of said first cylindrical body, and
a second opening/closing drive unit including said air cylinder and related to said plurality of metering hoppers to move said second bottom plate in the second direction to close said lower end portion of said second cylindrical body and to move said second bottom plate in the first direction to open said lower end portion of said second cylindrical body.

26. A combined metering apparatus according to claim 25, further comprising a control unit for controlling said first and second opening/closing drive units such that movement of said second bottom plate in the second direction and movement of said first bottom plate in the second direction are almost in synchronism with each other.

27. A combined metering apparatus according to claim 24, wherein:
said upper open end portion of said second cylindrical body is larger than said upper open end portion of said first cylindrical body, and
said second cylindrical body is arranged, within a range where said upper open end portion of said second cylindrical body and said lower open end portion of said first cylindrical body overlap vertically, close to a side toward which said first bottom plate is opened.

28. A combined metering apparatus according to claim 24, wherein each of said first and second bottom plates has two end portions that are supported by a pair of guide shafts supported substantially horizontally and parallel to each other, and is slidably moved in a lengthwise direction of said pair of guide shafts upon reception of a force of a drive shaft of a drive unit.

29. A combined metering apparatus according to claim 28, wherein each of said first and second bottom plates has
a first bearing portion formed into a groove in a side surface side of one end portion in order to laterally receive said drive shaft, thereby transmitting the force of said drive shaft to said bottom plate,
a second bearing portion formed into a groove in a lower surface side of said one end portion in order to receive one of said pair of guide shafts from below, thereby regulating movement of said bottom plate in a direction perpendicular to the lengthwise direction of said guide shafts, and
each of said first and second bottom plates is supported by said pair of guide shafts such that said drive shaft is engaged with said first bearing portion, one of said pair of guide shafts is engaged with said second bearing portion, and the other one of said guide shafts is abutted against a lower surface of the other end portion.

30. A combined metering apparatus according to claim 24, wherein each of said first and second cylindrical bodies has a tilted surface at an outer circumferential portion of a lower end thereof, said tilted surface being formed such that a height thereof from a lower end face is gradually increased toward an outer side, and said tilted surface is located on a side toward which each of said first and second bottom plates is moved to open said lower open end portion.

31. A combined metering apparatus comprising:
a supply for supplying target metering objects;
a plurality of pool hoppers for separately receiving the target metering objects supplied by said supply, said plurality of pool hoppers being arranged in a horizontal direction in sets, each pool hopper including a first cylindrical body having upper and lower open end portions, and a first bottom plate slidable to selectively open/close said lower open end portion of said first cylindrical body;
a plurality of metering hoppers for receiving the target metering objects separately falling from said plurality of pool hoppers, said plurality of metering hoppers being arranged in sets on a lower stage side of said plurality of pool hoppers to correspond thereto, each of the metering hoppers including a second cylindrical body having upper and lower open end portions, and a second bottom plate slidable to selectively open/close said lower open end portion of said second cylindrical body;
a plurality of metering devices provided in association with said plurality of metering hoppers to separately meter the target metering objects received in said plurality of metering hoppers and to output electric signals, each of said metering devices including:
(a) a base body,
(b) a load cell having a mount side mounted on said base body, with said second cylindrical body mounted on a load side of said load cell and having a receiving port at the upper end portion thereof to receive the target metering object and a discharge port at the lower end portion thereof to discharge the target metering object therethrough, and said second bottom plate forming an opening/closing member mounted on said load side of said load cell to open/close said discharge port, and
(c) a drive portion mounted on said load side of said load cell to drive said opening/closing member substantially horizontally;
a selecting unit for selecting a combination of the target metering objects providing a predetermined metered value in said plurality of metering hoppers in accordance with the electric signals from said plurality of metering devices;
a device for collecting and discharging the target metering objects falling from corresponding ones of said plurality of metering hoppers in accordance with the combination of the target metering objects selected by said selecting unit;
a first opening/closing drive unit related to said plurality of pool hoppers to move said first bottom plate in a first direction to close said lower open end portion of said first cylindrical body and to move said first bottom plate in a second direction opposite to the first direction to open said lower open end portion of said first cylindrical body; and
a second opening/closing drive unit forming said drive portion and related to said plurality of metering hoppers to move said second bottom plate in the second direction to close said lower open end portion of said second cylindrical body and to move said second bottom plate in the first direction to open said lower open end portion of said second cylindrical body.

32. A combined metering apparatus according to claim 31, further comprising a control unit for controlling said first and second opening/closing drive units such that movement of said second bottom plate in the second direction and movement of said first bottom plate in the second direction are almost in synchronism with each other.

33. A combined metering apparatus according to claim 31, wherein:
said upper open end portion of said second cylindrical body is larger than said upper open end portion of said first cylindrical body, and
said second cylindrical body is arranged, within a range where said upper open end portion of said second cylindrical body and said lower open end portion of said first cylindrical body overlap vertically close to a side toward which said first bottom plate is opened.

34. A combined metering apparatus according to claim 31, wherein each of said first and second bottom plates has two end portions that are supported by a pair of guide shafts supported substantially horizontally and parallel to each other, and is slidably moved in a lengthwise direction of said pair of guide shafts upon reception of a force of a drive shaft of a drive unit.

35. A combined metering apparatus according to claim 34, wherein each of said first and second bottom plates has:
a first bearing portion formed into a groove in a side surface side of one end portion in order to laterally receive said drive shaft, thereby transmitting the force of said drive shaft to said bottom plate, and
a second bearing portion formed into a groove in a lower surface side of said one end portion in order to receive one of said pair of guide shafts from below, thereby regulating movement of said bottom plate in a direction perpendicular to the lengthwise direction of said guide shafts, and
each of said first and second bottom plates is supported by said pair of guide shafts such that said drive shaft is engaged with said first bearing portion, one of said pair of guide shafts is engaged with said second bearing portion, and the other one of said guide shafts is abutted against a lower surface of the other end portion.

36. A combined metering apparatus according to claim 31, wherein each of said first and second cylindrical bodies has a tilted surface at an outer circumferential portion of a lower end thereof, said tilted surface being formed such that a height thereof from a lower end face is gradually increased toward an outer side, and said tilted surface is located on a side toward which each of said first and second bottom plates is moved to open said lower open end portion.

37. A combined metering apparatus according to claim 31, wherein each of said plurality of metering means includes, when said drive portion comprises an air cylinder,
a flexible tube connected to supply air from said base body to said air cylinder, and
an exhaust unit mounted to said load side of said load cell to direct air discharged from said air cylinder almost horizontally.

38. A combined metering apparatus comprising:
a supply for supplying target metering objects;
a plurality of pool hoppers for separately receiving the target metering objects supplied by said supply means, said plurality of pool hoppers being arranged in a horizontal direction in sets, each pool hopper including a first cylindrical body having upper and lower open end portions, and a first bottom plate slidable to selectively open/close said lower open end portion of said first cylindrical body;
a plurality of metering hoppers for receiving the target metering objects separately falling from said plurality of pool hoppers, said plurality of metering hoppers being arranged in sets on a lower stage side of said plurality of pool hoppers to correspond thereto, each of the metering hoppers including a second cylindrical body having upper and lower open end portions, and a second bottom plate slidable to selectively open/close said lower open end portion of said second cylindrical body;

a plurality of metering devices provided in association with said plurality of metering hoppers to separately meter the target metering objects received in said plurality of metering hoppers and to output electric signals, each of said metering devices including:
(a) a base body,
(b) a load cell having a mount side mounted on said base body, with said second cylindrical body mounted on a load side of said load cell and having a receiving port at the upper end portion thereof to receive the target metering object and a discharge port at the lower end portion thereof to discharge the target metering object therethrough, and said second bottom plate forming an opening/closing member mounted on said load side of said load cell to open/close said discharge port, and
(c) a drive portion mounted on said load side of said load cell to drive said opening/closing member substantially horizontally;

a selecting unit for selecting a combination of the target metering objects providing a predetermined metered value in said plurality of metering hoppers in accordance with the electric signals from said plurality of metering devices;

a device for collecting and discharging the target metering objects falling from corresponding ones of said plurality of metering hoppers in accordance with the combination of the target metering objects selected by said selecting unit;

wherein each of said plurality of metering devices includes, when said drive portion comprises an air cylinder,
(a) two flexible tubes connected between said base body and said air cylinder to supply and discharge air, and
(b) an exhaust unit provided to discharge air discharged from said air cylinder to an outside of said base body;

a first opening/closing drive unit related to said plurality of pool hoppers to move said first bottom plate in a first direction to close said lower open end portion of said first cylindrical body and to move said first bottom plate in a second direction opposite to the first direction to open said lower open end portion of said first cylindrical body, and a second opening/closing drive unit forming said drive portion and related to said plurality of metering hoppers to move said second bottom plate in the second direction to close said lower open end portion of said second cylindrical body and to move said second bottom plate in the first direction to open said lower open end portion of said second cylindrical body.

39. A combined metering apparatus according to claim 38, further comprising a control unit for controlling said first and second opening/closing drive units such that movement of said second bottom plate in the second direction and movement of said first bottom plate in the second direction are almost in synchronism with each other.

40. A combined metering apparatus according to claim 38, wherein:

said upper open end portion of said second cylindrical body is larger than said upper open end portion of said first cylindrical body, and said second cylindrical body is arranged, within a range where said upper open end portion of said second cylindrical body and said lower open end portion of said first cylindrical body overlap vertically, close to side toward which said first bottom plate is opened.

41. A combined metering apparatus according to claim 38, wherein each of said first and second bottom plates has two end portions that are supported by a pair of guide shafts supported substantially horizontally and parallel to each other, and is slidably moved in a lengthwise direction of said pair of guide shafts upon reception of a force of a drive shaft of a drive unit.

42. A combined metering apparatus according to claim 41, wherein each of said first and second bottom plates has:

a first bearing portion formed into a groove in a side surface side of one end portion in order to laterally receive said drive shaft, thereby transmitting the force of said drive shaft to said bottom plate, a second bearing portion, formed into a groove in a lower surface side of said one end portion in order to receive one of said pair of guide shafts from below, thereby regulating movement of said bottom plate in a direction perpendicular to the lengthwise direction of said guide shafts, and each of said first and second bottom plates is supported by said pair of guide shafts such that said drive shaft is engaged with said first bearing portion, one of said pair of guide shafts is engaged with said second bearing portion, and the other one of said guide shafts is abutted against a lower surface of the other end portion.

43. A combined metering apparatus according to claim 38, wherein each of said first and second cylindrical bodies has a tilted surface at an outer circumferential portion of a lower end thereof, said tilted surface being formed such that a height thereof from a lower end face is gradually increased toward an outer side, and said tilted surface is located on a side toward which each of said first and second bottom plates is moved to open said lower open end portion.

* * * * *